(12) United States Patent
Sinha et al.

(10) Patent No.: US 11,473,797 B2
(45) Date of Patent: Oct. 18, 2022

(54) HVAC SYSTEM WITH HEADLESS THERMOSTAT

(71) Applicant: Johnson Controls Technology Company, Auburn Hills, MI (US)

(72) Inventors: Vineet Sinha, Brookfield, WI (US); Yingchun Xu, Glendale, WI (US); Patrick W. Mulcahy, Whitefish Bay, WI (US); August Lu, Hai Dian District (CN); Bing Mao, Buffalo Grove, IL (US); Karl F. Reichenberger, Mequon, WI (US); Theresa N. Gillette, Wichita, KS (US); Andrew M. Boyd, Wichita, KS (US); Thomas D. Chase, Rose Hill, KS (US); Madhuka M. Jayarathne, Wichita, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/678,817

(22) Filed: Nov. 8, 2019

(65) Prior Publication Data

US 2020/0149764 A1 May 14, 2020

Related U.S. Application Data

(60) Provisional application No. 62/758,392, filed on Nov. 9, 2018, provisional application No. 62/817,882, filed on Mar. 13, 2019.

(51) Int. Cl.
*F24F 11/30* (2018.01)
*F24F 11/58* (2018.01)
(Continued)

(52) U.S. Cl.
CPC .............. *F24F 11/30* (2018.01); *F24F 11/58* (2018.01); *F24F 11/64* (2018.01); *F24F 11/65* (2018.01);
(Continued)

(58) Field of Classification Search
CPC .. F24F 11/30; F24F 11/65; F24F 11/64; F24F 11/58; F24F 2110/12; F24F 2110/10; F24F 2130/10; G05B 15/02; H04W 76/10
See application file for complete search history.

(56) References Cited

U.S. PATENT DOCUMENTS 6,196,467 B1 * 3/2001 Dushane ................. F24D 19/10
165/209
6,315,211 B1 11/2001 Sartain et al.
(Continued)

FOREIGN PATENT DOCUMENTS

CN 106322689 A 1/2017
CN 106647300 A 5/2017
(Continued)

OTHER PUBLICATIONS

Davies, "HCL Aegis low-cost home automation gateway supports WiFi, ZigBee, DLNA, HomePlug & more" (accessed at: https://web.archive.org/web/20150910143110/http://www.slashgear.com/hcl-aegls-low-cost-home-automation-gateway-supports-wifi-zigbee-dlna-homeplug-more-071 24551, Jan. 7, 2011, 20 pages.
(Continued)

*Primary Examiner* — Charles R Kasenge
(74) *Attorney, Agent, or Firm* — Foley & Lardner LLP

(57) ABSTRACT

A heating, ventilation, or air conditioning (HVAC) system includes a headless thermostat device and an adapter unit. The headless thermostat device includes one or more circuits configured to receive a control input from a user device via a local wireless network and generate a control signal for
(Continued)

HVAC equipment based on the control input. The adapter unit includes one or more circuit configured to receive the control signal from the headless thermostat device via the local wireless network and provide the control signal to the HVAC equipment for operation of the HVAC equipment in accordance with the control input.

30 Claims, 30 Drawing Sheets

(51) Int. Cl.
| | |
|---|---|
| F24F 11/64 | (2018.01) |
| F24F 11/65 | (2018.01) |
| G05B 15/02 | (2006.01) |
| H04W 76/10 | (2018.01) |
| F24F 130/10 | (2018.01) |
| F24F 110/10 | (2018.01) |
| F24F 110/12 | (2018.01) |

(52) U.S. Cl.
CPC ............ *G05B 15/02* (2013.01); *H04W 76/10* (2018.02); *F24F 2110/10* (2018.01); *F24F 2110/12* (2018.01); *F24F 2130/10* (2018.01)

(56) References Cited

U.S. PATENT DOCUMENTS

| | | | |
|---|---|---|---|
| 8,393,550 B2 | 3/2013 | Simon et al. | |
| 9,618,226 B2 | 4/2017 | Chen et al. | |
| 9,886,845 B2 * | 2/2018 | Rhoads | H04N 5/23219 |
| 9,918,183 B2 * | 3/2018 | Rhoads | G06K 9/6253 |
| 9,964,328 B2 | 5/2018 | Ribbich et al. | |
| 10,078,524 B2 * | 9/2018 | Harkins | G09C 5/00 |
| 10,353,369 B2 | 7/2019 | Delgoshaei et al. | |
| 10,466,673 B2 | 11/2019 | Tae | |
| 10,520,212 B1 | 12/2019 | Beck | |
| 10,845,079 B1 | 11/2020 | Picardi et al. | |
| 11,159,338 B1 * | 10/2021 | Roche | H04L 67/10 |
| 2004/0203387 A1 | 10/2004 | Grannan | |
| 2005/0195757 A1 * | 9/2005 | Kidder | H04W 60/00 370/278 |
| 2005/0270151 A1 | 12/2005 | Winick | |
| 2007/0227721 A1 | 10/2007 | Springer et al. | |
| 2007/0241203 A1 * | 10/2007 | Wagner | G05D 23/1905 236/1 C |
| 2009/0312853 A1 | 12/2009 | Kore et al. | |
| 2011/0137467 A1 | 6/2011 | Leen et al. | |
| 2012/0067561 A1 * | 3/2012 | Bergman | B60H 1/00657 165/257 |
| 2012/0188072 A1 | 7/2012 | Dawes et al. | |
| 2012/0298763 A1 * | 11/2012 | Young | F24F 11/30 236/51 |
| 2013/0158721 A1 | 6/2013 | Somasundaram et al. | |
| 2014/0031992 A1 | 1/2014 | Bergman et al. | |
| 2014/0052783 A1 | 2/2014 | Swatsky et al. | |
| 2014/0244047 A1 * | 8/2014 | Oh | G08B 19/00 700/278 |
| 2014/0247943 A1 * | 9/2014 | Harkins | G06F 9/4411 380/282 |
| 2015/0120063 A1 * | 4/2015 | Yarde | G05B 19/042 700/276 |
| 2015/0219353 A1 * | 8/2015 | Isono | F24F 11/30 165/205 |
| 2015/0219354 A1 * | 8/2015 | Isono | F24F 11/30 165/208 |
| 2015/0330688 A1 | 11/2015 | Goel et al. | |
| 2016/0029384 A1 | 1/2016 | Sidhu et al. | |
| 2016/0054027 A1 * | 2/2016 | Dyess | G05B 15/02 700/277 |
| 2016/0123617 A1 | 5/2016 | Vega | |
| 2016/0138821 A1 * | 5/2016 | Shaull | F24F 11/62 700/276 |
| 2016/0245538 A1 | 8/2016 | Amer et al. | |
| 2016/0327300 A1 * | 11/2016 | Ribbich | G05B 15/02 |
| 2016/0327301 A1 * | 11/2016 | Ribbich | H05B 47/12 |
| 2016/0327302 A1 * | 11/2016 | Ribbich | G05B 15/02 |
| 2016/0330565 A1 | 11/2016 | Jayaram et al. | |
| 2017/0010032 A1 | 1/2017 | Goel et al. | |
| 2017/0089603 A1 * | 3/2017 | Bentz | G05B 19/0428 |
| 2017/0146260 A1 * | 5/2017 | Ribbich | F24F 11/30 |
| 2017/0212487 A1 * | 7/2017 | Gupta | G05B 19/042 |
| 2017/0254555 A1 | 9/2017 | Tae | |
| 2017/0284693 A1 * | 10/2017 | Robledo | F24F 11/62 |
| 2017/0344044 A1 | 11/2017 | Imes et al. | |
| 2017/0374490 A1 | 12/2017 | Schoppmeier | |
| 2018/0054724 A1 | 2/2018 | Cariou et al. | |
| 2018/0084531 A1 | 3/2018 | Soman et al. | |
| 2018/0087795 A1 | 3/2018 | Okita et al. | |
| 2018/0163984 A1 | 6/2018 | Alberth, Jr. | |
| 2018/0224143 A1 | 8/2018 | Anderson et al. | |
| 2018/0233028 A1 * | 8/2018 | Rhoads | G06F 16/58 |
| 2018/0266720 A1 | 9/2018 | Lee | |
| 2018/0363934 A1 | 12/2018 | Vie et al. | |
| 2019/0024920 A1 | 1/2019 | Delgoshaei et al. | |
| 2019/0056136 A1 | 2/2019 | Van Rooyen | |
| 2019/0095644 A1 | 3/2019 | Park et al. | |
| 2019/0101304 A1 | 4/2019 | Yoon | |
| 2019/0221096 A1 | 7/2019 | Mannfeld | |
| 2019/0223248 A1 | 7/2019 | Chandran et al. | |
| 2019/0301763 A1 | 10/2019 | Hoffman | |
| 2019/0373435 A1 | 12/2019 | Panje | |
| 2020/0149764 A1 | 5/2020 | Sinha et al. | |
| 2021/0071889 A1 | 3/2021 | Picardi et al. | |
| 2022/0018562 A1 | 1/2022 | Anderson et al. | |

FOREIGN PATENT DOCUMENTS

| | | |
|---|---|---|
| CN | 206160374 U | 5/2017 |
| CN | 206583047 U | 10/2017 |
| CN | 105509235 B | 11/2018 |
| CN | 107990483 B | 12/2018 |
| KR | 101965112 B1 | 4/2019 |

OTHER PUBLICATIONS

Hildenbrand, "Internet of ZS What are ZigBee and Z-Wave? Everything you need to know!" (accessed at: https://web.archive.org/web/20171102224416/https://www.androidcentral.com/what-zigbee-and-zwave) Nov. 2, 2017, 16 pages.

Inventek Systems, "eS-WiFi Module AT Command Set "IWIN"", 2011, 80 pages.

RS Components, "11 Internet of Things (IoT) Protocols You Need to Know About" (accessed at: https://www.rs-online.com/designspark/eleven-internet-of-things-iot-protocols-you-need-to-know-about) Apr. 20, 2015, 16 pages.

International Search Report and Written Opinion for International Application No. PCT/US2019/060598 dated Jun. 25, 2020, 19 pages.

Shirota, "IEEE802.11ah Overview" Qualcomm, Jan. 22, 2016, 26 Pgs. (Year: 2016).

Ingersoll Rand, "American Standard Gold 824 Smart Control User Guide" Apr. 2018, 32 Pgs.

Ingersoll Rand, "Guide to Nexia Home Intelligence and Wireless Technology" Ingersoll Rand, 2014, 53 pgs.

Ingersoll Rand, "Nexia Connected Controls Manage your home climate from wherever." Trane Thermostats Brochure, 2015, 4 Pgs.

Ingersoll Rand, "Trane XL824 Smart Control User Guide" Feb. 2015, 20 Pgs.

Lucas, "What is Infrared?" Feb. 27, 2019, 10 page print out, accessed at https://www.livescience.com/50260-infrared-radiation.html.

Ray, "WiFi's Future: Examining 802.11 ad, 802.11 ah Halow (& others)" Linklabs Blog by Ray, Published Feb. 1, 2018, 10 Pg printout, accessed at https://www.link-labs.com/blog/future-of-wifi-802-11ah-802-11ad.

Ray, "WiFi's Future: Examining 802.11 ad, 802.11 ah Halow (& Others)" Linklabs Blog, Published Feb. 1, 2018, 15 Pg printout, by

(56) References Cited

OTHER PUBLICATIONS

Ray, accessed at https://web.archive.org/web/20181027211336/https://www.link-labs.com/blog/future-of-wifi-802-11ah-802-11ad archive data Oct. 27, 2018 (15 pages).

* cited by examiner

HVAC SYSTEM WITH HEADLESS THERMOSTAT

CROSS REFERENCE TO RELATED PATENT APPLICATION

This application claims the benefit of and priority to U.S. Provisional Patent Application No. 62/758,392 filed Nov. 9, 2018, and U.S. Provisional Patent Application No. 62/817,882 filed Mar. 13, 2019, the entire contents of each of which is incorporated by reference herein.

BACKGROUND

The present disclosure relates generally to building systems that control environmental conditions of a building, such as a heating, ventilation, and/or air conditioning (HVAC) system. The present disclosure relates more particularly to thermostats of a building system.

Systems of a building may include various controllers configured to generate control decisions for heating or cooling equipment or systems. The controllers can, in some cases, be thermostats. Thermostats can be utilized in both residential and commercial building systems. Thermostats can receive, or themselves measure, environmental conditions such as temperature and generate control decisions based on setpoints and/or the measured temperature for operating the heating or cooling equipment or systems. Thermostats include physical displays for presenting measured or control information to a user and for receiving input from the user, e.g., a user desired setpoint or operating schedule. However, in some cases, the physical displays are expensive, increasing the overall cost of the thermostat. Furthermore, the display can become cracked or broken, resulting in a thermostat that needs to be replaced. In some cases, the physical size and construction of a thermostat is designed around the constraint of available sizes of a physical display.

Typically HVAC systems, including low nitrous oxygen (NOx) systems, require the use of a thermostat to control the heating and cooling of a room or building. Installation of a thermostat requires the use of thermostat wire which is between the room/building and an HVAC unit. Installation of the thermostat may potentially damage walls of the room/building and may be a large portion of an overall cost and amount time for installing an HVAC system.

SUMMARY

HVAC System with Headless Thermostat

In one implementation of the present disclosure, an HVAC system includes a headless thermostat device and an adapter unit. The headless thermostat device includes one or more circuits configured to receive a control input from a user device via a local wireless network and generate a control signal for HVAC equipment based on the control input. The adapter unit includes one or more circuits configured to receive the control signal from the headless thermostat device via the local wireless network and provide the control signal to the HVAC equipment for operation of the HVAC equipment in accordance with the control input.

In some embodiments, the headless thermostat device is structured without a display and without any mechanism for manually receiving control inputs from a user. The adapter unit may be separate from the HVAC equipment or may be built into the HVAC equipment. The adapter unit may include a plurality of terminals for forming wired connection to the HVAC equipment. The HVAC equipment may be a furnace, an air conditioner, an outdoor unit, and indoor unit, and other types of HVAC equipment. In some embodiments, adapter unit has network configuration data stored in memory and used to automatically connect to the local wireless network upon power up. The local wireless network may be a wireless local area network (WLAN) such as a Wi-Fi network, or may be other types or local wireless networks such as a BACnet network, a Bluetooth network, a ZigBee network, a Modbus network, a Z-Wave network, and other types of wireless networks.

Modular Thermostat

In another implementation of the present disclosure, a modular thermostat includes a thermostat component lock configured to lock a thermostat component to the thermostat and a processing circuit. The processing circuit is configured to receive an indication to lock the thermostat component to the thermostat, operate the thermostat component lock to lock the thermostat component to the thermostat in response to a reception of the indication to lock the thermostat component to the thermostat, receive an indication to unlock the thermostat component lock from the thermostat, and operate the thermostat component lock to unlock the thermostat component from the thermostat in response to a reception of the indication to unlock the thermostat component.

In some embodiments, the thermostat component is a user interface configured to receive input from a user and provide output to the user. In some embodiments, the processing circuit is configured to receive the indication to unlock the thermostat component lock from the thermostat via the user interface and cause the user interface to display a passcode screen prompting the user to enter a passcode in response to a reception of the indication to unlock the thermostat component lock. In some embodiments, the processing circuit is configured to receive an entered passcode from the user via the user interface, determine whether the entered passcode matches the passcode, and operate the thermostat component lock to unlock the thermostat component from the thermostat in response to a determination that the entered passcode matches the passcode.

In some embodiments, the thermostat component lock is an electromagnetic lock configured to electromagnetically lock the thermostat component to the thermostat.

In some embodiments, the thermostat component is at least one of a user interface configured to display information to a user and receive user input from the user, a sensor configured to sense an environmental condition of a building, or a projector system configured to project a user display on a wall and receive user input from the user.

In some embodiments, the processing circuit is configured to determine that the thermostat component is first connected to the thermostat and determine whether a software updated configured to operate the thermostat component is installed in response to a determination that the thermostat component is first connected to the thermostat. In some embodiments, the processing circuit is configured to retrieve the software update from a remote platform in response to a determination that the software update is not installed and operate the thermostat component with the software update.

Projector Thermostat

Another implementation of the present disclosure is a projector thermostat for a building. The thermostat includes an image projector configured to project a display of the thermostat on a wall, an infrared laser circuit configured to project infrared light, an infrared camera configured to detect the infrared light projected by the infrared laser circuit, and a processing circuit. The processing circuit is configured to cause the image projector to project the display of the thermostat on the wall and receive an indication of the infrared light detected by the infrared camera, wherein the infrared light is reflected from the infrared laser to the infrared camera by a user. The processing circuit is configured to determine a user interaction with the display based on the indication of the infrared light and operate building equipment of the building based on the user interaction.

In some embodiments, the processing circuit is configured to receive an indication of a size for the display from a user and operate the image projector to project the display of the thermostat on the wall in the size received from the user.

In some embodiments, the processing circuit is configured to receive an indication of a resolution for the display from a user and operate the image projector to project the display of the thermostat on the wall in the resolution received from the user.

In some embodiments, the processing circuit is configured to determine a second user interaction with the display based on the indication of the infrared light, determine whether the second user interaction with the display is a navigation to a second display, and cause the image projector to project the second display in response to a determination that the second user interaction is the navigation to the second display.

In some embodiments, the infrared laser includes an infrared filter. In some embodiments, the infrared laser is configured to project an infrared laser into the infrared filter. In some embodiments, the infrared filter is configured to filter the infrared laser to generate an infrared light plane horizontal to the wall a predefined distance from the wall.

In some embodiments, the infrared laser camera is configured to detect an object intersecting the infrared light plane at a particular intersection location, the particular intersection location corresponding to a particular location of the display.

In some embodiments, the processing circuit is configured to determine the user interaction with the display based on the particular intersection location and the particular location of the display corresponding to the particular intersection location.

Equipment Adapter Unit for Headless Thermostat

Another implementation of the present disclosure is a headless thermostat adapter unit for building equipment. The headless thermostat adapter unit includes a network radio circuit configured to communicate with a headless thermostat and receive a control signal from the headless thermostat, a wired interface circuit configured to operate the building equipment to control an environmental condition of a building, and a logic circuit. The logic circuit is configured to receive, via the network radio circuit, the control signal from the headless thermostat and operate, via the wired interface circuit, the building equipment based on the control signal. The logic circuit is configured to determine whether the adapter unit is disconnected from the headless thermostat using the network radio circuit, perform a backup control algorithm to generate a second control signal in response to a determination that the adapter unit is disconnected from the headless thermostat, and operate, via the wired interface circuit, the building equipment based on the second control signal. The adapter unit may include a plurality of terminals for forming a wired connection to the building equipment (e.g., HVAC equipment), and may be separate from the building equipment of built into the building equipment (e.g., built into a furnace, built into an air conditioner, etc.).

In some embodiments, the logic circuit is configured to receive, via the network radio circuit, a setpoint from at least one of a user device or the headless thermostat, receive, via the network radio circuit, environmental sensor data from a remote sensor, determine a second control signal for the building equipment based on the setpoint and the environmental sensor data, and operate, via the wired interface circuit, the building equipment based on the second control signal.

In some embodiments, the adapter unit further includes a cellular network radio circuit configured to communicate via a cellular network. In some embodiments, the logic circuit is configured to receive a control signal from a remote platform via the cellular network radio circuit and the cellular network and operate the building equipment based on the control signal received from the remote platform. The control signal received from the remote platform may be generated by the remote platform based on historical data, weather data, and a backup schedule. The control signal received from the remote platform may be generated by the remote platform based on historical data, weather data, and a backup schedule. The adapter unit may store historical data associated with the building equipment in a memory of the adapter unit and transmit the historical data to the remote platform at periodic intervals.

In some embodiments, the adapter unit further includes a cellular network radio circuit configured to communicate via a cellular network. In some embodiments, the logic circuit is configured to receive weather data from a remote platform via the cellular network radio circuit and perform the backup control algorithm to generate the second control signal based on the weather data in response to the determination that the adapter unit is disconnected from the headless thermostat.

Filter Based Headless Beacon Thermostat

Another implementation of the present disclosure is a method for operating a building with a headless thermostat. The method includes collecting, by the headless thermostat, thermostat data indicating at least one of operation of the headless thermostat, environmental data of the building, or operating parameters of the headless thermostat. The method includes broadcasting, by the headless thermostat, the headless thermostat data, receiving, by a user device, the headless thermostat data from the headless thermostat and other headless thermostat data from other headless thermostats, and receiving, by the user device, one or more filter parameters. The method includes filtering, by the user device, the headless thermostat data of the headless thermostat and the other headless thermostat data from the other headless thermostats to select headless thermostat data of one of the headless thermostat and the other headless thermostats and causing, by the user device, a user interface of the user device to display the selected headless thermostat data.

System For Drone Surveys of Beacon Devices

Another implementation of the present disclosure is a method of surveying a building with a drone to control environmental conditions of the building. The method includes causing the drone to fly through the building while receiving wireless broadcasts of building devices, the building devices including a headless thermostat and receiving, by the drone, the wireless broadcasts from the building devices while the drone flies through the building. The method further includes sending, by the drone, the wireless broadcasts to an analysis system, generating, by the analysis system, building information data based on the wireless broadcasts received from the drone, and causing, by the analysis system, the headless thermostat to operate building devices to control the environmental conditions of the building based on the building information data.

In some embodiments, the method includes generating, by the analysis system, an updated control algorithm for the headless thermostat based on the building information data, sending, by the analysis system, the updated control algorithm to the headless thermostat, and operating, by the headless thermostat, the building equipment based on the updated control algorithm.

In some embodiments, the method includes generating, by the analysis system, one or more updated operational parameters for the headless thermostat based on the building information data, sending, by the analysis system, the one or more updated operational parameters to the headless thermostat, and operating, by the analysis system, building equipment based on the one or more operational parameters.

In some embodiments, the method includes generating, by the analysis system, a cognitive agent for the headless thermostat based on the building information data, sending, by the analysis system, the cognitive agent to the headless thermostat, and operating, by the cognitive agent of the headless thermostat, the building equipment.

Headless Beacon Thermostat with Identifier Broadcasts

Another implementation of the present disclosure is a method for operating a building with a headless thermostat. The method includes collecting, by the headless thermostat, thermostat data indicating at least one of operation of the headless thermostat, environmental data of the building, or operating parameters of the headless thermostat, sending, by the headless thermostat, the headless thermostat data and a headless thermostat identifier to a remote platform, broadcasting, by the headless thermostat, the headless thermostat identifier, and receiving, by a user device, the headless thermostat identifier based on the broadcasting by the headless thermostat. The method includes retrieving, by the user device, the headless thermostat data from the remote platform based on the headless thermostat identifier and causing, by the user device, a user interface of the user device to display the headless thermostat data.

In some embodiments, retrieving, by the user device, the headless thermostat data from the remote platform further includes sending, by the user device, one or more authentication tokens stored by the user device and the thermostat identifier to the remote platform in response to a reception, by the user device, of the thermostat identifier, determining, by the remote platform, whether the user device has access to the headless thermostat based on the one or more authentication tokens and the thermostat identifier, and sending, by the remote platform, the headless thermostat data to the user device in response to a determination that the user device has access to the headless thermostat.

Data Reconstruction Based Headless Beacon Thermostat

Another implementation of the present disclosure is a method for operating a building with a headless thermostat. The method includes collecting, by the headless thermostat, thermostat data indicating at least one of operation of the headless thermostat, environmental data of the building, or operating parameters of the headless thermostat, dividing, by the headless thermostat, the thermostat data into packages, and broadcasting, by the headless thermostat, the packages at predefined intervals over a time period. The method further includes receiving, by the user device, the packages over the time period from the headless thermostat, constructing, by the user device, the headless thermostat data based on the packages, and causing, by the user device a user interface of the user device to display the headless thermostat data.

Faceless System Control

In an aspect, an HVAC unit is provided. The HVAC unit may include one or more components to control an ambient condition of an area of a building, a memory configured to store a set of instructions, and a processor coupled with the memory. The processor may be configured to receive sensor information from a wireless sensor located in the area, the sensor information indicating the ambient condition of the area. The processor may also be configured to receive setpoint information from a mobile device, the setpoint information indicating a desired condition of the area. The processor may further be configured to determine a difference between the ambient condition and the desired condition. The processor may also be configured to control control the one or more components to adjust the ambient condition of the area based on the difference.

In a further aspect, a method for controlling an ambient condition of an area of a building by one or more components of an HVAC unit is provided. The method may include receiving sensor information from a wireless sensor located in the area, the sensor information indicating the ambient condition of the area. The method may also include receiving setpoint information from a mobile device, the setpoint information indicating a desired condition of the area. The method may further include determining a difference between the ambient condition and the desired condition. The method may also include controlling the one or more components of the HVAC unit to adjust the ambient condition of the area based on the difference.

In another aspect, a computer-readable medium storing computer executable code for controlling an ambient condition of an area of a building by one or more components of an HVAC unit is provided. The computer-readable medium may include code to receive sensor information from a wireless sensor located in the area, the sensor information indicating the ambient condition of the area. The computer-readable medium may also include code to receive setpoint information from a mobile device, the setpoint information indicating a desired condition of the area. The computer-readable medium may further include code to determine a difference between the ambient condition and the desired condition. The computer-readable medium may also include code to control the one or more components to adjust the ambient condition of the area based on the difference.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
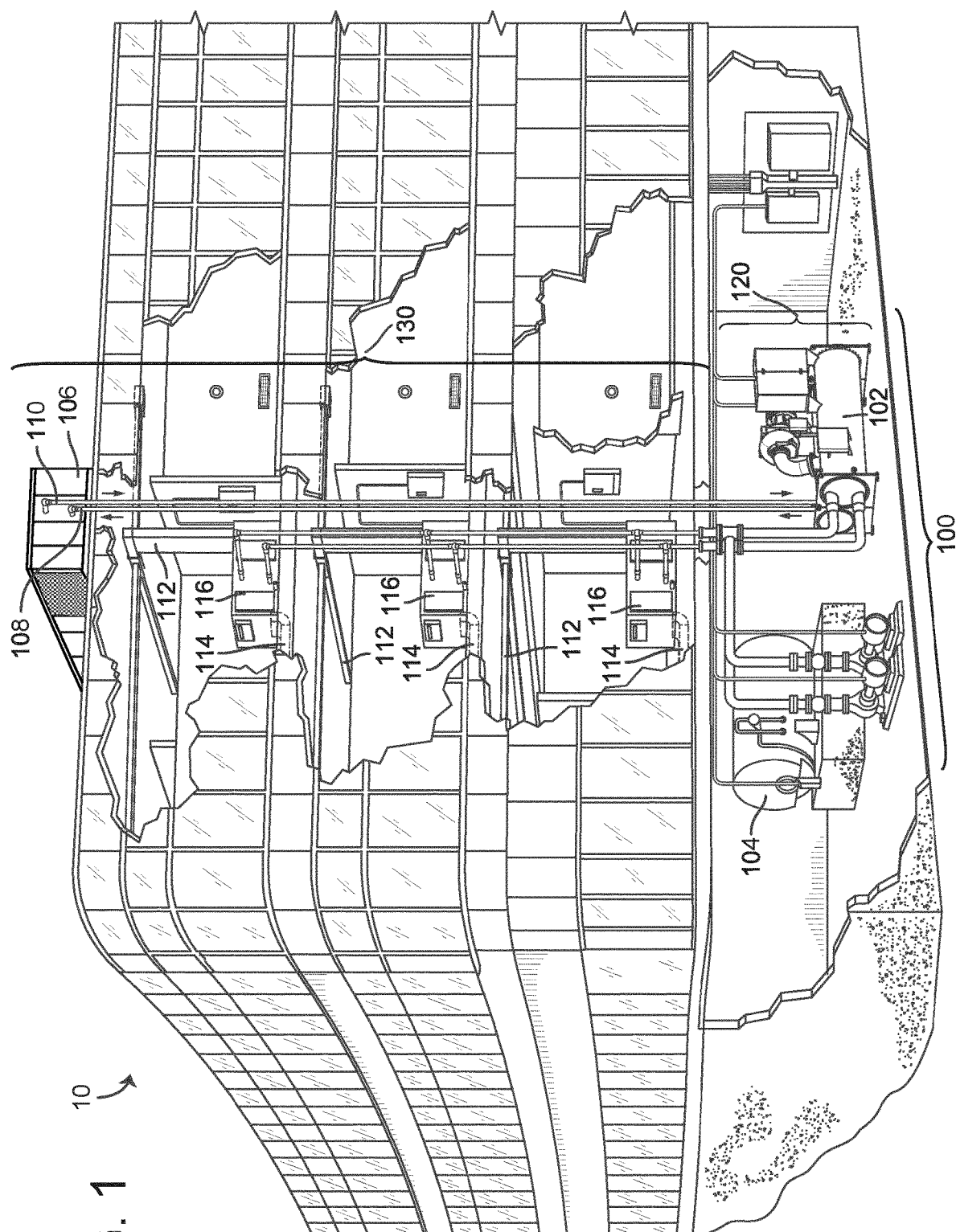
FIG. 1 is a perspective schematic drawing of a building equipped with a HVAC system, according to an exemplary embodiment.

Referring generally to the FIGURES, systems and methods are shown for a headless thermostat, according to various exemplary embodiments. A headless thermostat may be a thermostat that does not include a conventional display. For example, the headless thermostat could be a box device that includes connections to equipment or connections to a network but includes no display or interface for allowing a user to interact with the box device. A headless thermostat that does not include an interface or display may be manufactured at a reduced cost. Furthermore, the headless thermostat does not fail based on failures of a display since the headless thermostat does not include a display. In some cases, the headless thermostat can be installed in locations that are not visible to an occupant of a building since users do not interact with a display screen of the headless thermostat.

In some embodiments, the network connections of the headless thermostat allow for a user to connect with and control the headless thermostat via a user device. Instead of requiring the thermostat to include a display, reviewing data of the headless thermostat or controlling the headless thermostat can be performed by a user through the display of their user device. In some embodiments, the headless thermostat pushes data directly to a user device via a network allowing the user device to review the data and provide control data back to the headless thermostat. In some embodiments, the headless thermostat pushes the data to a server where the user device connects with the server to review the thermostat data and push commands to the headless thermostat.

In some embodiments, the headless thermostat is a modular thermostat allowing for components to be added to the headless thermostat or removed from the headless thermostat. For example, in some cases the headless thermostat includes a connection for an optional screen that a user can install with the headless thermostat in case the user desires the thermostat to have a display. Similarly, various sensors, radios, and/or any other modules can be added to the headless thermostat to cause the headless thermostat to have a particular feature.

In some embodiments, rather than including a physical display, the headless thermostat may utilize a projector. The projector could project an interface for the headless thermostat on a wall or other surface. In some embodiments, the headless thermostat utilizes an infrared (IR) laser to detect user interactions with the projected interface. This allows the headless thermostat to include interface features but not include a physical display.

In some embodiments, the headless thermostat communicates with an adapter unit, where the adapter unit is located with an HVAC unit that the headless thermostat is configured to control. Rather than directly communicating with the HVAC unit via wires, the headless thermostat communicates wirelessly with the adapter unit. The adapter unit in turns communicates via one or multiple wires with the HVAC unit to operate the HVAC unit.

Building Management System and HVAC System

Figure 2:
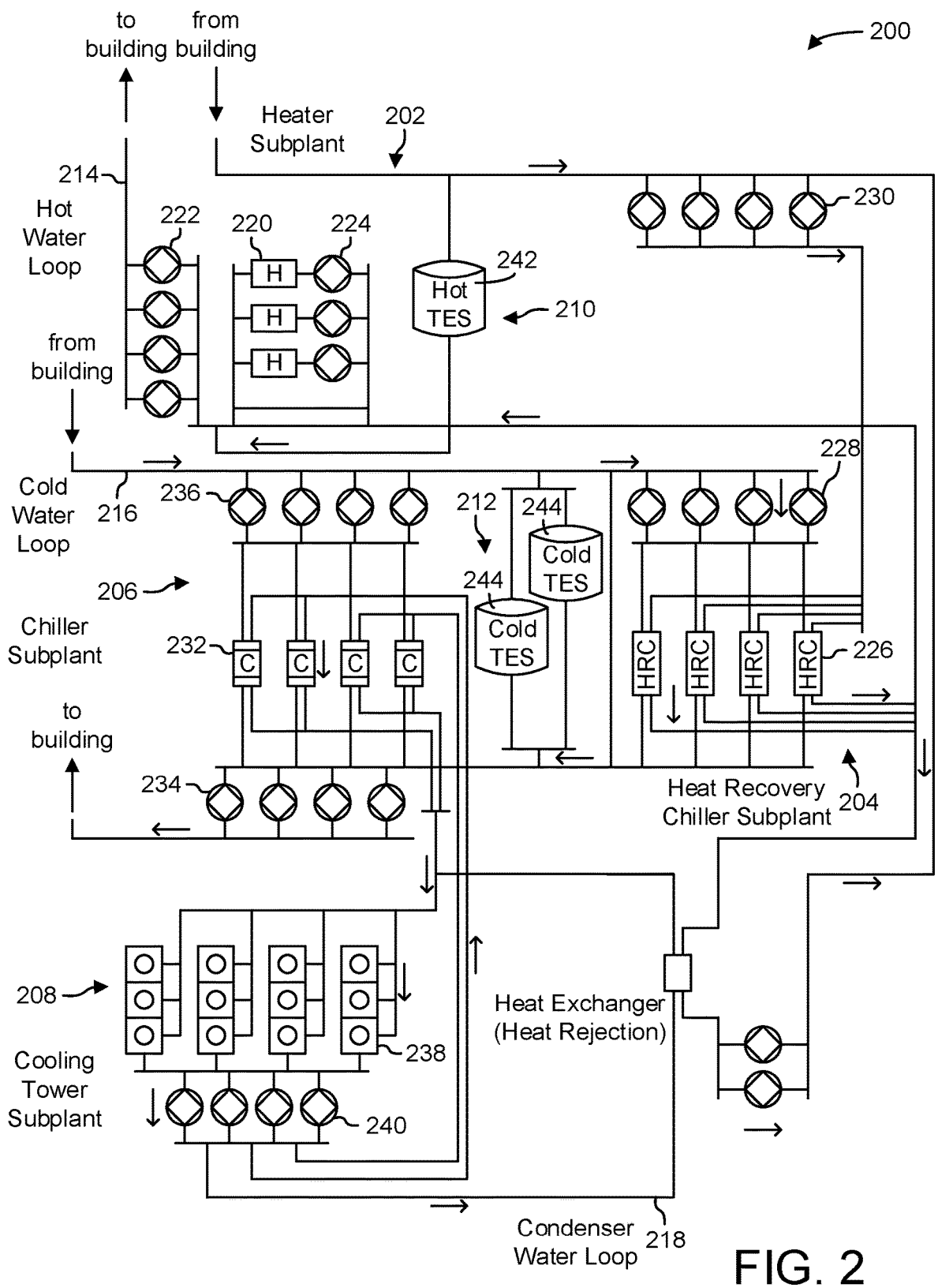
FIG. 2 is a block diagram of a waterside system that may be used in conjunction with the building of FIG. 1, according to an exemplary embodiment.
Figure 3:
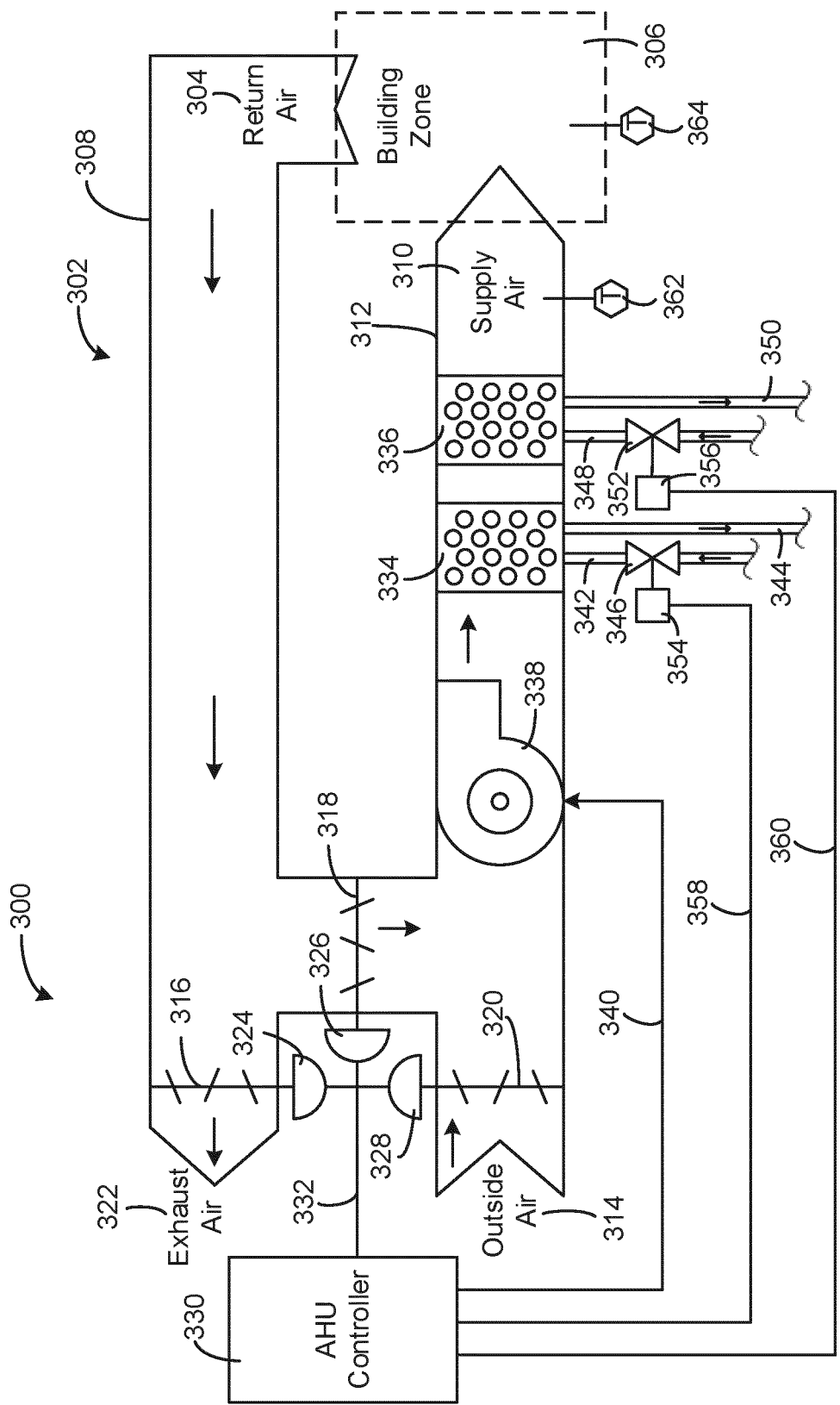
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Residential HVAC System

Figure 4:
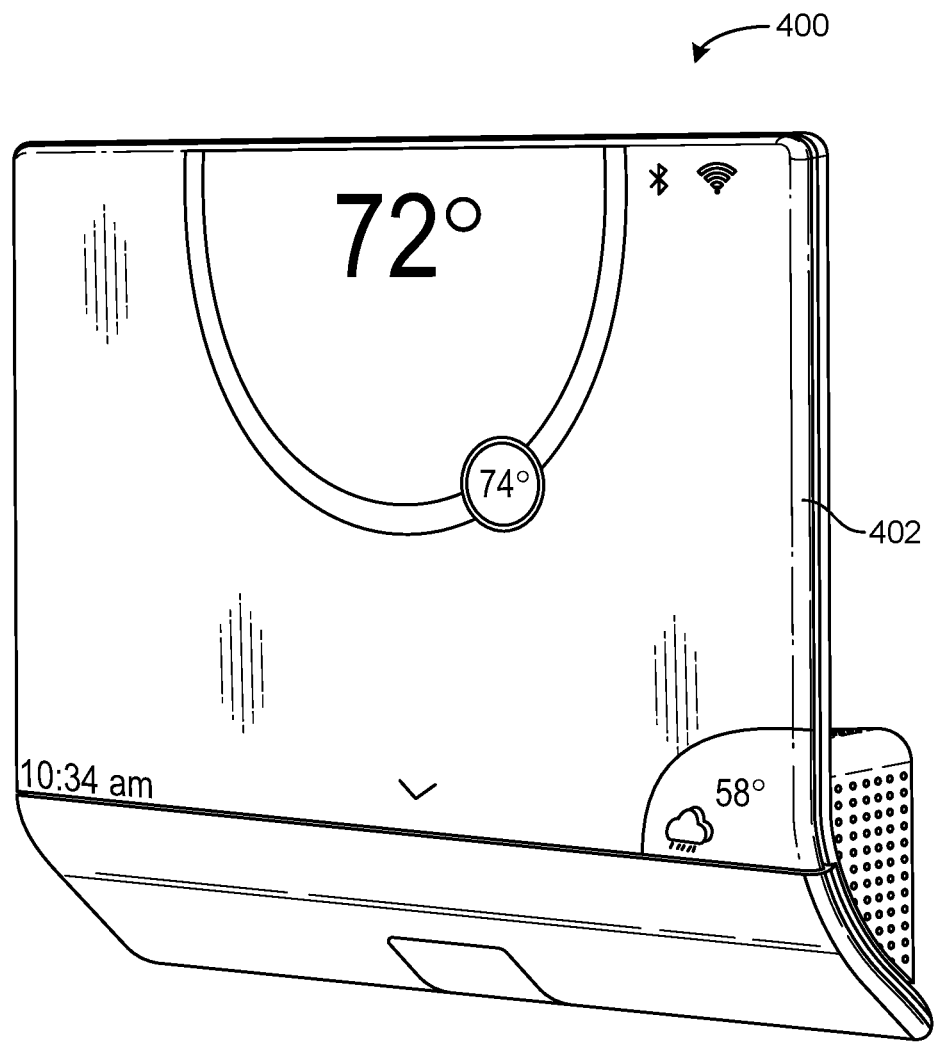
FIG. 4 is a drawing of a cantilevered thermostat with a transparent display, according to an exemplary embodiment.

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Figure 5:
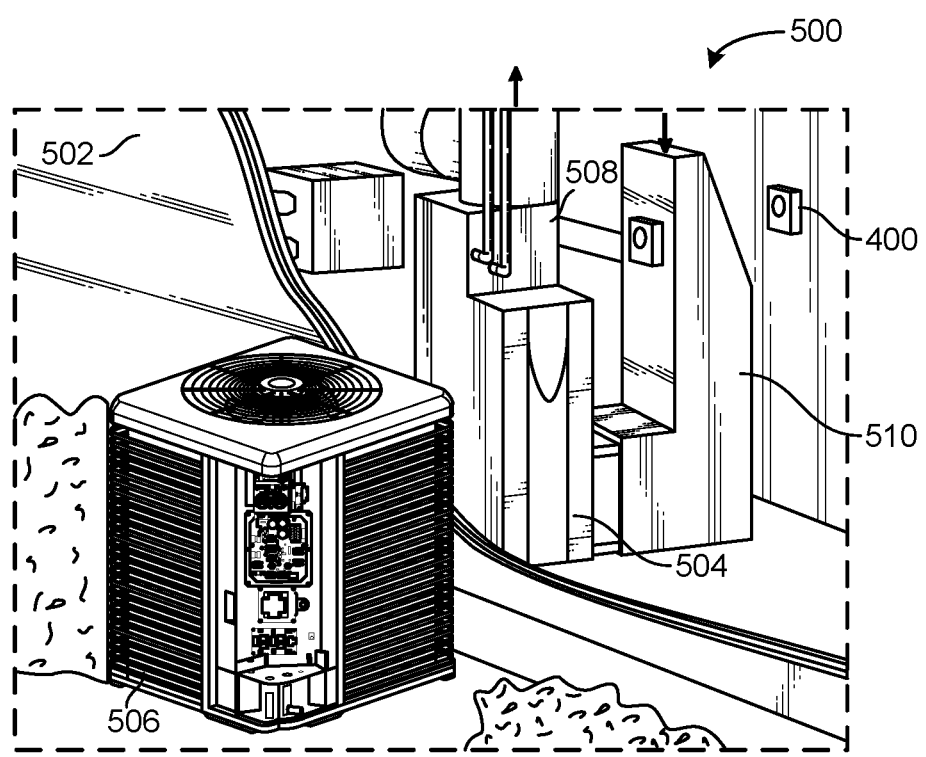
FIG. 5 is a perspective schematic drawing of a building equipped with a residential heating and cooling system and the thermostat of FIG. 4, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 504 to an outdoor unit 506. Indoor unit 504 may be positioned in a utility space, an attic, a basement, and so forth. Outdoor unit 506 is situated adjacent to a side of residence 502. Refrigerant conduits transfer refrigerant between indoor unit 504 and outdoor unit 506, typically transferring primarily liquid refrigerant in one direction and primarily vaporized refrigerant in an opposite direction.

When the system 500 shown in FIG. 5 is operating as an air conditioner, a coil in outdoor unit 506 serves as a condenser for recondensing vaporized refrigerant flowing from indoor unit 504 to outdoor unit 506 via one of the refrigerant conduits. In these applications, a coil of the indoor unit 504, designated by the reference numeral 508, serves as an evaporator coil. Evaporator coil 508 receives liquid refrigerant (which may be expanded by an expansion device, not shown) and evaporates the refrigerant before returning it to outdoor unit 506.

Outdoor unit 506 draws in environmental air through its sides, forces the air through the outer unit coil using a fan, and expels the air. When operating as an air conditioner, the air is heated by the condenser coil within the outdoor unit 506 and exits the top of the unit at a temperature higher than it entered the sides. Air is blown over indoor coil 508 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 506 is controlled to achieve a more elegant control over temperature and humidity within the residence 502. The outdoor unit 506 is controlled to operate components within the outdoor unit 506, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
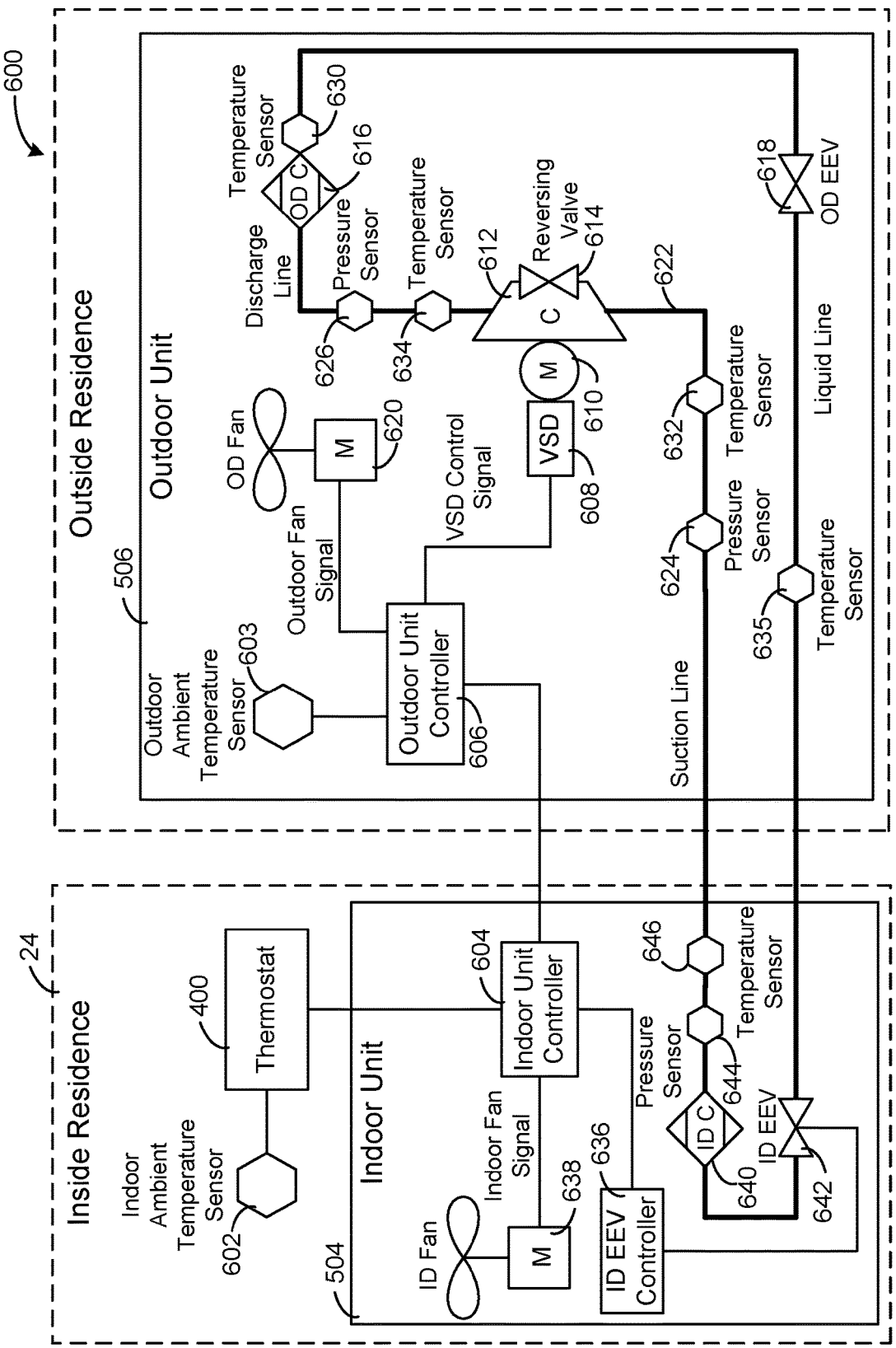
FIG. 6 is a perspective schematic drawing of the thermostat and the residential heating and cooling system of FIG. 4, according to an exemplary embodiment.

Referring now to FIG. 6, an HVAC system 600 is shown according to an exemplary embodiment. Various components of system 600 are located inside residence 502 while other components are located outside residence 502. Outdoor unit 506, as described with reference to FIG. 5, is shown to be located outside residence 502 while indoor unit 504 and thermostat 400, as described with reference to FIG. 6, are shown to be located inside the residence 502. In various embodiments, the thermostat 400 can cause the indoor unit 504 and the outdoor unit 506 to heat residence 502. In some embodiments, the thermostat 400 can cause the indoor unit 504 and the outdoor unit 506 to cool the residence 502. In other embodiments, the thermostat 400 can command an airflow change within the residence 502 to adjust the humidity within the residence 502.

The thermostat 400 can be configured to generate control signals for indoor unit 504 and/or outdoor unit 506. The thermostat 400 is shown to be connected to an indoor ambient temperature sensor 602, and an outdoor unit controller 606 is shown to be connected to an outdoor ambient temperature sensor 603. The indoor ambient temperature sensor 602 and the outdoor ambient temperature sensor 603 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 400 generates control signals for the indoor unit 504 and the outdoor unit 506 based on the indoor ambient temperature (e.g., measured via indoor ambient temperature sensor 602), the outdoor temperature (e.g., measured via the outdoor ambient temperature sensor 603), and/or a temperature set point.

The indoor unit 504 and the outdoor unit 506 may be electrically connected. Further, indoor unit 504 and outdoor unit 506 may be coupled via conduits 622. The outdoor unit 506 can be configured to compress refrigerant inside conduits 622 to either heat or cool the building based on the operating mode of the indoor unit 504 and the outdoor unit 506 (e.g., heat pump operation or air conditioning operation). The refrigerant inside conduits 622 may be any fluid that absorbs and extracts heat. For example, the refrigerant may be hydro fluorocarbon (HFC) based R-410A, R-407C, and/or R-134a.

The outdoor unit 506 is shown to include the outdoor unit controller 606, a variable speed drive 608, a motor 610 and a compressor 612. The outdoor unit 506 can be configured to control the compressor 612 and to further cause the compressor 612 to compress the refrigerant inside conduits 622. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 506, and the indoor unit 504, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 606 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller 606 can be configured to control and/or receive data from an outdoor electronic expansion valve (EEV) 518. The outdoor electronic expansion valve 518 may be an expansion valve controlled by a stepper motor. In this regard, the outdoor unit controller 606 can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 506 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 506 is shown to include pressure sensor 624. The pressure sensor 624 may measure the pressure of the refrigerant in conduit 622 in the suction line (i.e., a predefined distance from the inlet of compressor 612). Further, the outdoor unit 506 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 506 may include thermistors, thermocouples, and/or any other temperature sensing device. The outdoor unit 506 is shown to include temperature sensor 630, temperature sensor 632, temperature sensor 634, and temperature sensor 636. The temperature sensors (i.e., temperature sensor 630, temperature sensor 632, temperature sensor 635, and/or temperature sensor 646) can be configured to measure the temperature of the refrigerant at various locations inside conduits 622.

Referring now to the indoor unit 504, the indoor unit 504 is shown to include indoor unit controller 604, indoor electronic expansion valve controller 636, an indoor fan 638, an indoor coil 640, an indoor electronic expansion valve 642, a pressure sensor 644, and a temperature sensor 646. The indoor unit controller 604 can be configured to generate control signals for indoor electronic expansion valve controller 636. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 638 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In other embodiments, the pressure sensor 644 and/or the temperature sensor 646 may be located on the liquid line (i.e., a predefined distance from indoor coil 640).

Headless Thermostat

Figure 7:
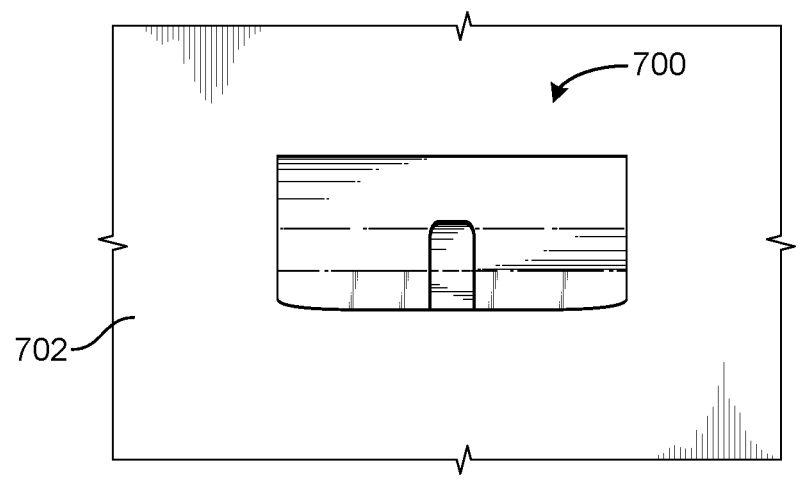
FIG. 7 is a perspective schematic drawing of a headless thermostat mounted on a wall, according to an exemplary embodiment.
Figure 8:
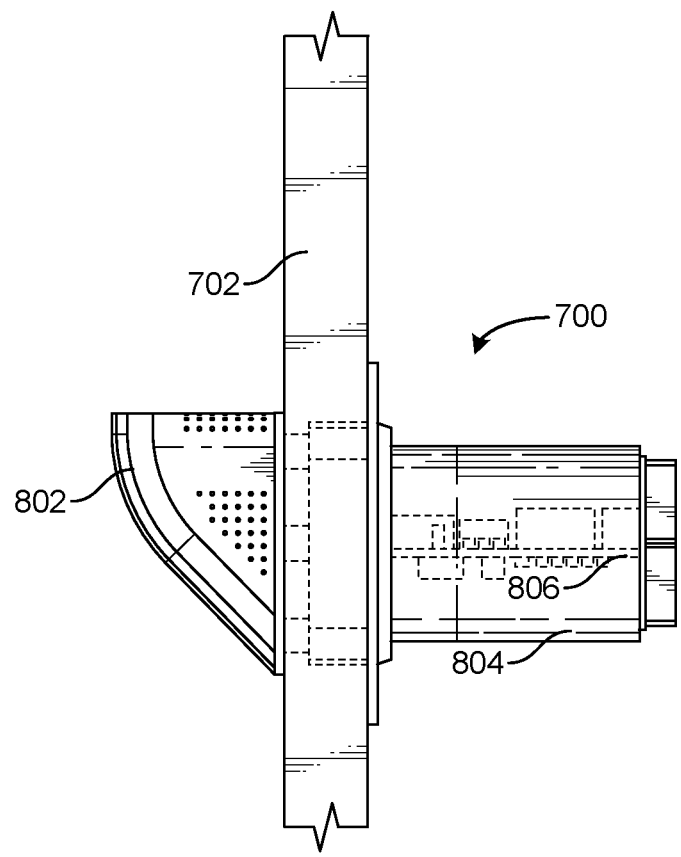
FIG. 8 is a perspective schematic drawing of the headless thermostat of FIG. 7 extending into the wall, according to an exemplary embodiment.

Referring now to FIGS. 7-8, a headless thermostat 700 is shown mounted on a wall 702, according to an exemplary embodiment. In FIG. 7, the headless thermostat 700 is shown to not include a display, i.e., the thermostat 700 is headless. A thermostat that does not include a display can reduce manufacturing costs since a manufacture does not need to spend resources on a display for the headless thermostat 700. Furthermore, displays often break due to accidental user damage or display component malfunctions. In this regard, a thermostat without a display, such as the headless thermostat 700 realize multiple benefits. Although the headless thermostat 700 does not include or require a display to operate, the headless thermostat 700 may operate the same as and/or similar to the thermostat 400 as described with reference to FIG. 4 and can include some or all of the components of the thermostat 400.

In FIG. 8, the headless thermostat 700 is shown extending through the wall 702. The headless thermostat 700 includes a cover 802 configured to house various electronics of the headless thermostat 700. The headless thermostat 700 further includes a socket 804 extending through and positioned at least partially behind the wall 702. The socket 804 includes various electronics including a circuit board 806.

Figure 9:
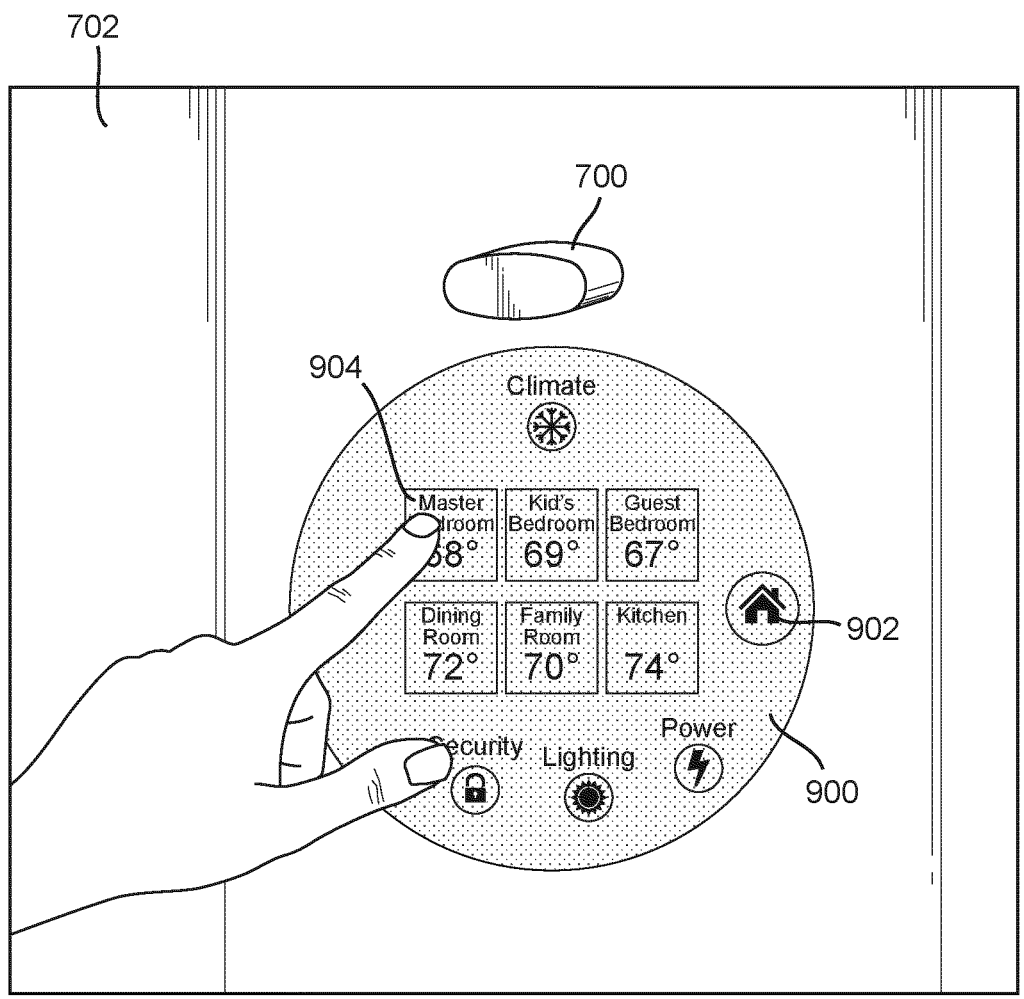
FIG. 9 is a perspective schematic drawing of the headless thermostat of FIG. 7 projecting a display onto the wall with a projector, according to an exemplary embodiment.

Referring now to FIG. 9, the headless thermostat 700 is shown projecting a display 900 on the wall 702. When some thermostats are designed, there may be a design constraint based on display size. For example, the dimensions of a thermostat may be constrained by sizes of physical displays. However, if a projector is utilized in a thermostat, the thermostat can implement a variety of different projected display sizes and/or different display appearances (e.g., difficult character fonts, different font sizes, colors, etc.) regardless of the size of the thermostat since there are no constraints regarding size or display type of a physical display.

In FIG. 9, the headless thermostat 700 projects the display 900 onto the wall 702. The headless thermostat 700 can project various color schemes, interface layouts, and/or can project the display 900 in a variety of sizes and/or shapes (e.g., a circle interface, a square interface, a rectangular interface, etc.). The display 900 includes one or multiple buttons, e.g., the buttons 902 and 904. A user can interact with the buttons 902 and 904 to adjust operating parameters of the headless thermostat 700 and/or cause the display 900 projected by the headless thermostat 700 to update and/or change to a different display. For example, a user may have a need for a particularly sized display. In this regard, the user can cause the headless thermostat 700 to project a display screen in a size desired by a user which normally would be constrained by a display area size of a physical display. For example, if a user has various decorations on a wall, the user can select a display screen size or shape that fits in with other objects on the wall.

While the headless thermostat 700 is shown in FIG. 9 to project the display 900 onto the wall 702, the headless thermostat 700 can project the display 900 onto any surface, e.g., a ceiling, a floor, a table, a window, a desk, a cabinet, etc. As shown in FIG. 9, the display 900 is larger than the headless thermostat 700. Furthermore, screen size and/or screen resolution which may be constrained by a physical display, is not constrained in the case of the headless thermostat 700 projecting the display 900. In this regard, a user may provide input to the headless thermostat 700 and cause the headless thermostat 700 to project the display 900 in a user defined size and/or resolution with any types of information, an operation not necessarily available in physical display thermostat since physical display screen size and/or resolution may constrain what types of information can be displayed.

Figure 10:
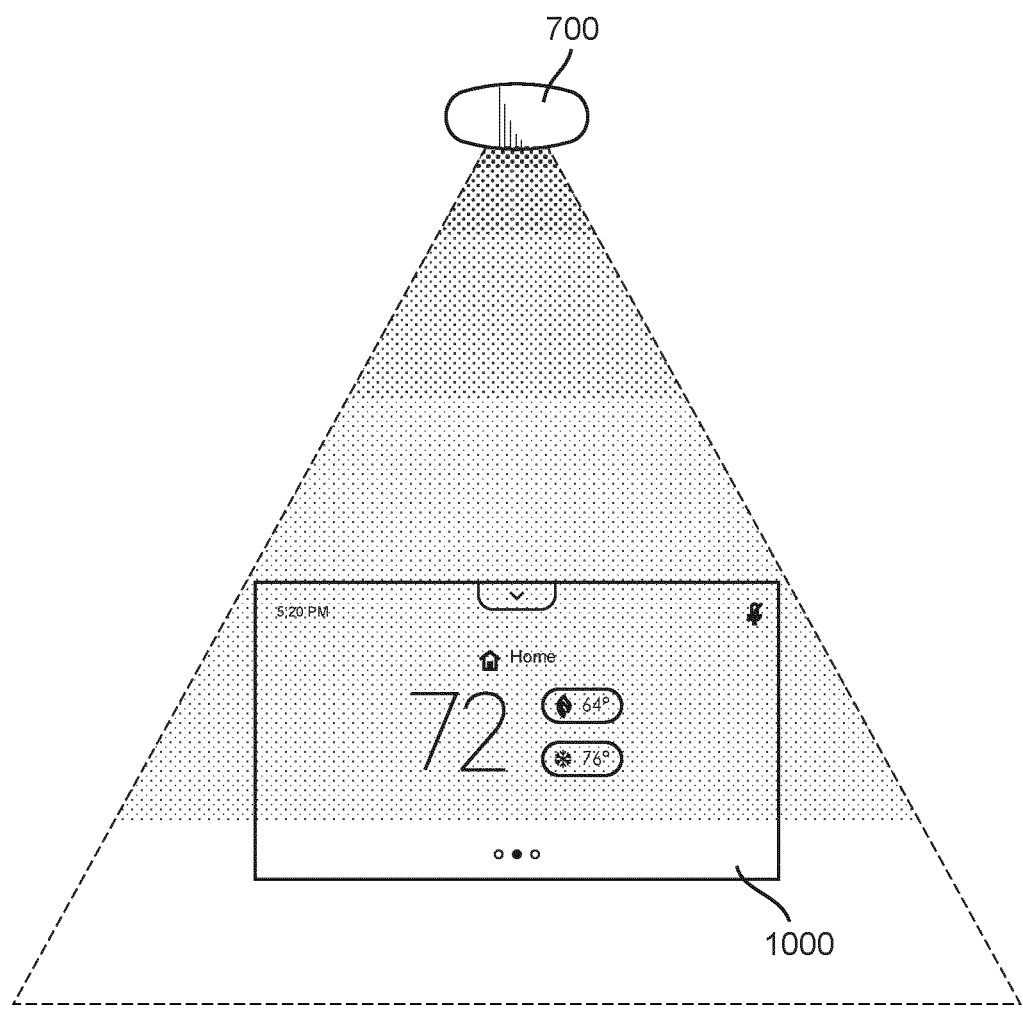
FIG. 10 is another perspective schematic drawing of the headless thermostat of FIG. 7 projecting a color display, according to an exemplary embodiment.

Referring now to FIG. 10, the headless thermostat 700 is shown projecting a display 1000, according to an exemplary embodiment. The display 1000 includes a different interface configuration than the display 900. Furthermore, the size, shape, and color schemes of the display 1000 and the display 900 are different. The displays 900 and 1000 provide examples of different interface configurations that a user can cause the headless thermostat 700 to utilize. For example, a user can provide input to the headless thermostat 700 indicating a size and/or resolution of a display, a shape (e.g., circular as shown in the display 900 or rectangular as shown in the display 1000), color schemes (e.g., the gray and white as shown in the display 900 or the white, black, blue, red, grey, and orange shown in the display 1000).

Figure 11:
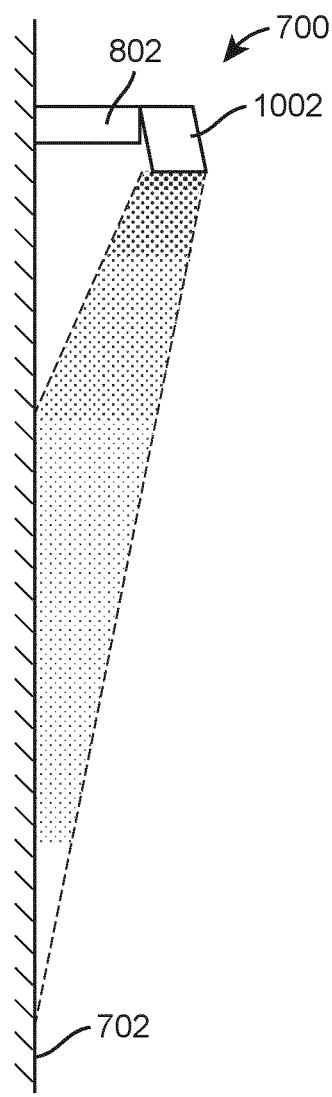
FIG. 11 is a side perspective schematic view of the headless thermostat of FIG. 7 projecting a display, according to an exemplary embodiment.

Referring now to FIG. 11, the headless thermostat 700 is shown to include a projector 1102 projecting a display on the wall 702, according to an exemplary embodiment. The projector 1102 can be a digital light processing (DLP) projector and/or a liquid crystal display (LCD) projector. In some embodiments, the projector 1102 is a Pico projector and/or a pico projector is a primary display source for the headless thermostat 700 (e.g., a DLP based pico projector and/or an LCD based pico projector). In some embodiments, the projector 1102 is integrated with a system on chip (SoC) module configured to control the projector 1102 to project information and/or to receive user interactions with the projected information.

The headless thermostat 700 is shown to project downwards in FIG. 11. However, the headless thermostat 700 can be configured and/or oriented to project in any direction, e.g., sideways horizontally across a wall, upwards onto a wall, upwards onto a ceiling, etc. In some embodiments, there may be display and/or input issues with projecting from bottom to top, in this regard, the headless thermostat 700 can be configured to project top to bottom. In some embodiments, the size of the headless thermostat 700 (or the projector of the headless thermostat 700) may be approximately millimeters.

Figure 12:
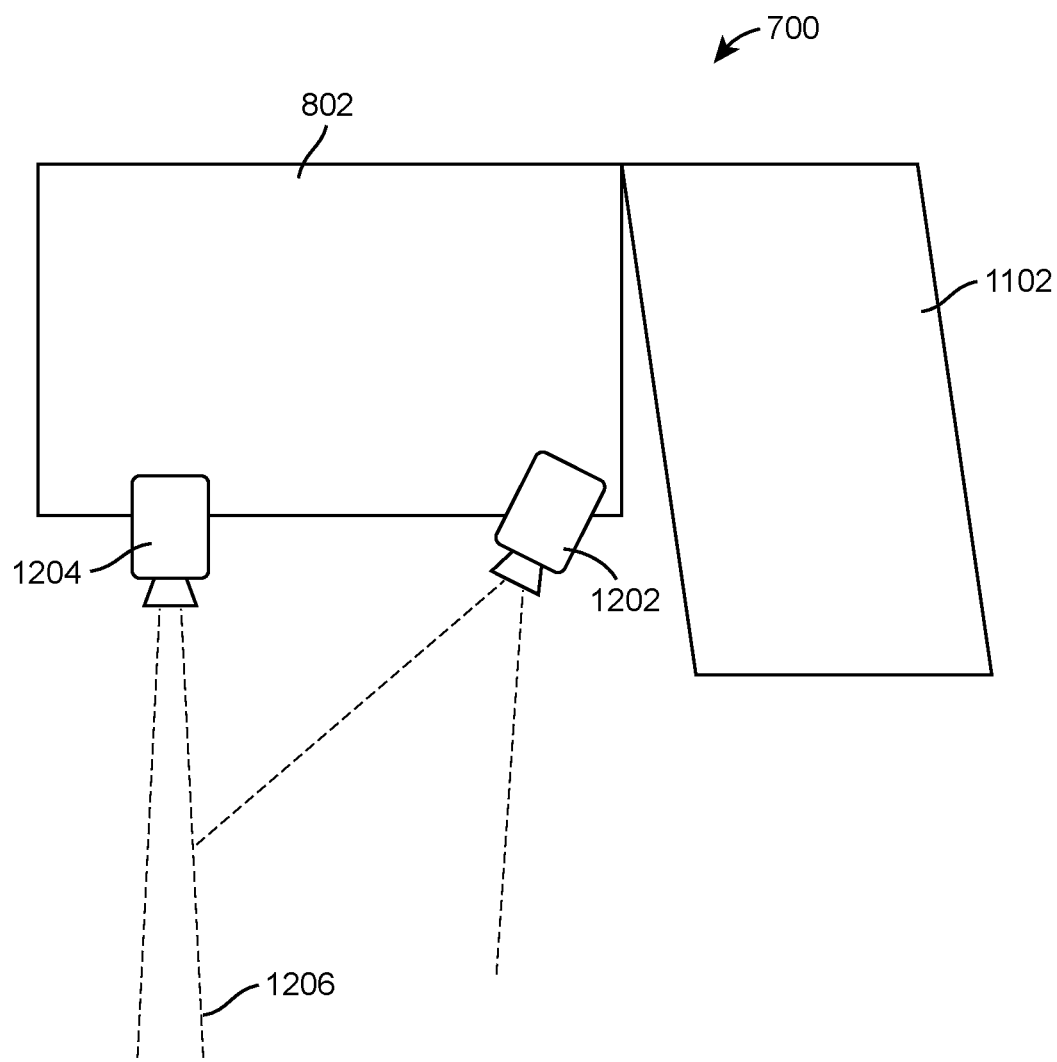
FIG. 12 is a perspective schematic drawing of the headless thermostat of FIG. 7 including a projector and an infrared light source, according to an exemplary embodiment.

Referring now to FIG. 12, the headless thermostat 700 is shown including an infrared (IR) laser projector 1204 and a camera 1202, according to an exemplary embodiment. The laser projector 1204 can be one or multiple infrared (IR) light emitting diodes (LEDs) configured to project an IR plane parallel with and/or onto a display surface (e.g., the wall 702). In some embodiments, the laser projector 1204 is an IR laser with a filter, the filter causing light emitted from the IR laser to form the plane 1206. In some embodiments, the plane is projected parallel with, and/or 1-4 millimeters from, the surface.

If an object such as a pen, pencil, finger, or hand comes into the plane 1206, cutting the plan 1206, the intersection causes a bright spot of IR light to appear at the object. This spot of IR light can be captured by the camera 1202. The headless thermostat 700 can be configured to capture images with the camera 1202 to identify what interface elements (e.g., buttons, switches, sliders, numbers, text, etc.) that are being interacted with (e.g., correlate interaction location with a location on a projected display) and generate updates and/or replace the projected display appropriately.

Utilizing the projector 1102 as an output device together with the IR laser projector 1204 and the camera 1202 provides a human machine interface (HMI) for a user to interact with the headless thermostat 700 where the size of the headless thermostat 700 and/or the size of the display are not constrained. In some embodiments, the SoC module is configured to operate the projectors 1102, the IR laser projectors 1204, and/or the camera 1202 to provide the HMI allowing the external world to interact with the headless thermostat 700 and can be the primary source of data generated to be displayed on the projected screen.

Referring generally to FIGS. 9-12, the projector output and IR input system as described with reference to the headless thermostat 700 can be implemented in any device. Various controllers, actuators, and/or building equipment can utilize the virtual display HMI described with reference to FIGS. 9-12. In the example of a virtual display for the headless thermostat 700, the input can be utilized to perform control or operation of building equipment, e.g., providing temperature setpoints for control of refrigeration systems, airside systems, etc.

Figure 13:
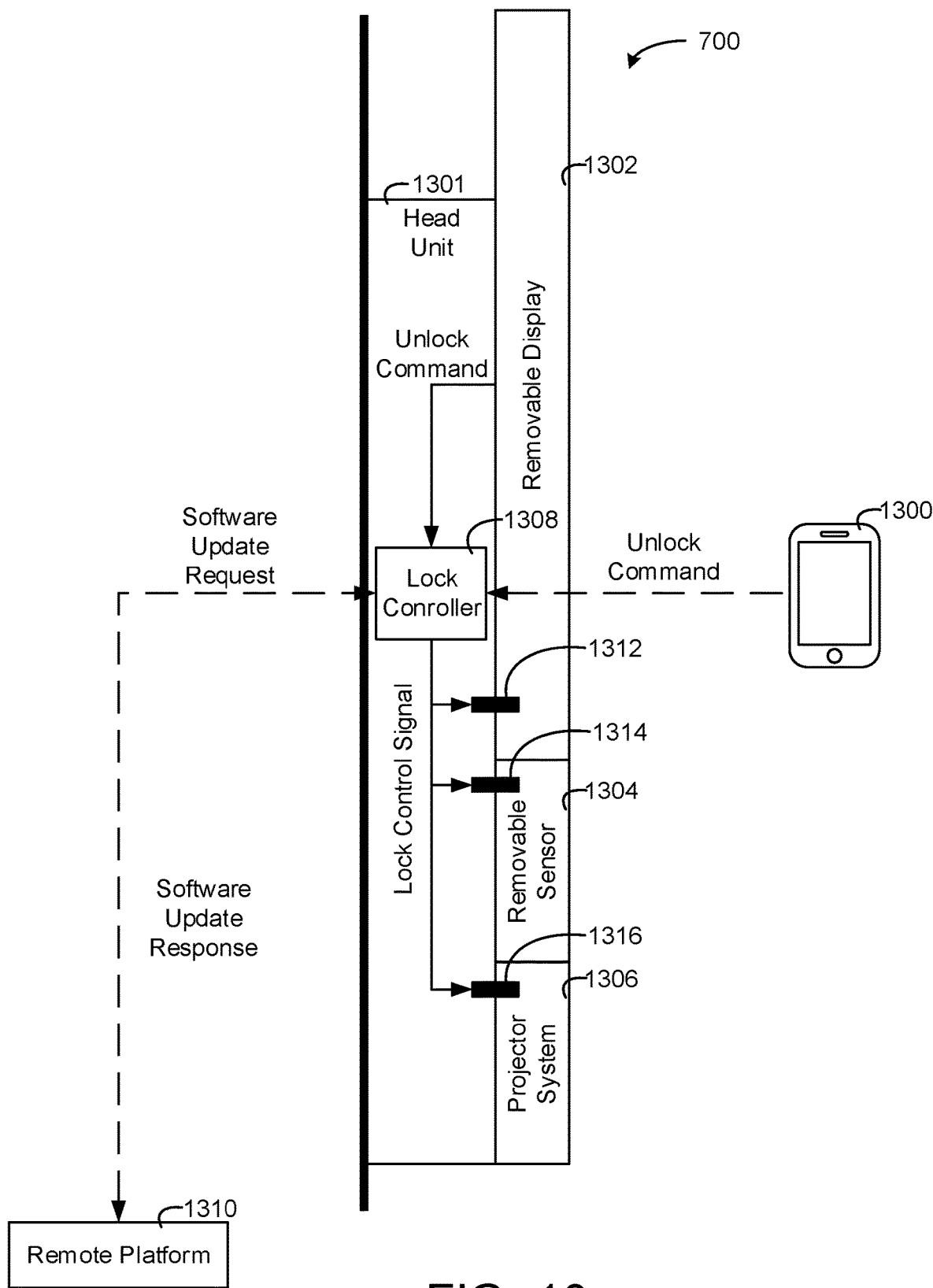
FIG. 13 is a block diagram of the headless thermostat of FIG. 7 including detachable components, according to an exemplary embodiment.

Referring now to FIG. 13, the headless thermostat 700 is shown to include an apparatus for mechanically adding and/or removing components, according to an exemplary embodiment. The various components, e.g., a removable display 1302, a removable sensor 1304, and a projector system 1306, can be connected to a head unit 1301 of the headless thermostat 700 via a magnetic apparatus configured to magnetically attach the removable display 1302, the removable sensor 1304, and/or the projector system 1306 to the head unit 1301.

In some embodiments, the magnetic apparatus can lock the removable display 1302, the removable sensor 1304, and/or the projector system 1306 to the head unit 1301 via a magnetic locking apparatus. The magnetic locking apparatus can include the locks 1312, 1314, and 1316. In some embodiments, the locks are electromagnetic locks, mechanical locks, and/or any other kind of locking system. The locks 1312, 1314, and 1316 can be configured to operate in an open state and/or a close state (or an open position and a closed position when the locks are mechanical locks). The lock controller 1308 can be configured to generate a lock control signal for each of the locks individually and/or all of the locks 1312, 1314, and 1316 together causing the locks to lock or unlock.

The user device 1300 can include any user-operable computing device such as smartphones, tablets, laptop computers, desktop computers, wearable devices (e.g., smart watches, smart wrist bands, smart glasses, etc.), and/or any other computing device. The removable display 1302 may be configured to display images and/or text to a user but may not be configured to receive input from the user. In some embodiments, the removable display 1302 is one or a combination of a CRT display, an LCD display, an LED display, a plasma display, and/or an OLED display.

The removable sensor 1304 can be any kind of environmental sensor configured to sense environmental conditions of an area associated with the headless thermostat 700. The removable sensor 1304 can be a temperature sensor, a humidity sensor, an air quality sensor, and/or any other kind of sensor. In some embodiments, the removable sensor 1304 can be an occupancy sensor, for example, a passive infrared (PIR) sensor, a camera, a microphone, etc. The projector system 1306 can be a projector based input and/or output system configured to project a display screen for the headless thermostat 700 and/or receive user interactions with the projected display screen. For example, the projector system 1306 can be or can include the projector 1102, the camera 1202, and/or the infrared projector 1204.

In response to proper authorization to unlock the removable display 1302, the removable sensor 1304, and/or the projector system 1306, the lock controller 1308 can cause the locking apparatus to unlock allowing the components to be removed. Requiring authorization to unlock and remove components can prevent theft. In some embodiments, the authorization is performed by the lock controller 1308 with a user entering a pin code, transmission of a credential to the headless thermostat 700, and/or via any other authorization process.

The head unit 1301 includes the lock controller 1308. The lock controller 1308 can be a software module and/or physical circuit configured to perform authorization and control of the locking apparatus of components from the head unit 1301. Furthermore, the lock controller 1308 can be configured to retrieve software updates from a remote platform 1310 in response to a new removable component being added to the head unit 1301. In this regard, the headless thermostat 700 can be configured to operate new components that the head unit 1301 does not currently include software required to operate the new components.

The lock controller 1308 can receive an unlock command from the removable display 1302 (via user input) and/or an unlock command from a user device 1300 (via a wireless network, e.g., Wi-Fi, Bluetooth, Zigbee, etc.). The unlock command can be received from the user device 1300 via a network, e.g., the network as described with reference to FIG. 17. The unlock command received from the removable display 1302 may be a request to unlock a particular component (or all components) from the head unit 1301 and/or may include an access credential. For example, a user may define, via a user interface presented to the user via the removable display 1302, which component and/or components the user wishes to remove from the headless thermostat 700. Furthermore, the user may input a password, pin code, or other access credential. The lock controller 1308 is configured to determine whether the user is authorized to remove the component and/or components based on the access credential. In some embodiments, the lock controller 1308 can store, and/or retrieve, an indication of access privileges associated with a particular access credential.

For example, a particular user may have access to remove the removable display 1302 but may not have access to remove the projector system 1306. In this regard, the lock controller 1308 may operate to only allow the removable display 1302 to be removed. The lock controller 1308 can be configured to cause the removable display 1302 to provide an indication that the user is able to remove the removable display 1302 but not the projector system 1306 in response to the determination.

The lock controller 1308 is configured to receive an indication of a new component being added to the headless thermostat 700, in some embodiments. The lock controller 1308 can be configured to receive the indication, which may identify a part number and/or other identifier, from a user via the removable display 1302 (via user input) and/or the user device 1300 (via a wireless connection). In some embodiments, the indication can be received directly from the new component. In response to the reception of the indication of the new component, the lock controller 1308 can be configured to determine whether the headless thermostat 700 stores and/or is operating software required to operate the new component. In response to determining that the headless thermostat 700 does not include software necessary to operate the new component, the lock controller 1308 is configured to send a software update request the remote platform 1310. The request may identify a required software update and/or may provide a model identifier, current software version, and/or the indication of the new component.

The remote platform 1310 can be and/or can include, one or more servers configured to receive software update requests and in response to a reception of the software update requests, send the software updates to the requesting device (e.g., the headless thermostat 700). The remote platform 1310 can include one or more software version and/or software update repositories stored in various databases. The remote platform 1310 can be, and/or can include, MICROSOFT AZURE, AMAZON WEB SERVICES, and other similar remote cloud computing systems.

Figure 14:
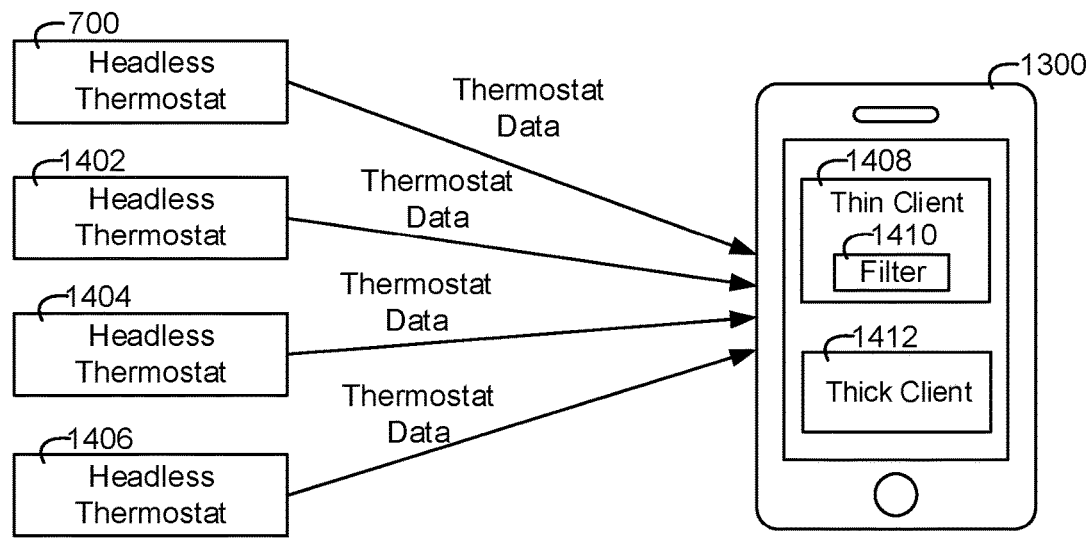
FIG. 14 is a block diagram of the headless thermostat of FIG. 7 and a user device including a thin client performing thermostat data filtering and a thick client performing thermostat data assembly, according to an exemplary embodiment.
Figure 15:
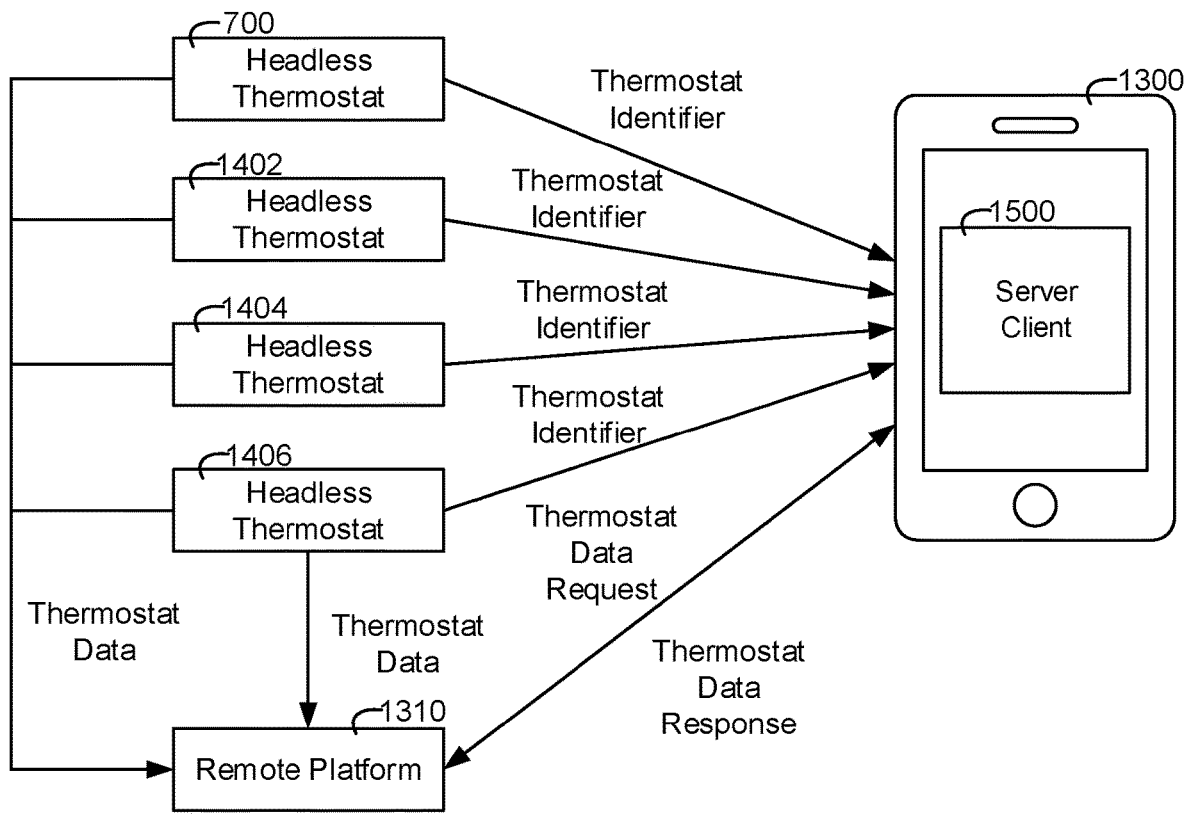
FIG. 15 is a block diagram of the headless thermostat of FIG. 17 and the user device of FIG. 14 retrieving thermostat data from a remote platform based on thermostat identifiers, according to an exemplary embodiment.

Referring now to FIGS. 14-15, the headless thermostat 700 and headless thermostats 1402-1406 are show wirelessly broadcasting data to the user device 1300, according to an exemplary embodiment. The headless thermostat 700 and/or the headless thermostats 1402-1406 can be configured to wirelessly broadcast data via a wireless data communication protocol to nearby devices, e.g., the user device 1300. In some embodiments, the wireless broadcast range of the headless thermostat 700 and/or the headless thermostats 1402-1406 is approximately six feet but may be a longer range and/or a shorter range (e.g., up to 230 feet). In some embodiments, the headless thermostat 700 and/or the headless thermostats 1402-1406 include a wireless radio (e.g., a transmitter, a receiver and/or a transceiver) configured to broadcast the wireless data.

In some embodiments, wireless protocol for broadcast is a Bluetooth protocol. For example, the headless thermostats 700 and/or the headless thermostats 1402-1406 can act as Bluetooth beacons, e.g., Bluetooth low energy beacons. In some embodiments, the headless thermostat 700 and/or the headless thermostats 1402-1406 can be Eddystone beacons, AltBeacons, GeoBeacons, and/or any other type of wireless beacon. The data broadcast by the headless thermostat 700 can be metadata, equipment model data, and/or operational thermostat data. While the beacons in FIGS. 14-15 are shown to be thermostats, the beacons can be smart valves, smart actuators, field controller, sensors, etc.

Referring now to FIG. 14, the headless thermostat 700 and the headless thermostats 1402-1406 are shown broadcasting thermostat data to the user device 1300, according to an exemplary embodiment. The thermostat data can indicate measured environmental conditions, current setpoints, current operating schedules, fault data, historical logs of operation control decisions, etc. In some embodiments, the thermostat data from all and/or some of the headless thermostats 700 and 1402-1406 is received by the user device 1300. In some embodiments, the user device 1300 includes a thin client 1408 and/or a thick client 1412. The thin client 1408 can be configured to filter the received thermostat data received from the headless thermostat 700 and/or the headless thermostats 1402-1406 based on filter parameters of a filter 1410. Furthermore, in some embodiments, the thick client 1412 can be configured to reconstruct full messages received form the headless thermostat 700 and/or the headless thermostats 1402-1406.

In the event that the user device 1300 receives thermostat data from thermostats of multiple zones, e.g., the headless thermostat 700 and/or the headless thermostats 1402-1406, the thin client 1408 can be configured to implement filtering via the filter 1410 of the thin client 1408. For example, the filter 1410 can be configured to filter out data of signals below a predefined signal strength, filter out all but the highest signal (transmissions of the closes headless thermostat), filter out all transmissions but an approved access list of headless thermostats, filter out particular zones, filter out all but a particular and/or a particular set of zones, etc.

When transmitting data for reception by the thin client 1408, a significant amount of power may be used. To reduce the amount of power consumed by the headless thermostat 700 and/or the headless thermostats 1402-1406, the headless thermostat 700 and/or the headless thermostats 1402-1406 can divide the thermostat data into multiple different small packages and emit the different small packages one by one at a particular time period. The thick client 1412 can be configured to receive the packages overtime and reconstruct (assemble) the thermostat data on the user device 1300. This can realize lower energy usage since the amount of time transmitting information can be reduced by headless thermostats 700 and/or the headless thermostats 1402-1406.

Referring now to FIG. 15, the headless thermostat 700 and the headless thermostats 1402-1406 are shown to emit thermostat identifiers to the user device 1300 allowing the user device 1300 to retrieve thermostat data from the remote platform 1310, according to an exemplary embodiment. The headless thermostat 700 and/or the headless thermostats 1402-1406 can be configured to broadcast thermostat identifiers. The identifiers can identify a thermostat by a name and/or number. In some embodiments, the identifiers indicate a particular zone that the thermostats are located in. In some embodiments, the identifier can provide an indication of a location of thermostat data for that thermostat, e.g., a URL address or other data identifying location based value and/or string. Each of the headless thermostat 700 and/or the headless thermostats 1402-1406 can be configured to communicate thermostat data to the remote platform 1310. In some embodiments, the thermostat data is the same as the thermostat data as described with reference to FIG. 14.

The user device 1300 includes a server client 1500. In response to receiving a thermostat identifier from one of the headless thermostat 700 and/or the headless thermostats 1402-1406, the server client 1500 can be configured to trigger an authentication with the remote platform 1310 for the particular thermostat and/or request thermostat data associated with the thermostat identifier. In some embodiments, the server client 1500 can pair with one of the headless thermostats 700 and/or the headless thermostats 1402-1406 and request thermostat data from the paired thermostat. In response to being paired with the thermostat, the server client 1500 can further provide control over the thermostat and/or operating parameters of the thermostat to a user.

In some embodiments, the server client 1500 retrieves thermostat data for the thermostat from the remote platform 1310 based on the identifier. The server client 1500 can connect to a thermostat via the remote platform 1310 and provide control settings and/or review environmental conditions of the thermostat. The remote platform 1310 can provide the control settings received from the server client 1500 to the appropriate headless thermostat.

Figure 16:
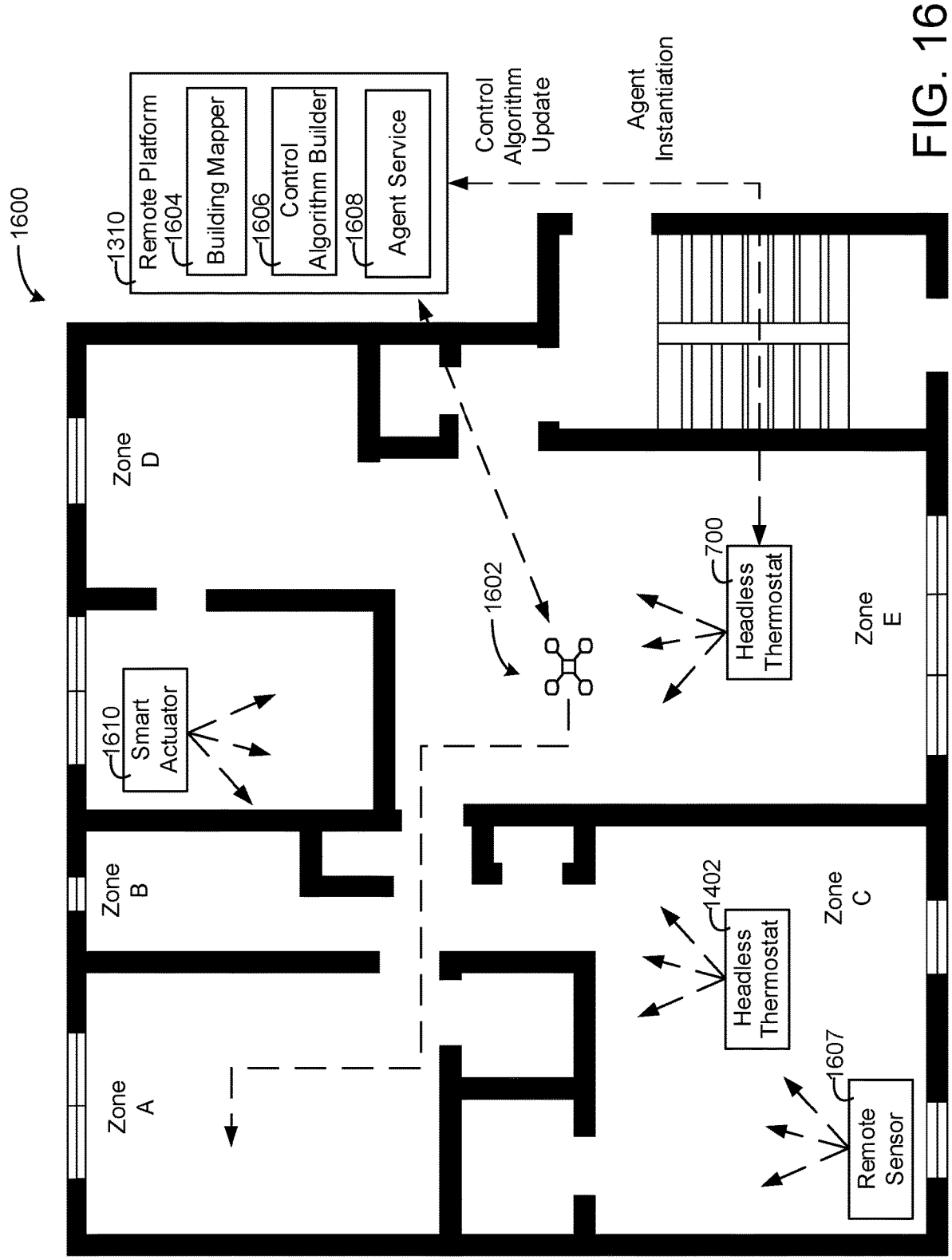
FIG. 16 is a schematic block diagram of a building floor including the headless thermostat of FIG. 7 and other building devices emitting wireless signals sensed by a drone, according to an exemplary embodiment.

Referring now to FIG. 16, a floor 1600 of a building is shown including multiple different wireless beacon devices broadcasting messages to a drone 1602. The floor 1600 can be a floor of a building, e.g., the building 10 as described with reference to FIG. 1 and/or the residence 502 as described with reference to FIG. 5. The floor 1600 can include various zones, Zones A-D, and equipment within the zones. The equipment can include the headless thermostat 700, a remote sensor 1607, and a smart actuator 1610. The equipment can broadcast information the same as and/or similar to the beacon broadcasts as described with reference to FIGS. 14-15.

The drone 1602 is configured to navigate the floor 1600 (or an entire building) and detect and/or receive the broadcasts of the headless thermostat 700, the smart actuator 1610, and the remote sensor 1607. The drone 1602 can include a receiver, a transmitter, and/or a transceiver. The drone 1602 can communicate the received broadcasts, position data of the drone, and/or signal strengths of the received broadcasts to the remote platform 1310. The remote platform 1310 can collect the data from the drone 1602 to generate building maps, generate equipment settings, generate building configurations, instantiate agent control and/or learning, auto associate equipment, etc. In some embodiments, the remote platform 1310 can be configured to generate representations of associations and/or relationships between the various pieces of equipment in FIG. 16, e.g., a graph database. Based on the mapping and/or discovered relationships, the remote platform 1310 can be configured to enhance the operation of the equipment of the floor 1600.

The remote platform 1310 can include a building mapper 1604, a control algorithm building 1606, and an agent service 1608. The building mapper 1604 can be configured to receive the data from the drone 1602 and construct one or more data structures representing locations and/or types of the equipment detected by the drone 1602. In some embodiments, the data structures can indicate locations of the equipment, zones that the equipment are located within, and/or any other information. The building mapper 1604 can be configured to generate a view of the floor 1600 by overlaying a building map stored by the building mapper 1604 with locations of the equipment detected based on signal strengths detected by the drone 1602 and/or based on a location of the drone 1602 at the time that the signal strength was detected.

In some embodiments, the building mapper 1604 generates a graph database representing the detected equipment with nodes and relationships between the nodes with edges. In some embodiments, the graph database representation is a BRICK representation and/or a Smart Entity graph database. Examples of a BRICK database are described in greater detail in U.S. Provisional Patent Application No. 62/751,926 filed Oct. 29, 2018, the entirety of which is incorporated by reference herein. Examples of a Smart Entity graph database are described in greater detail in U.S. patent application Ser. No. 16/048,052 filed Jul. 27, 2018, the entirety of which is incorporated by reference herein.

In some embodiments, the building mapper 1604 can infer relationships between entities. For example, a building map may indicate multiple zones within a building, e.g., the Zone C. If the headless thermostat 1402 is detected to be located in the Zone C based on the data collected by the drone 1602, the building mapper 1604 can infer a relationship between the headless thermostat 1402 and the Zone C. Furthermore, if based on the data collected by the drone 1602, the remote platform 1310 determines that the remote sensor 1607 is located in close proximity (e.g., within a predefined distance) of the headless thermostat 1402, the building mapper 1604 can be configured to determine that the remote sensor 1607 communicates measured conditions to the headless thermostat 1402.

The control algorithm building 1606 can be configured to utilize the building mapping and data structures generated by the building mapper 1604 to generate control algorithms that improve or optimize the performance of equipment of the building floor 1600. For example, if the building mapper 1604 determines that the remote sensor 1607 and the headless thermostat 1402 are both located within the same zone, Zone C, the control algorithm building 1606 can generate a control algorithm that the headless thermostat 1402 to operate with where measurements of the remote sensor 1607 are used as inputs. Entire control algorithms can be generated for and/or communicated to, the headless thermostat 1402 and/or the headless thermostat 700 or algorithm updates can be generated for and/or communicated to the headless thermostat 1402 and/or the headless thermostat 700.

In some embodiments, in response to detecting equipment and/or equipment systems, the agent service 1608 can be configured to generate and/or instantiate agents. The agents can be logical representations of the devices and can perform machine learning to determine operations, settings, and/or control schemes for improving the performance of the equipment. In some embodiments, the agent service 1608 can instantiate layers of agents, e.g., agents for a heating system, agents for a thermostat of the heating system, etc. The agents can be implemented and run on the remote platform 1310 and/or provided to the equipment of the floor 1600 to operate locally on the floor 1600.

Figure 17:
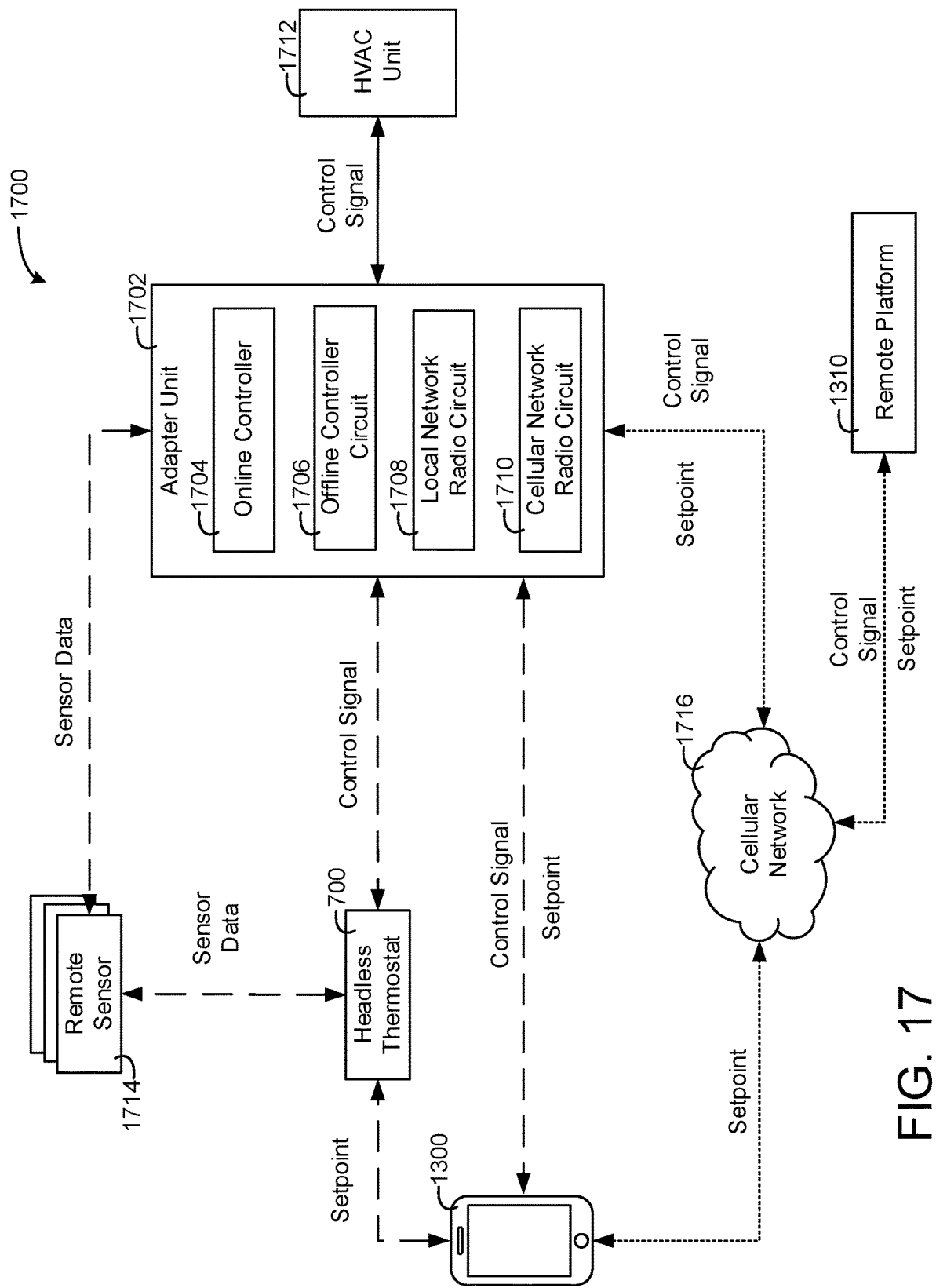
FIG. 17 is a block diagram of the headless thermostat of FIG. 7 wirelessly communicating with an adapter unit for HVAC equipment, according to an exemplary embodiment.

Referring now to FIG. 17, a system 1700 including the headless thermostat 700 as described with reference to FIG. 7 and an adapter unit 1702 for interfacing the headless thermostat 700 with an HVAC unit 1712 is shown, according to an exemplary embodiment. The headless thermostat 700 may wirelessly communicate with devices of the system 1700 and/or may not be configured to, or may not be able to (there may not be communication wires present where the headless thermostat 700 is installed), communicate with the HVAC unit 1712. In some embodiments, the headless thermostat 700 is configured to communicate wirelessly via a network, with the adapter unit 1702.

The HVAC unit 1712 can be equipment configured to heat and/or cool a building. For example, the HVAC unit 1712 can be the indoor unit 504 and/or the outdoor unit 506 as described with reference to FIG. 6. The headless thermostat 700 can wirelessly provide a control signal to the adapter unit 1702 which the adapter unit 1702 can be configured to utilize to operate the HVAC unit 1712. The headless thermostat 700 can utilize a sensed temperature, sensed by the headless thermostat 700 or by another sensor, e.g., sensor data received wirelessly from the remote sensors 1714, and generate a control decision for the HVAC unit 1712. The decision may be to turn on one or multiple heating or cooling stages, turn on or off a fan, etc. The adapter unit 1702 can be configured to receive the commands and operate the HVAC unit 1712.

In some embodiments, the adapter unit 1702 can receive the sensor data from the remote sensors 714 (or the headless thermostat 700) and/or a setpoint from the user device 1300. In this regard, the adapter unit 1702 can be configured to generate control decisions and operate the HVAC unit 1712 based on the control decisions.

Since the headless thermostat 700 includes no display, a user can provide a setpoint or other operating setting to the headless thermostat 700 wirelessly via the user device 1300. Furthermore, the user device 1300 can provide the setpoint and/or other operating setting to the remote platform 1310 via a cellular network 1716 and/or via any other kind of wireless and/or wired communication. The remote platform 1310 can be configured to process the setpoint and/or any other environmental data collected by the headless thermostat 700 and/or the remote sensor 1714 and generate control decisions for operating the HVAC unit 1712. The remote platform 1310 can be configured to communicate the control decisions to the adapter unit 1702 and the adapter unit 1702 can be configured to implement the control decisions by operating the HVAC unit 1712.

The adapter unit 1702 includes an online controller 1704, an offline controller circuit 1706, a local network radio circuit 1708, and a cellular network radio circuit 1710. FIG. 17 is shown to include dashed and dotted lines between the devices of the system 700. The dashed lines may indicate a building network which may or may not have access to an external network e.g., the Internet. The building network may be a Wi-Fi network, a wired Ethernet network, a Zigbee network, a Bluetooth network, and/or any other wireless network. The building network may be a local area network or a wide area network (e.g., the Internet, a building WAN, etc.) and may use a variety of communications protocols (e.g., BACnet, IP, LON, etc.). The building network may include routers, modems, and/or network switches. Furthermore, the network may be a combination of wired and wireless networks. The dotted liens indicate communication with a cellular network 1716. The cellular network 1716 may be separate from the building network and may be a network for 2G, 3G, 4G, 5G, wireless communication. The local network radio circuit 1708 can be configured to cause the adapter unit 1702 to communicate via the building network while the cellular network radio circuit 1710 can be configured to cause the adapter unit 1702 to communicate via the cellular network 1716.

The online controller 1704 can be configured to control the HVAC unit 1712 when the adapter unit 1702 is online, i.e., it is connected to the building network. The online controller 1704 can be configured to implement control signals received from the headless thermostat 700, control signals determined by and received from the user device 1300, and/or control signals determined by and/or received from the remote platform 1310. Furthermore, the online controller 1704 can be configured to generate control signals based on sensor data and/or operating parameters (e.g., setpoints) received from the remote sensor 1714, the headless thermostat 700, the user device 1300, and/or the cellular network 1716 (e.g., the remote platform 1310).

The offline controller circuit 1706 can be configured to act as a logic backup when the building network and/or the cellular network 716 and/or the cellular network radio circuit 1710 is not operating properly or is not present. The offline controller circuit 1706 can include control logic for operating the HVAC unit 1712 even when the adapter unit 1702 cannot communicate with the headless thermostat 700 and/or the user device 1300 via the building network and receive control signals, setpoints, and/or environmental measurements. The offline controller circuit 1706 can include a local temperature sensor and can be digital and/or a hardwired circuit configured to keep the HVAC unit 1712 operating a building at safe and/or comfortable environmental conditions.

In some embodiments, in response to the building network failing, the adapter unit 1702 can be configured to communicate with the cellular network 1716 to receive control signals, setpoints, and/or environmental conditions for operating the HVAC unit 1712. The cellular network radio circuit 1710 can be a data metered device such that only when the cellular network radio circuit 1710 is communicating with the cellular network 1716 does a cellular network provider incur costs. In this regard only in the event of an emergency may the cellular network radio circuit 1710 be operated by the offline controller circuit 1706 to collect data required to operate the HVAC unit 1712. In some embodiments, the offline controller circuit 1706 receives an outdoor ambient temperature from the remote platform 1310 via the cellular network 1716 via the cellular network radio circuit 1710 and performs and estimation of an indoor temperature based on a length of known time that the HVAC unit 1712 has been operating and at what operating parameters. Based on the estimate, the offline controller circuit 1706 can operate the HVAC unit 1712 to be at a comfortable (e.g., at a setpoint) or safe environmental condition.

Furthermore, in the event of an outage of the building network, the user device 1300 can provide control signals, setpoints, and/or temperature measurements to the adapter unit 1702 directly, e.g., via adhoc communication and/or via the cellular network 1716. This realizes dual paths of communication in case of a wireless network outage, e.g., Wi-Fi outage (e.g., router failure). For example, the user device 1300 can provide a setpoint directly to the adapter unit 1702 or can provide the setpoint to the remote platform 1310 which can in turn communicate the setpoint to the adapter unit 1702 via the cellular network 1716. In some embodiments, the adapter unit 1702 is included directly with the HVAC unit 1712 so that the devices of the system 1700 can communicate directly with the HVAC unit 1712. In some embodiments, the adapter unit 1702 is separate from the HVAC unit 1712 is connected to the HVAC unit 1712 via one or more physical control wires.

Figure 18:
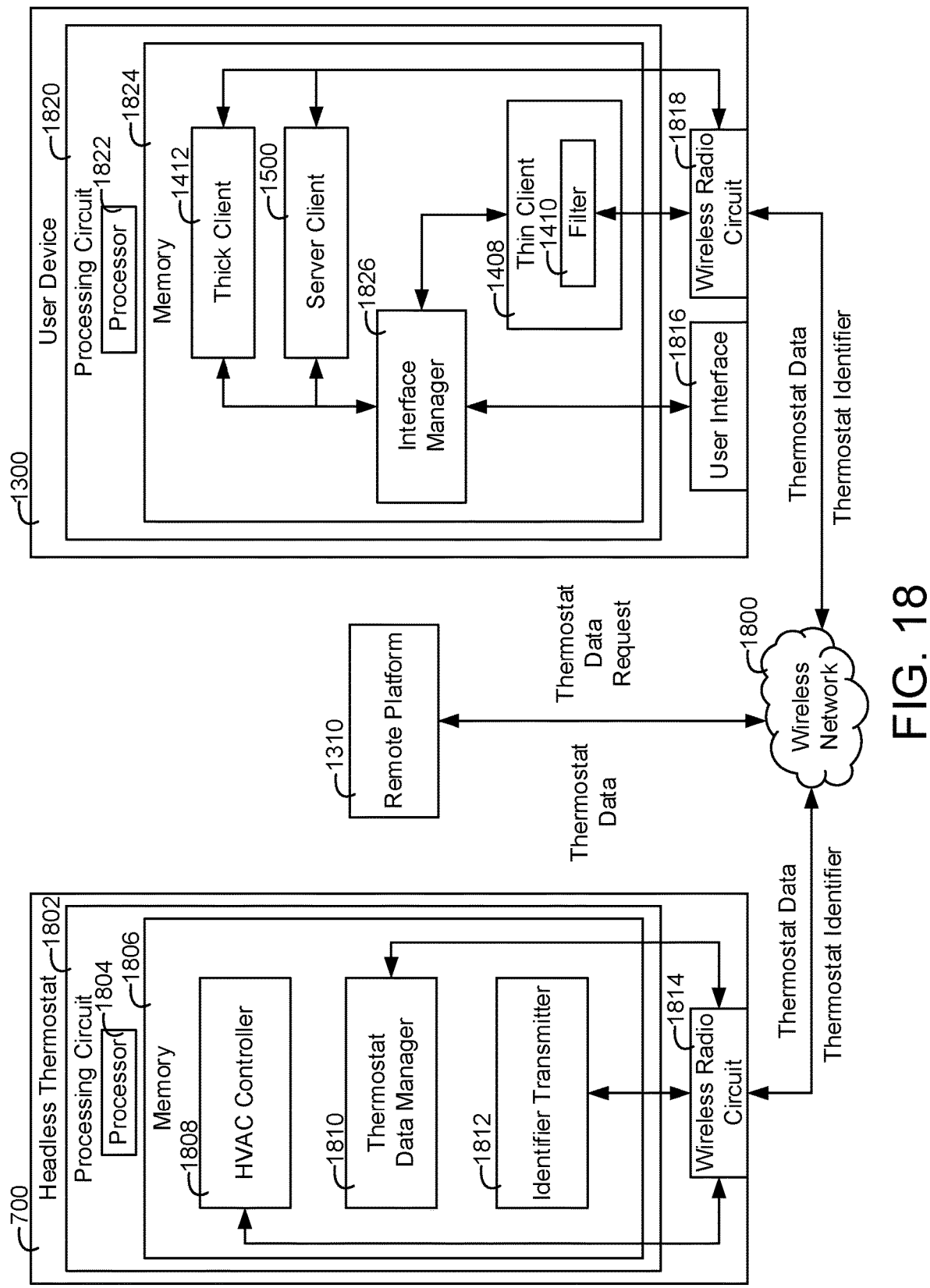
FIG. 18 is a block diagram of the headless thermostat of FIG. 7 and the user device of FIGS. 14-15 in greater detail, according to an exemplary embodiment.

Referring now to FIG. 18, the headless thermostat 700 and the user device 1300 are shown in greater detail to implement collection and display of thermostat data, according to an exemplary embodiment. The headless thermostat 700 includes a processing circuit 1802, a processor 1804, and a memory 1806. The processor 1804 can be a general purpose or specific purpose processor, an application specific integrated circuit (ASIC), one or more field programmable gate arrays (FPGAs), a group of processing components, or other suitable processing components. The processor 1804 may be configured to execute computer code and/or instructions stored in the memory 1806 or received from other computer readable media (e.g., CDROM, network storage, a remote server, etc.).

The memory 1806 can include one or more devices (e.g., memory units, memory devices, storage devices, etc.) for storing data and/or computer code for completing and/or facilitating the various processes described in the present disclosure. The memory 1806 can include random access memory (RAM), read-only memory (ROM), hard drive storage, temporary storage, non-volatile memory, flash memory, optical memory, or any other suitable memory for storing software objects and/or computer instructions. The memory 1806 can include database components, object code components, script components, or any other type of information structure for supporting the various activities and information structures described in the present disclosure. The memory 1806 can be communicably connected to processor 1804 via the processing circuit 1802 and can include computer code for executing (e.g., by the processor 1804) one or more processes described herein.

The user device 1300 is shown to include a processing circuit 1820. The processing circuit 1820 may be the same as and/or similar to the processing circuit 1802. Furthermore, the processing circuit 1820 includes a processor 1822 and a memory 1824. The processor 1822 may be the same as and/or similar to the processor 1804. Furthermore, the memory 1824 may be the same as and/or similar to the memory 1806.

The memory 1806 is shown to include an HVAC controller 1808. The HVAC controller 1808 is configured to operate building equipment (e.g., the HVAC unit 1712), in some embodiments. The HVAC controller 1808 is configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control the building equipment. The control decisions determined by the HVAC controller 1808 can be transmitted to the building equipment via the wireless radio circuit 1814. In some embodiments, the wireless radio circuit 1814 includes one or more receivers, transceivers, and/or transmitters and can communicate with building equipment (e.g., with the adapter unit 1702).

The memory 1806 can include a thermostat data manager 1810. The thermostat data manager 1810 is configured to collect data for the headless thermostat 700 (e.g., sensor measurements of the headless thermostat 700, e.g., temperature, humidity, air quality, etc.). The thermostat data manager 1810 can further be configured to collect operational data (e.g., control decisions, fault data, etc.) and/or settings (e.g., received setpoints).

The thermostat data manager 1810 is configured to transmit thermostat data to the wireless network 1800 via the wireless radio circuit 1814. The thermostat data may be any of the data collected by the thermostat data manager 1810. In some embodiments, the thermostat data manager 1810 periodically transmits the thermostat data to the wireless network 1800. In some embodiments, the thermostat data manager 1810 transmits thermostat data in response to receiving a confirmation indication for the user device 1300 indicating that the user device 1300 is present and communicating via the wireless network 1800.

In some embodiments, the thermostat data manager 1810 divides the thermostat data into multiple packages. The thermostat data manager 1810 can be configured to broadcast the packages one at a time at a predefined interval. In this regard, the user device 1300 can listen for the broadcast, collect the packages, and reconstruct the original thermostat data. The memory 1806 includes an identifier transmitter 1812. The identifier transmitter 1812 can be configured to cause the wireless radio circuit 1814 to transmit a unique identifier by broadcasting the identifier. The unique identifier can be broadcast by the identifier transmitter 1812 at a predefined interval. In some embodiments, the user device 1300 utilizes the identifier to communicate with the remote platform 1310 to authenticate with the remote platform and/or retrieve thermostat data of the headless thermostat 700. The thermostat data manager 1810 can be configured to send the thermostat data to the remote platform 1310 via the wireless network 1800. The remote platform 1310 can be configured to store the wireless data associated with the identifier of the headless thermostat 700 and provide the thermostat data to the user device 1300 upon request.

The memory 1824 includes the thick client 1412, the server client 1500, the thin client 1408, the filter 1410, and an interface manager 1826. The thick client 1412 can be configured to receive the thermostat data broadcast by the headless thermostat 700 on the wireless network 1800 over time and reconstruct the original package deconstructed by the headless thermostat 700. The thin client 1408 includes the filter 1410 which can filter data broadcast by multiple different headless thermostat.

The user device 1300 includes a user interface 1816. The user interface 1816 is one or a combination of a CRT display, an LCD display, an LED display, a plasma display, and/or an OLED display. The user interface 1816 can be a capacitive touch screen display and/or a resistive touch screen display. The memory 1824 is shown to include an interface manager 1826 configured to receive the thermostat data from the thick client 1412, the server client 1500, and/or the thin client 1408. Based on the received data, the interface manager 1826 can be configured to generate an interface and cause the user interface 1816 to display the interface. In some embodiments, the interface allows for input of various setpoint and/or setting changes. The interface manager 1826 can cause the wireless radio circuit 1818 to transmit the setpoint and/or setting changes to the headless thermostat 700. The headless thermostat 700 can receive the setpoint and/or setting changes and operate based on the received data.

Figure 19:
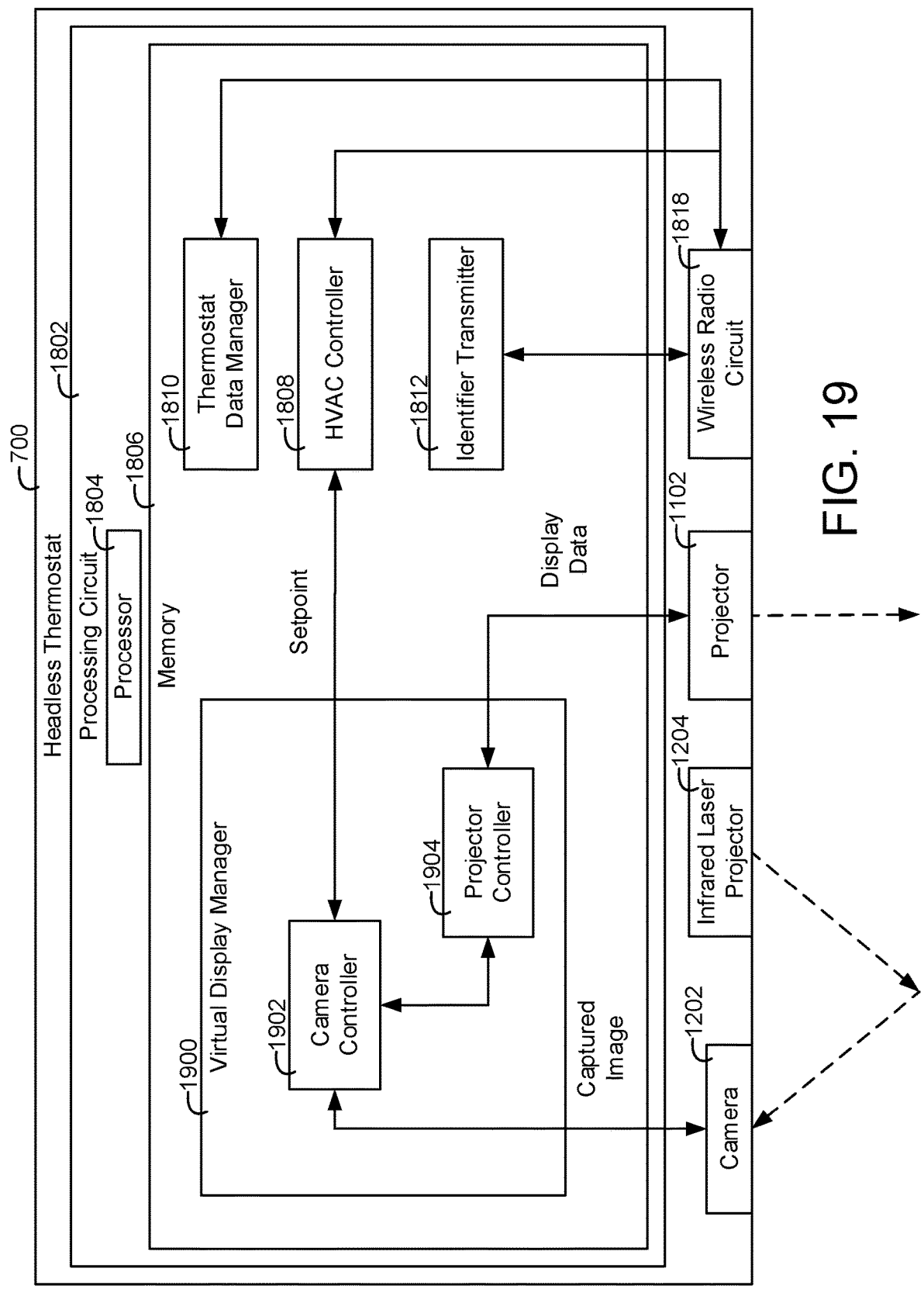
FIG. 19 is a block diagram of the headless thermostat of FIG. 7 shown in greater detail including the projector and the infrared light source of FIG. 12, according to an exemplary embodiment.

Referring now to FIG. 19, a block diagram of the headless thermostat 700 including the projector 1102, the infrared laser projector 1204, and the camera 1202 is shown, according to an exemplary embodiment. The headless thermostat 700 is shown to include the processing circuit 1802, the processor 1804, the memory 1806, and the wireless radio circuit 1818 as described with reference to FIG. 18. The memory 1806 of the headless thermostat 700 is shown to include the thermostat data manager 1810, the identifier transmitter 1812, and the HVAC controller 1808 as described with reference to FIG. 18.

The memory 1806 includes a virtual display manager 1900. The virtual display manager 1900 is configured to operate the projector 1102 as described with reference to FIG. 11. Furthermore, the virtual display manager 1900 is configured to operate the infrared laser projector 1204 and/or the camera 1202 as described with reference to FIG. 12. The virtual display manager 1900 includes camera controller 1902 and a projector controller 1904.

The projector controller 1904 can be configured to cause the projector 1102 to project various interfaces on a surface. In some embodiments, the projector controller 1904 can be configured to cause the projector 1102 to display animations. In some embodiments, the projector controller 1904 is configured to receive indications to change and/or update a projected interface from the camera controller 1902. The camera controller 1902 can provide the projector controller 1904 with an indication of a user interaction. Based on the user interaction, the projector controller 1904 can adjust a displayed interface and/or replace the displayed interface with a new interface. In some embodiments, the indication of the interaction may include a location on the interface that the interaction has occurred and what the nature of the interaction is, e.g., whether it is a screen press, a swipe, etc.

In some embodiments, the projector controller 1904 receives an indication of an interface shape, an interface size, an interface color scheme, an interface text size, and/or any other user preferred configuration from the camera controller 1902, the indication input by a user by interacting with a projected interface and detected by the camera 1202. In response to receiving the customization parameters, the projector controller 1904 can be configured to operate the projector 1102 to display the user interface based on the customization parameters, e.g., change the size, shape, and/or color scheme of the displayed interface.

The camera controller 1902 can be configured to receive captured images from a camera 1202. In some embodiments, the camera 1202 is an infrared based camera configured to capture images indicating varying intensities of infrared light. Since the infrared laser projector 1204 projects infrared light, if the light is reflected off an object (e.g., a finger of a person interacting with the interface projected by the projector 1102), the images captured by the camera 1202 may indicate the location of the interaction since the infrared light may be reflected by the object. In some embodiments, the infrared laser projector 1204 includes a filter configured to cause a laser beam to be projected as a plane parallel with a surface that the projector 1102 projects the interface onto.

Since the infrared plan is parallel with the interface and images of the infrared plane are captured by the camera 1202, if a user interacts with the interface, infrared light can be reflected at that point. Based on the infrared intensities detected by the camera 1202, a correspondence can be determined between the interaction of the image and the interface. The camera controller 1902 can be configured to process the images of the camera 1202 to identify interaction location son the interface and/or interaction types, e.g., button pushes, swipes, etc.

Figure 20:
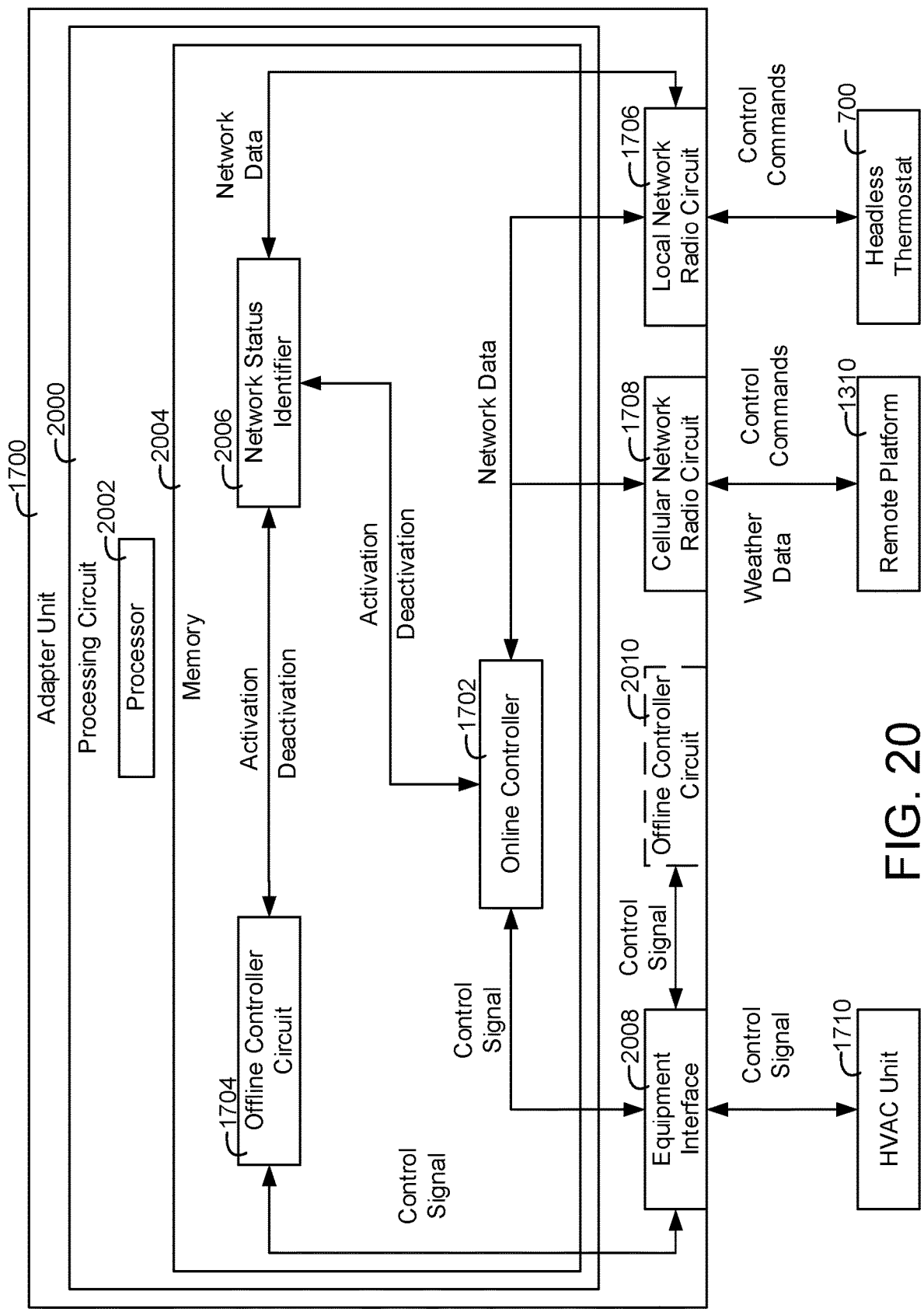
FIG. 20 is a block diagram of the adapter unit of FIG. 17 shown in greater detail, according to an exemplary embodiment.

Referring now to FIG. 20, the adapter unit 1702 as described with reference to FIG. 17 is shown in greater detail, according to an exemplary embodiment. The adapter unit 1702 includes a processing circuit 2000, a processor 2002, and a memory 2004 which may be the same as and/or similar to the processing circuit 1802, the processor 1804, and the memory 1806 as described with reference to FIG. 19. The memory 2004 includes the offline controller circuit 1706 and the online controller 1704 as described with reference to FIG. 17. Furthermore, the adapter unit 1702 includes the offline controller circuit 1706 as described with reference to FIG. 17. The adapter unit 1702 is shown to include the cellular network radio circuit 1710 and the local network radio circuit 1706 as described with reference to FIG. 17.

The memory 2004 includes a network status identifier 2006. The network status identifier 2006 is configured to determine whether a network communicated with via the local network radio circuit 1706 is active. Furthermore, the network status identifier 2006 can determine whether the headless thermostat 700 is connected to the network and/or is otherwise communicating with the adapter unit 1702. The network status identifier 2006 can be configured to activate and/or deactivate the offline controller circuit 1706 and the online controller 1704. In response to determining that the network is not active, the network status identifier 2006 can be configured to deactivate the online controller 1704 and activate the online controller 1704. In response to determining that the network is active, the network status identifier can be configured to activate the online controller 1704 and deactivate the online controller 1704.

The online controller 1704, when activated, can be configured to receive control commands form the headless thermostat 700. Based on the control commands, the online controller 1704 can be configured to operate the HVAC unit 1712 as described with reference to FIG. 17 via the equipment interface 2008. The equipment interface 2008 may physically connected the adapter unit 1702 to the HVAC unit 1712 via one or more wired connections.

The offline controller circuit 1706, when activated, can be configured to generate control signals for the HVAC unit 1712 and operate the HVAC unit 1712 via the equipment interface 2008. In some embodiments, the offline controller 7104 can generate the control signals without input from the headless thermostat 700. The offline controller circuit 1706 can communicate with a temperature sensor with the adapter unit 1702 and can operate the HVAC unit 1712 via the temperature measured by the sensor. In some embodiments, the offline controller circuit 1706 receives network data via the cellular network radio circuit 1710 from the remote platform 1310. The remote platform 1310 may provide weather data and/or remote control commands. In some embodiments, the offline controller circuit 1706 can generate control commands based on the weather data and/or remote command received from the remote platform 1310.

In some embodiments, a user device can provide a setpoint to the remote platform 1310 or the remote platform 1310 can receive the setpoint from the headless thermostat 700. In this regard, the remote platform 1310 can provide the setpoint to the adapter unit 1702 via the cellular network radio circuit 1710. Furthermore, in some embodiments, the remote platform 1310 can generate control commands based on the setpoint and provide the control commands to the adapter unit 1702 via the cellular network radio circuit 1710.

In some embodiments, the offline controller circuit 1706 is only configured to cause the cellular network radio circuit 1710 to receive (e.g., retrieve), data from the remote platform 1310 when the network connection of the local network radio circuit 1706 is unavailable. In this regard, the cellular network radio circuit 1710 can mainly be inactive. Since cellular data may incur costs based on data usage, the cellular network radio circuit 1710 can be left off unless required by the adapter unit 1702.

In some embodiments, the offline controller circuit 1706 and/or the remote platform 1310 can record historical performance and/or environmental data. In response to the local network being offline, the historical data can be utilized to perform control of the HVAC unit 1712 until the local network is active and the adapter unit 1702 can communicate with the headless thermostat 700.

The adapter unit 1702 is shown to include an offline controller circuit 2010. In some embodiments, the offline controller circuit 2010 includes a temperature sensor. The offline controller circuit 2010 can be a physical circuit and can be designed to implement a control algorithm for controlling the HVAC unit 1712. For example, the offline controller circuit 2010 can be a circuit implementing a PID loop. In some embodiments, a setpoint is hard designed into the offline controller circuit 2010 (e.g., 70 degrees Fahrenheit). In this regard, based on the temperature sensor of the offline controller circuit 2010 and the hard designed setpoint, the offline controller circuit 2010 can generate control signals for the HVAC unit 1712.

Figure 21:
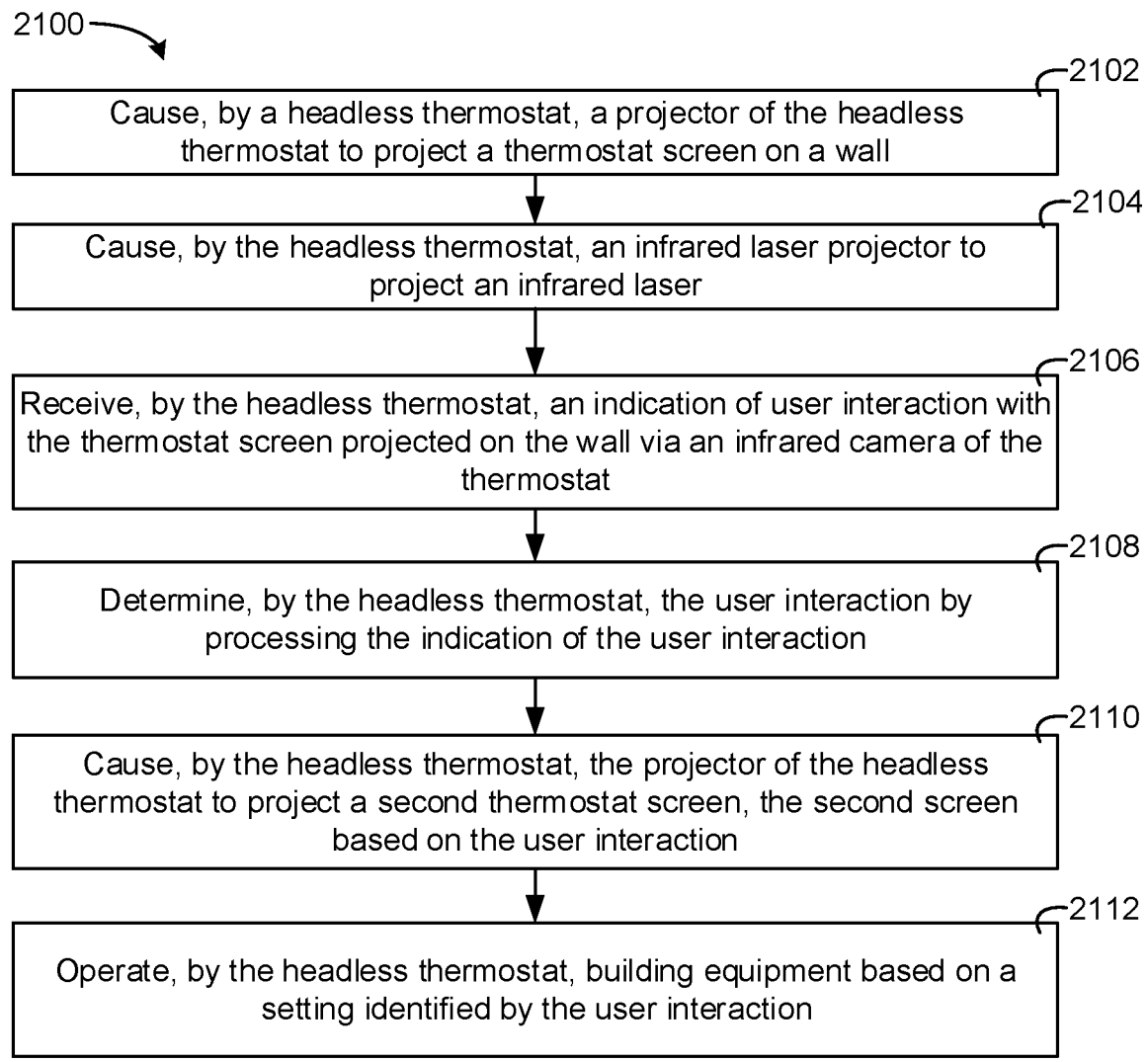
FIG. 21 is a flow diagram of a process of operating a projector and an infrared light source that can be performed by the headless thermostat of FIG. 7, according to an exemplary embodiment.

Referring now to FIG. 21, a process 2100 of operating a projector system of a headless thermostat is shown that can be performed by the headless thermostat 700, according to an exemplary embodiment. The headless thermostat 700 can be configured to perform some and/or all of the process 2100. Furthermore, any computing device as described herein can include a projector, an IR laser projector, and a camera and be configured to operate the projector, the IR laser projector, and the camera to perform the process 2100.

In step 2102, a headless thermostat can cause a projector of the headless thermostat to project a thermostat screen on a wall. In some embodiments, the headless thermostat 700 operates the projector 1102. For example, the projector controller 1904 generates a user interface, e.g., the display 900 as described with reference to FIG. 9 and/or the display 1000 as described with reference to FIG. 10 and causes the projector controller 1904 to project the display onto a surface e.g., the wall 702.

In step 2104, the headless thermostat can cause an infrared (IR) laser projector to project an infrared laser. In some embodiments, the headless thermostat 700 causes the infrared laser projector 1204 to project a laser parallel with the wall 702. In some embodiments, the laser projector 1204 projects the laser 1-2 millimeters from the wall. In some embodiments, the IR laser projector 1204 includes a filter configured to cause the laser to be a plane parallel with the wall 702.

In step 2106, the headless thermostat can receive an indication of user interaction with the thermostat screen projected in the step 2102 onto the wall via an infrared camera of the headless thermostat. In some embodiments, the headless thermostat 700 receives images via the camera 1202, the images indicating IR intensity levels. In step 2108, the headless thermostat can determine the user interaction by processing the indication of the user interaction in the step 2106. In some embodiments, the headless thermostat 700 processes the received images to identify what interactions occurred with the projected thermostat interface. For example, the camera controller 1902 can determine what locations of the captured image correspond to other locations of the projected thermostat interface and identify what interactions the user is performing, e.g., a touch, a button push, a swipe, etc.

In step 2110, the headless thermostat can project a second thermostat screen, the second screen based on the user interaction. For example, the interactions may be to display different screens, expand options, etc. In some embodiments, headless thermostat 700, via the camera controller 1902 and the projector controller 1904, determines whether the interaction causes a new interface to be displayed and/or a currently displayed interface to be adjusted. Based on the determination the projector controller 1904 can cause the projector 1102 to display a new screen. In step 2112, the headless thermostat can operate building equipment based on settings identified by the user interaction of the steps 2106 and 2108. In some embodiments, the camera controller 1902 of the headless thermostat 700 determines user input corresponding to a particular setting and/or setting value. The HVAC controller 1808 of the headless thermostat 700 can operate building equipment to control an environmental condition based on the setting.

Figure 22:
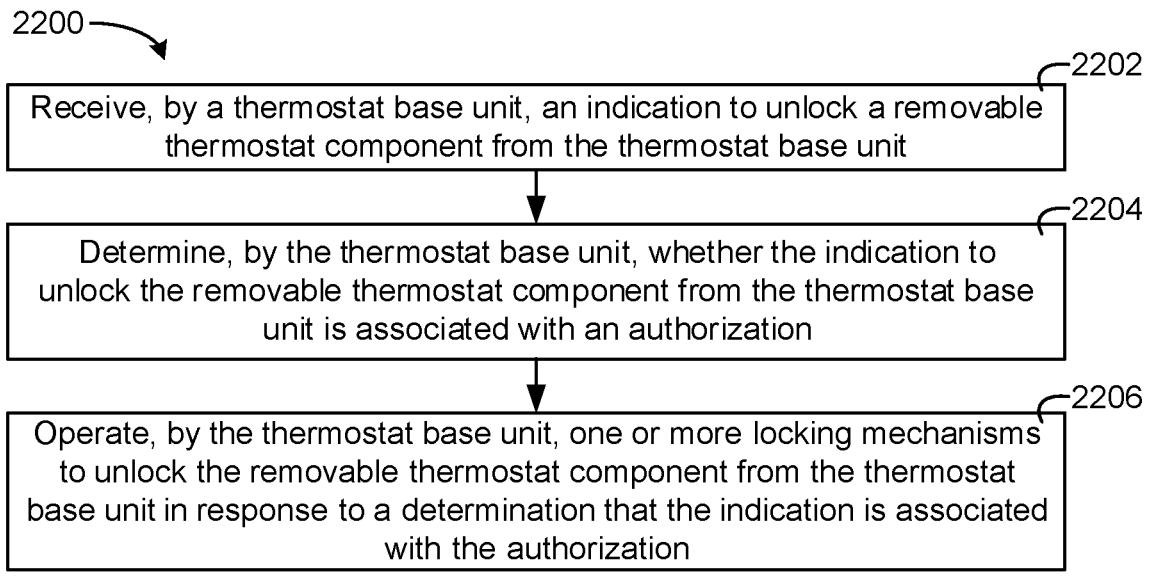
FIG. 22 is a flow diagram of a processes of operating a locking system for detachable components that can be performed by the headless thermostat of FIG. 7, according to an exemplary embodiment.

Referring now to FIG. 22, a process 2200 of removing removable components from a headless thermostat is shown that can be performed by the headless thermostat 700, according to an exemplary embodiment. The headless thermostat 700 can be configured to perform some and/or all of the process 2200. Furthermore, any device as described herein can include removable components and a locking apparatus for the removable components and can be configured to perform the process 2200.

In step 2202, a thermostat base unit can receive an indication to unlock a removable thermostat component from the thermostat base unit. In some embodiments, the head unit 1301 receives the indication to unlock one of the removable components, the removable display 1302, the removable sensor 1304, and/or the projector system 1306. The head unit 1301 can receive, by the lock controller 1308, the indication to unlock the removable components from the removable display 1302 if the removable display is present and/or can receive the indication from the user device 1300 via wireless communication via a wireless network.

In step 2204, the thermostat base unit can determine whether the indication to unlock the removable thermostat component from the thermostat base unit is associated with an authorization. In some embodiments, the request of the step 2202 includes a credential, e.g., an entered pin code, an entered password, a key, etc. In some embodiments, the lock controller 1308 can determine whether the credential is authorized to remove a removable component. For example, the lock controller 1308 can compare the credential against a stored credential. In response to the received credential matching the stored credential, the lock controller 1308 can determine that the user is authorized to remove the component. In some embodiments, each of the components is associated with a particular permission level or particular credential. In this regard, the request of the step 2202 may include an indication of a particular component along with the credential. The lock controller 1308 can determine whether the particular component can be removed based on the received credential.

In step 2206, the thermostat base unit can operate one or more locking mechanisms to unlock the removable thermostat component from the thermostat base unit in response to a determination that indication is associated with the authorization. In some embodiments, the lock controller 1308 operates the locks 1312-1316 to unlock the removable components 1302-1306 in response to determining that a received credential is authorized to remove the components. The lock controller 1308 can operate one or multiple of the locks 1312-1316 based on whether the user is authorized to remove the components 1302-1306 and/or based on what components the user has requested to remove.

Figure 23:
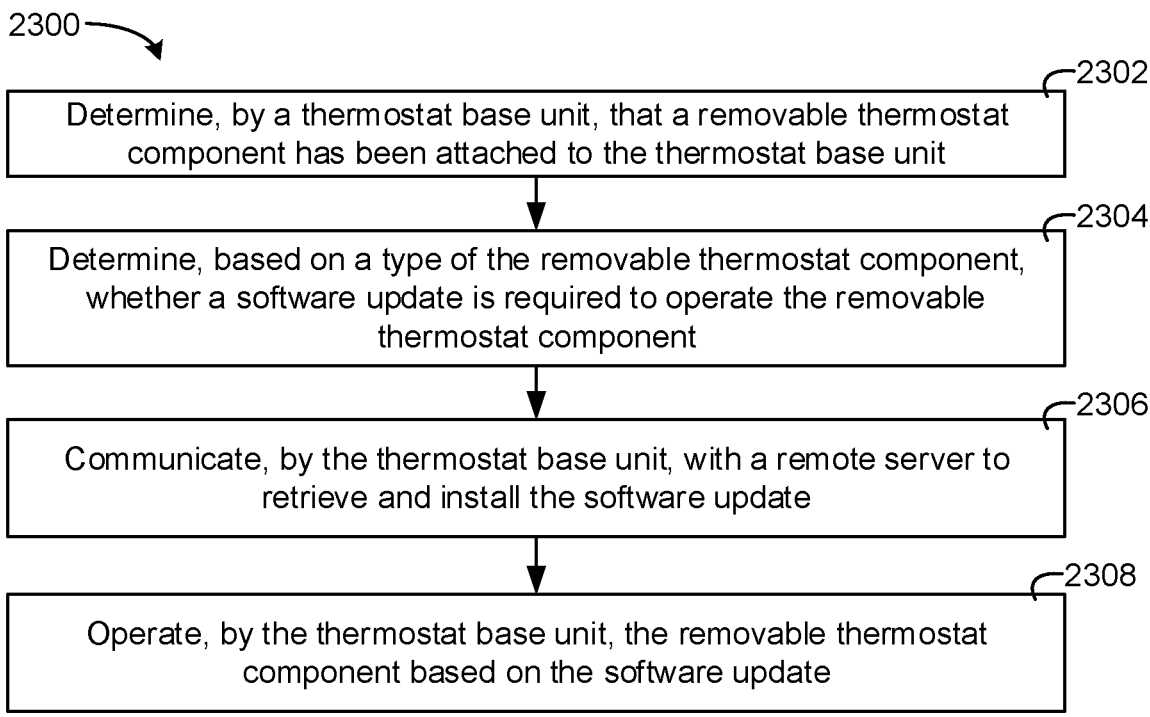
FIG. 23 is a flow diagram of a process of performing software updates for new components added to thermostat that can be performed by the headless thermostat of FIG. 7, according to an exemplary embodiment.

Referring now to FIG. 23, a process 2300 of adding removable components to a headless thermostat and performing a software update for the added component is shown that can be performed by the headless thermostat 700, according to an exemplary embodiment. The headless thermostat 700 can be configured to perform some and/or all of the process 2300. Furthermore, any device as described herein can include removable components and a locking apparatus for the removable components and can be configured to perform the process 2300.

In step 2302, a thermostat base unit can determine that a removable thermostat component has been attached to the thermostat base unit. In some embodiments, the lock controller 1308 can receive the indication of the new component being added from one of the locks 1312-1316.

In step 2304, the thermostat base unit can determine whether a software update is required to operate the removable thermostat component based on a type of the removable thermostat component. In some embodiments, the lock controller 1308 can determine whether the added component is associated with a software version or software update already installed on the headless thermostat 700. In some embodiments, if a software version or software update does not exist on the thermostat 700 for operating the added component, the lock controller 1308 can determine that a software update is required to operate the new component.

In step 2306, the thermostat base unit can communicate with a remote server to retrieve and install the software update. In some embodiments, the lock controller 1308 can communicate with the remote platform 1310 to request a software update for operating the new component. In some embodiments, the lock controller 1308 provides an indication of the new component (e.g., an identifier, a name, a version, etc.). The remote platform 1310 can identify what pieces of software (e.g., software updates, software plugins, etc.) are needed to operate the new component and can communicate the software to the lock controller 1308. In response to receiving the software from the remote platform 1310, the lock controller 1308 can install the software.

In step 2308, the thermostat base unit can operate the added removable thermostat component based on the software update received and installed in the step 2306. For example, the software update can allow the lock controller 1308 to operate the removable display 1302 to cause the removable display 1302 to provide output to a user and receive input to the user (e.g., the software update may be a display driver). In some embodiments, the lock controller 1308 can collect sensor data from the removable sensor 1304 and incorporate the data into control algorithms for operating equipment (e.g., the software update may be an updated control algorithm for utilizing new environmental measurements of the removable sensor 1304).

Figure 24:
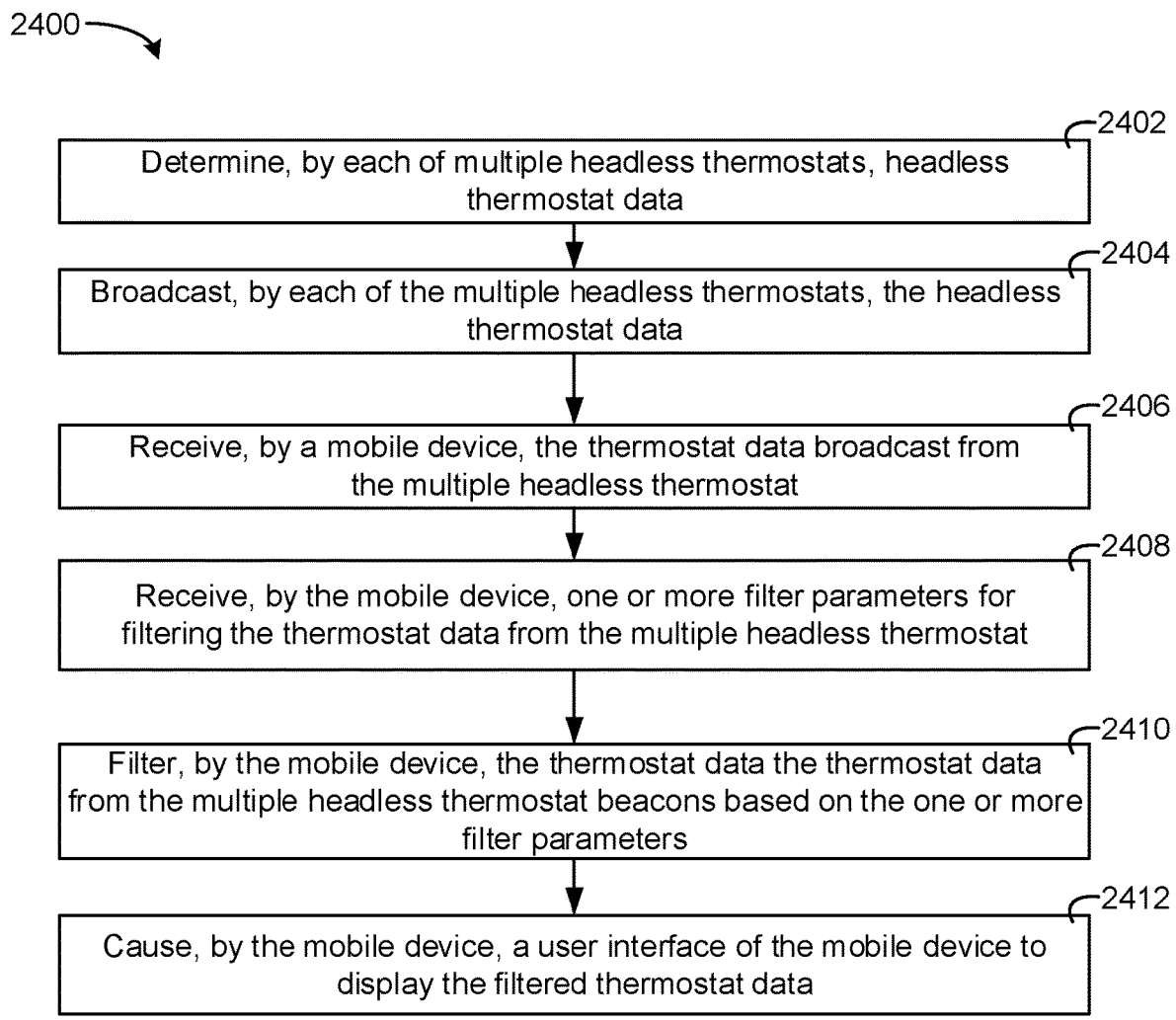
FIG. 24 is a flow diagram of a process of broadcasting thermostat data to a user device that can be performed by the headless thermostat of FIG. 7 and the user device of FIGS. 14-15, according to an exemplary embodiment.

Referring now to FIG. 24, a process 2400 of broadcasting thermostat data by headless thermostats and filtering the broadcast thermostat data by a user device is shown, according to an exemplary embodiment. The headless thermostat 700 can be configured to perform some and/or all of the process 2400. Furthermore, the headless thermostats 1402-1406 can be configured to perform some and/or all of the steps of the process 2400. Furthermore, any device as described herein that can broadcast data via a wireless network can be configured to perform the process 2400.

In step 2402, multiple headless thermostats can determine headless thermostat data. The data can be operational data of each of the headless thermostats, current operating parameters of each of the headless thermostats, measured environmental conditions of each of the headless thermostats, etc. In some embodiments, the thermostat data manager 1810 of the headless thermostat 700 collects thermostat data for the headless thermostat 700 based on environmental measurements made by the headless thermostat 700, control decisions made by the HVAC controller 1808, and/or operating settings received form the user device 1300 and implemented by the HVAC controller 1808.

In step 2404, the headless thermostats can broadcast the headless thermostat data determined in the step 2402. In some embodiments, each of the headless thermostats periodically broadcasts the data via a network. For example, the headless thermostat 700 can broadcast the thermostat data of the step 2402 to any listening device, e.g., the user device 1300. The thermostat data manager 1810 can cause the wireless radio circuit 1814 to broadcast the data via the wireless network 1800. The broadcast can be a Bluetooth broadcast and/or any other wireless broadcast.

In step 2406, a mobile device can receive the thermostat data broadcast from the headless thermostats. In some embodiments, user device 1300 receives the broadcasts via the wireless radio circuit 1818, i.e., the wireless radio circuit 1818 can listen for broadcasts on the wireless network 1800. In step 2408, the mobile device can receive one or more filter parameters for filtering the thermostat data from the headless thermostats. In some embodiments, a user defines, via the user interface 1816, parameters for the filter 1410. For example, the parameters may be to filter data to only view data of certain thermostats, to filter data based on zones, etc.

In step 2410, the mobile device can filter the received thermostat data of the step 2406 based on the filter parameters of the step 2408. In some embodiments, the user device 1300 can filter the broadcast thermostat data with the filter 1410. The filter parameters received in the step 2406 can configure the filter 1410 to filter based on thermostat broadcast identifier, thermostat zone, etc. In this regard, a user could indicate that they want to view only the closes thermostat via the user interface 1816. A signal strength filter parameter can be applied by the filter 1410 by the thin client 1408 based on the indication. For example, the thin client 1408 can filter the thermostat data to retain only thermostat data of the headless thermostat 700 if the headless thermostat 700 is closes to the user device 1300, e.g., has the highest broadcast signal strength.

In step 2412, the headless thermostat 700 can cause the filtered thermostat data of the step 2410 to be displayed to a user via the mobile device. In some embodiments, the user device 1300 can cause the user interface 1816 to display the filtered thermostat data. In some embodiments, the interface manager 1826 receives the filtered thermostat data from the thin client 1408 and causes the user interface 1816 to display the information. In some embodiments, based on the displayed information, a user may input various commands for the information of a one headless thermostat (e.g., a setpoint change). The interface manager 1826 can receive the setting input from the user interface 1816 and can cause the wireless radio circuit 1818 to transmit the setting to the headless thermostat.

Figure 25:
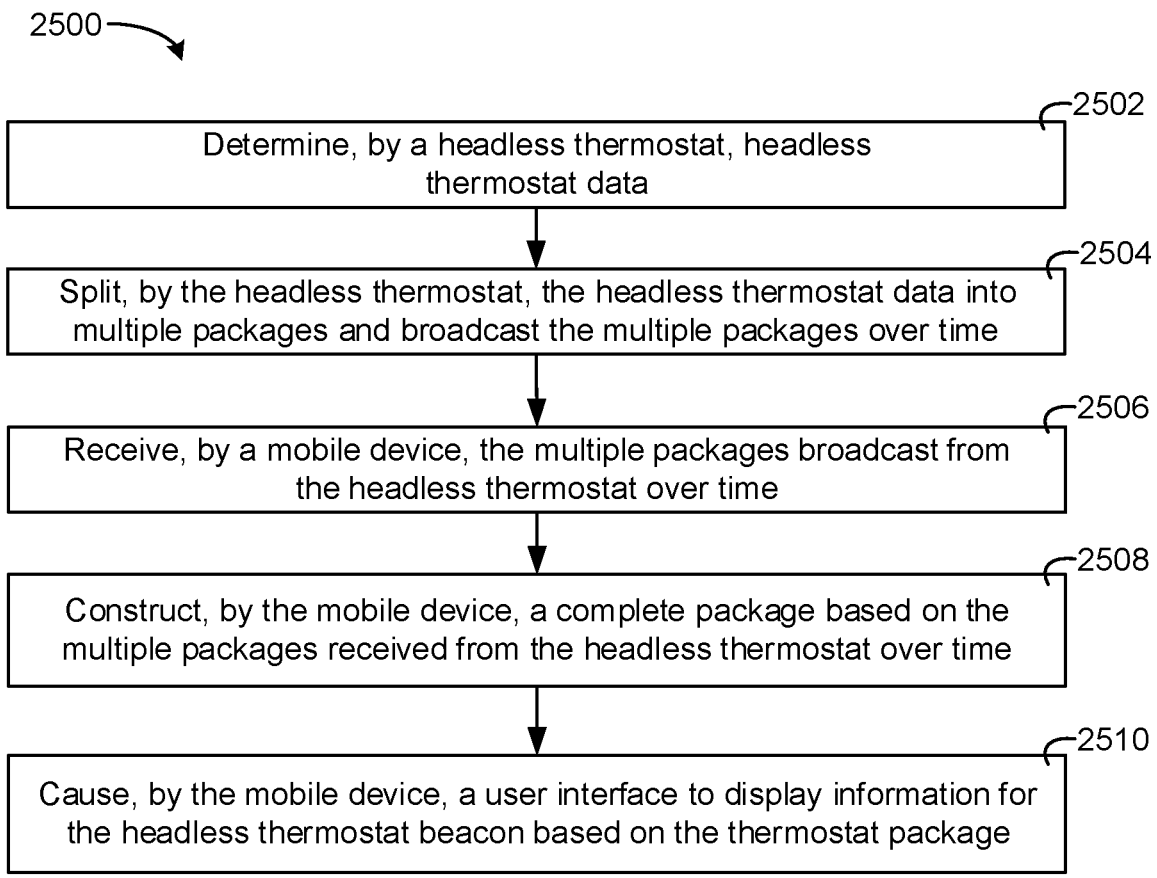
FIG. 25 is a flow diagram of a process of splitting thermostat data into multiple packages for transmission and reconstructing the thermostat data that can be performed by the headless thermostat of FIG. 7 and the user device of FIGS. 14-15, according to an exemplary embodiment.

Referring now to FIG. 25, a process 2500 of broadcasting thermostat data split into multiple packages by headless thermostats and reconstructing the thermostat data by a user device is shown, according to an exemplary embodiment. The headless thermostat 700 can be configured to perform some and/or all of the process 2500. Furthermore, the headless thermostats 1402-1406 can be configured to perform some and/or all of the steps of the process 2500. Furthermore, any device as described herein that can broadcast data via a wireless network can be configured to perform the process 2500.

In step 2502, a headless thermostat can determine headless thermostat data. In some embodiments, the headless thermostat 700 determines the headless thermostat data which may be environmental measurements made by the headless thermostat 700, current operating settings (e.g., a current setpoint), control decisions, etc. The step 2502 can be the same and/or similar to the step 2402 as described with reference to FIG. 24.

In step 2504, the headless thermostats can split the headless thermostats data into multiple packages and broadcast the packages over time. In some embodiments, the thermostat data manager 1810 can construct a data set for broadcast to the user device 1300. However, instead of broadcasting the data set, the thermostat data manager 1810 can divide the data set into smaller packages. Instead of broadcasting the entire data set, the thermostat data manager 1810 can be configured to cause the wireless radio circuit 1814 to broadcast the divided packages one at a time at a particular interval, e.g., every two seconds. Broadcasting the small packages at intervals may result in less wireless radio circuit on time, reducing energy consumption for the headless thermostat 700.

In step 2506, a mobile device can receive the multiple packages broadcast from the headless thermostat over time. The thick client 1412 can be configured to receive all of the broadcasts. In step 2508, the mobile device can construct the complete package based on the multiple packages received from the headless thermostat over time in the step 2506. The thick client 1412 can reconstruct the original data set based on the received individual pieces of the data set. In some embodiments, each package has an identifier indicating how to reconstruct the data. In step 2510, the user device can cause the user interface to display information from the headless thermostat based on the thermostat package constructed in the step 2508. In some embodiments, the step 2510 is the same as, and/or similar to, the step 2412 as described with reference to FIG. 24.

Figure 26:
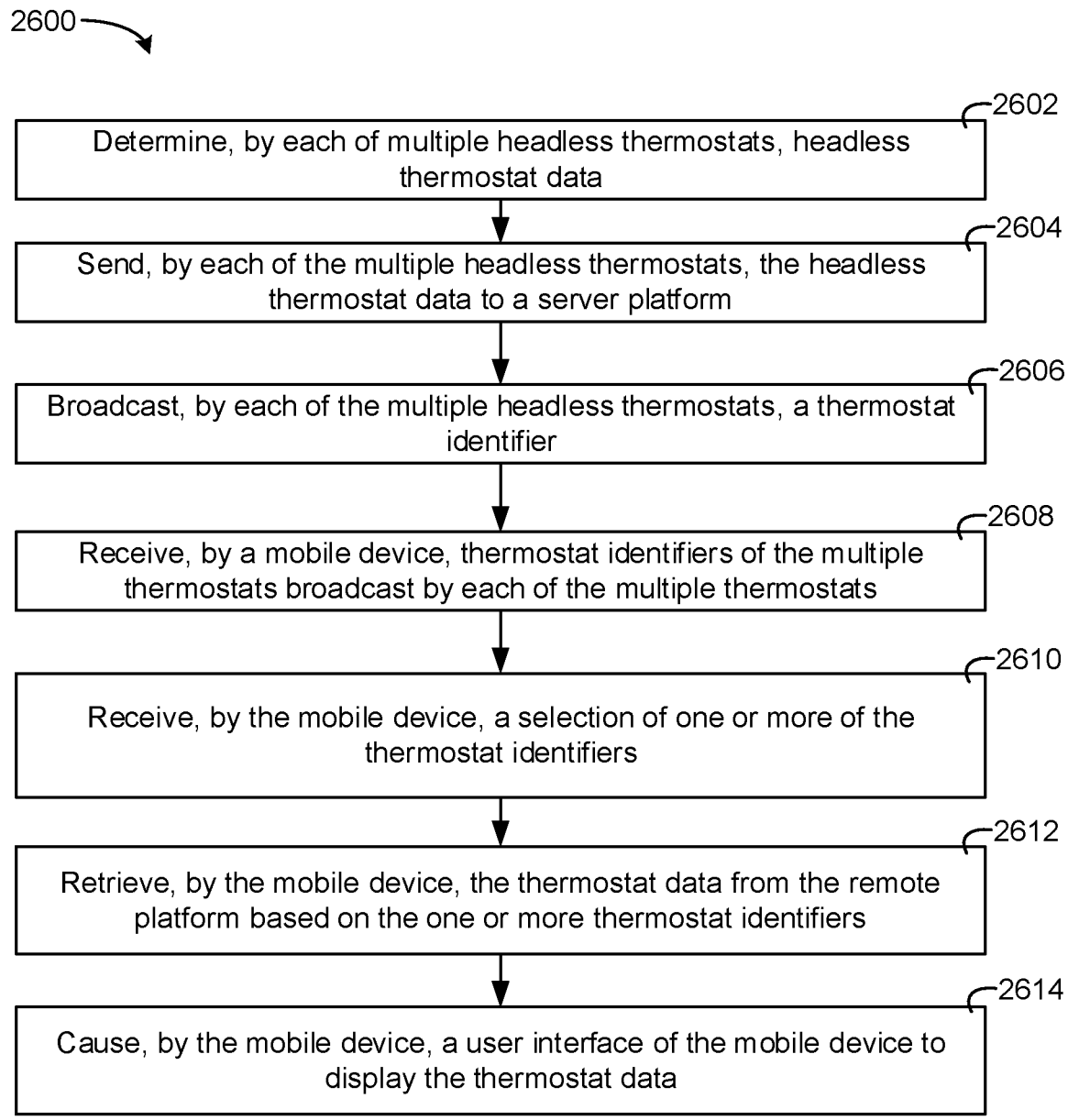
FIG. 26 is a flow diagram of a process of broadcasting thermostat identifiers for network retrieval of remote thermostat data that can be performed by the headless thermostat of FIG. 7 and the user device of FIGS. 14-15, according to an exemplary embodiment.

Referring now to FIG. 26, a process 2600 of broadcasting thermostat data identifiers by multiple headless thermostats and retrieving thermostats data based on the identifiers from a server by a user device is shown, according to an exemplary embodiment. The headless thermostat 700 can be configured to perform some and/or all of the process 2600. Furthermore, the headless thermostats 1402-1406 can be configured to perform some and/or all of the steps of the process 2600. In some embodiments, the user device 1300 and/or the remote platform 1310 can be configured to perform some and/or all of the steps of the process 2600. Furthermore, any device as described herein that can broadcast data via a wireless network can be configured to perform the process 2600.

In step 2602, each of multiple headless thermostats can determine headless thermostat data. In some embodiments, each of the headless thermostats 1402-1406 and the headless thermostat 700 determine the headless thermostat data (e.g., measured environmental conditions, settings, control operations, etc.). The step 2602 may be the same as and/or similar to the step 2402 as described with reference to FIG. 24.

In step 2604, each of the multiple headless thermostats and send the headless thermostat data of the step 2602 to a server platform. In some embodiments, each of the headless thermostats 1402-1406 and the headless thermostat 700 communicate thermostat data to the remote platform 1310 via a network, e.g., the Internet. The remote platform 1310 can store the thermostat data along with an identifier for the headless thermostats 1402-1406 and the thermostat 700.

In step 2606, each of the multiple headless thermostats can broadcast a thermostat identifier. For example, the identifier transmitter 1812 can cause broadcast the thermostat identifier to the wireless network 1800 where the user device 1300 can detect the identifier. In step 2608, the mobile device receives the thermostat identifiers broadcast by each of the multiple thermostats. In some embodiments, the user device 1300 can receive the thermostat identifiers from the headless thermostat 700.

In step 2610, the mobile device receives a selection of one or more of the thermostat identifiers. For example, a user can indicate, via the user interface 1816, which thermostat identifiers the user wants to view data for. In step 2612, the mobile device can retrieve the thermostat data from the remote platform based on the selected thermostat identifiers. For example, the user device 1300 can request the thermostat data associated with headless thermostats that the user has selected via the selection of the thermostat identifiers from the remote platform 1310. The remote platform 1310 can receive the identifiers and respond to the user device 1300 with the thermostat data associated with the thermostat identifiers.

In step 2614, the mobile device can cause a user interface of the mobile device to display the retrieved thermostat data of the step 2610. In some embodiments, the user device 1300 can cause the user interface 1816 to display the information retrieved from the remote platform 1310. In some embodiments, the step 2614 is the same as and/or similar to the step 2412.

Figure 27:
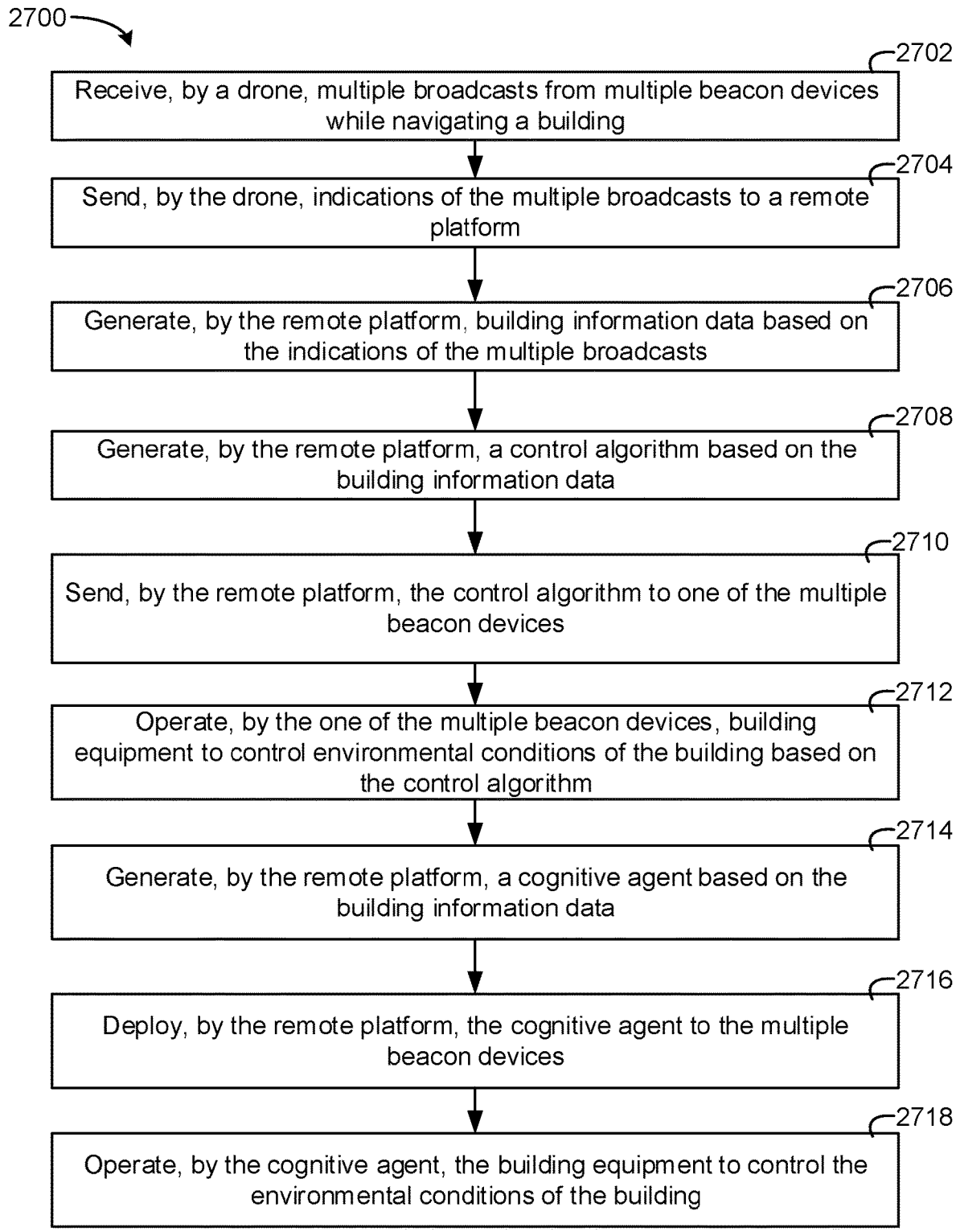
FIG. 27 is a flow diagram of a process of surveying building equipment wirelessly emitting equipment information with a drone that can be performed by the drone as described with reference to FIG. 16, according to an exemplary embodiment.

Referring now to FIG. 27, a process 2700 of surveying beacon broadcasts of a building with a drone, according to an exemplary embodiment. In some embodiments, the drone 1602 and/or the remote platform 1310 can be configured to perform some and/or all of the steps of the process 2700. The headless thermostat 700 can be configured to perform some and/or all of the process 2700. Furthermore, the headless thermostats 1402-1406 can be configured to perform some and/or all of the steps of the process 2700. In some embodiments, the user device 1300 can be configured to perform some and/or all of the steps of the process 2700. Furthermore, any device as described herein that can broadcast data via a wireless network can be configured to perform the process 2700.

In step 2702, a drone can receive multiple broadcasts from multiple beacon devices while navigating a building. For example, the drone 1602 can navigate the floor 1600 can detect broadcast of the remote sensor 1607, the headless thermostat 700, the headless thermostat 1402, and the smart actuator 1610. The drone 1602 can navigate the building based on a building map and enter each and/or some of the rooms and/or zones of the building. In some embodiments, the drone 1602 does not include a map but rather attempts to map the floor 1600 by flying until walls or objects are detected.

In step 2704, the drone can send indications of the broadcasts to a remote platform. For example, the drone 1602 can collect all of the broadcasts received in the step 2702, the signal strengths of each received broadcast, and a location of the drone 1602 at each broadcast reception. The drone 1602 can broadcast the collected data to the remote platform 1310 so that the remote platform 1310 can perform remote analysis on the data.

In step 2706, the remote platform can generate building information data based on the received indications of the broadcasts received from the drone in the step 2704. The remote platform 1310 can generate maps of the building (or the floor 1600) based on the collected data. For example, the remote platform 1310 can determine an approximated location of each of the beacon based devices, the smart actuator 1610, the headless thermostat 700, the headless thermostat 1402, and/or the remote sensor 1607. Furthermore, based on the locations, the remote platform 1310 can infer relationships between the devices, e.g., a smart actuator is controlled by a particular headless thermostat because they are located in the same zone.

In step 2708, the remote platform can generate control algorithms based on the building information. For example, the remote platform 1310 can identify efficiencies for operating the algorithms, for example, if a first sensor is located in a first zone and a second sensor is located in a second zone, if a thermostat is also located in the first zone, the control algorithm can be generated so that the thermostat utilizes measurements of the first sensor to perform environmental control.

In step 2710, the remote platform 1310 can send the control algorithm determined in the step 2708 to one or multiple of the beacon devices. For example, if the control algorithm pertains to an update in the operation of the headless thermostat 1402, the remote platform 1310 can send the updated control algorithm to the headless thermostat 1402. In step 2712, the beacon device receiving the control algorithm, can operate based on the control algorithm. For example, if the remote platform 1310 sends the control algorithm to the headless thermostat 1402, the headless thermostat 1402 can generate one or more control decisions for building equipment to control environmental conditions of a building based on the received algorithm.

In step 2714, the remote platform can generate a cognitive agent based on the building information data. In some embodiments, the remote platform 1310 can generate a cognitive agent for various spaces and/or equipment. Furthermore, the cognitive agents can be linked together based on associations. For example, a building cognitive agent can be linked to multiple space cognitive agents. Each of the space cognitive agents may be linked to the building equipment within them, the building equipment detected by the drone 1602. The cognitive agents can generate control decisions for the building equipment and can be machine learning based entities that learn and update over time.

In step 2716, the remote platform can deploy the cognitive agents to the multiple beacon devices. In some embodiments, the remote platform 1310 deploys the cognitive agents to each individual device to which the agents are associated. In some embodiments, the remote platform runs the cognitive agents on the remote platform instead of, or in addition to, sending the cognitive agents to the end devices. In step 2718, the cognitive agents can operate to control environmental conditions of the building. For example, the cognitive agents can run on the remote platform 1310 and/or the devices to which they are deployed and can generate control decisions based on gathered and/or historical data.

Figure 28:
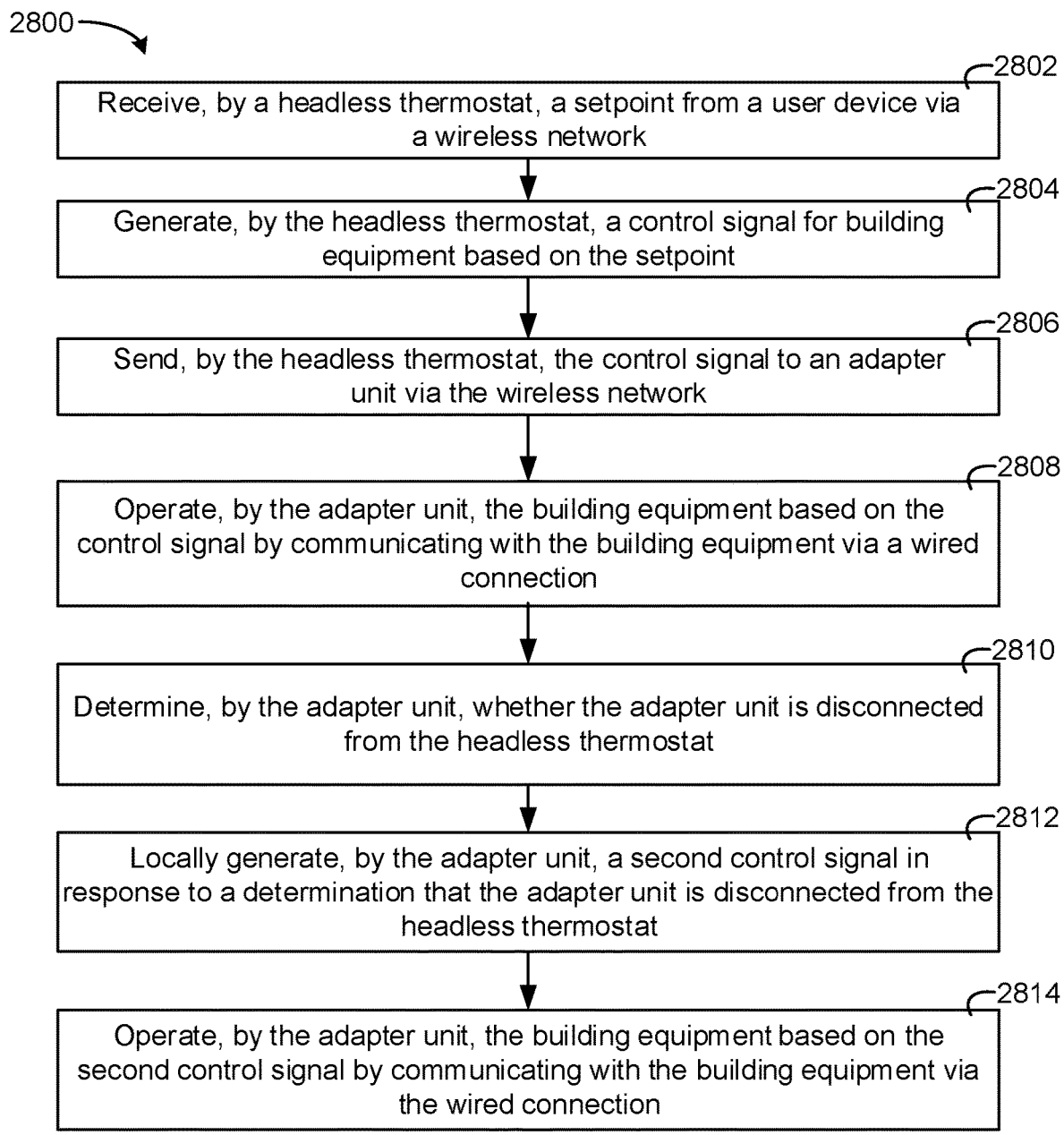
FIG. 28 is a flow diagram of a process of operating building equipment with an adapter unit that can be performed by the adapter unit of FIG. 17, according to an exemplary embodiment.

Referring now to FIG. 28, a process 2800 of operating building equipment with an adapter unit is shown, according to an exemplary embodiment. The headless thermostat 700 can be configured to perform some and/or all of the process 2800. Furthermore, the headless thermostats 1402-1406 can be configured to perform some and/or all of the steps of the process 2800. In some embodiments, the user device 1300 can be configured to perform some and/or all of the steps of the process 2800. Furthermore, any device as described herein that can broadcast data via a wireless network can be configured to perform the process 2800. In some embodiments, the adapter unit 1702 can be configured to perform some and/or all of the steps of the process 2800.

In step 2802, a headless thermostat can receive a setpoint from a user device via a wireless network. For example, the headless thermostat 700 can receive a setpoint via a mobile application running on the user device 1300. The user device 1300 can receive an indication of a setpoint from a user of the user device 1300 and can communicate the setpoint to the headless thermostat 700.

In step 2804, the headless thermostat can generate a control signal for building equipment based on the setpoint received in the step 2802. In some embodiments, the headless thermostat 700 generates control decisions with the setpoint based on environmental measurements performed by the thermostat 700, the control decisions being decisions to turn on or off heating elements, cooling elements, fans, etc. of the HVAC unit 1712. In step 2806, the headless thermostat can send the control signal determined in the step 2804 to an adapter unit via the wireless network. For example, the headless thermostat 700 can wirelessly communicate the control decisions to the adapter unit 1702 via a Wi-Fi network, a Zigbee network, and/or any other type of wireless network.

In step 2808, the adapter unit can operate the building equipment based on the control signal received in the step 2806 by communicating with the building equipment via a wired connection. For example, the adapter unit 1702 can utilize the control signals received from the headless thermostat 700 to operate the HVAC unit 1712. In some embodiments, the control signals are "Turn on Heating Stage 1." Based on the signal, the adapter unit 1702 can turn on or off relays to operate a heating stage of the HVAC unit 1712.

In step 2810, the adapter unit can determine whether the adapter unit is disconnected from the headless thermostat 700. In response to determining that the headless thermostat 700 is not communicating with the adapter unit 1702 and/or the wireless network connecting the headless thermostat 700 and/or the adapter unit 1702 is not present, unavailable, or not operating properly.

In step 2812, the adapter unit can locally generate a second control signal in response to a determination that the adapter unit is disconnected from the headless thermostat. For example, the adapter unit 1702, via the offline controller circuit 2010, can generate control decisions for the HVAC unit 1712 and keep the HVAC unit 1712 operating properly. In some embodiments, the offline controller circuit 2010 is a circuit including a temperature sensor, the circuit configured to generate control outputs based on measurements of the temperature sensor. In this regard, the offline controller circuit 2010 can keep the HVAC unit 1712 operating event without connection to the headless thermostat 700.

Furthermore, the adapter unit 1702 can be configured to communicate to the remote platform 1310 via the cellular network radio circuit 1710 in the event that the adapter unit cannot communicate with the headless thermostat 700. The cellular network radio circuit 1710 can utilize a cellular network of a cellular provider to communicate with the remote platform 1310. An owner associated with the adapter unit 1702 may be charged data usage for communicating via the cellular network, therefore, the adapter unit 1702 may only communicate via the cellular network in the event of an emergency, e.g., when the adapter unit 1702 cannot communicate with the headless thermostat 700.

In some embodiments, the adapter unit 1702 can receive control commands via the cellular network. In some embodiments, control commands are received from the remote platform 1310 and/or the user device 1300. In some embodiments, the user device 1300 provides the remote platform 1310 with control commands and the remote platform 1310 provides the control commands to the adapter unit 1702. In step 2814, based on the second control signal, the adapter unit can operate the building equipment via a wired connection to the building equipment. In some embodiments, the adapter unit 1702 provides the second control commands to the HVAC unit 1712.

Faceless System Control

In some aspects, an HVAC system may forgo the use of the thermostat in view of a faceless control system to control an ambient condition of one or more rooms of a building. In an example, the ambient condition may refer to one or more of a temperature or a humidity level of the one or more rooms of the building. In the faceless control system, a sensor for generating ambient condition information may be located within a room of the building. The sensor may be located on a wall of the room, within or near a vent in the room, or any other location in the room. In an example, the sensor may be wired or wireless. The sensor may be configured to communicate with an HVAC unit, which is located exterior (e.g., A/C unit, heat pump) or interior (e.g., furnace, air handler) to a building, current ambient condition information (e.g., indoor temperature or humidity). The HVAC unit, which may determine whether the room needs to be conditioned (e.g., heated, cooled, dehumidified, humidified) or not.

In an aspect, a mobile device may provide desired settings for controlling the ambient condition of the room to the HVAC unit. The mobile device may include an application having mode and setpoint settings to change one or more ambient conditions based on a user's physical interaction with the mobile device or through other methods including voice control (e.g., Google Home, Amazon Alexa). Control of the HVAC unit may be possible due to an on-board communications component which allows remote communications with the sensors and the mobile device. Further, if a user prefers the aesthetics of a traditional wall mounted thermostat, the mobile device may be mounted on a wall to give the appearance of a thermostat.

Aspects may allow new constructions applications and retrofit applications of the HVAC system by avoiding the requirement of a thermostat wire being used in a building. Instead of installing the thermostat wire for a thermostat and potentially damaging walls, the sensors may be completely wireless. The wireless capabilities of aspects may provide a streamlined look without a thermostat being mounted on a wall, which may be preferred by some users. Further, because a thermostat is not used by the HVAC system, overall installation time of the HVAC system may be reduced compared to overall installation time of a typical HVAC system, and fewer components within the HVAC system which may fail.

Figure 29:
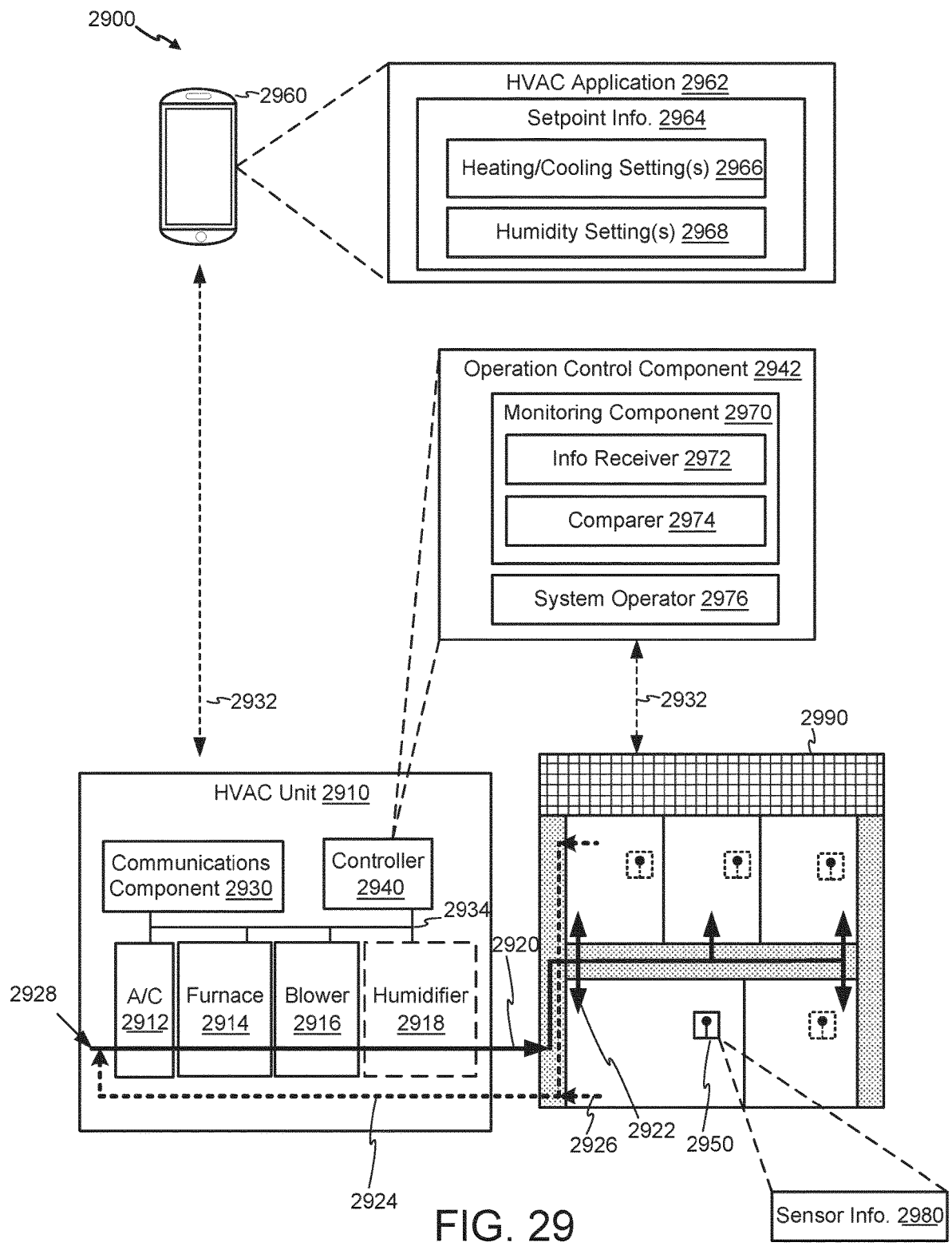
FIG. 29 is a block diagram of an example HVAC system, according to an exemplary embodiment.

Referring to FIG. 29, an HVAC system 2900 for a building 2990 is shown. The HVAC system 2900 may include an HVAC unit 2910 configured to control an ambient condition of the one or more rooms of the building 2990 based on information from one or more sensors 2950 and a mobile device 2960. In an example, an ambient condition may be a temperature or a humidity level of one or more rooms of the building 2990. As shown by FIG. 29, the HVAC unit 2910 may be external to the building 2990. Alternatively, in some aspects, one or more components (e.g., air conditioning (A/C) unit 2912, furnace 2914, blower 2916, humidifier/dehumidifier 2918, communications component 2930, or controller 2940) may be located in different locations including inside the building 2990. The building may be a home, office, or any other structure that includes uses an HVAC system for controlling one or more ambient conditions of the structure.

In an aspect, the HVAC system 2900 may include supply ducts 2920 and return ducts 2924 installed within the building 2990 and coupled with the HVAC unit 2910. The supply ducts 2920 may supply air to the building 2990, and the return ducts 2924 may return air from the building 2990. The supply ducts 2920 may receive supply air through one or more of intakes 2928 that provide outside air to the HVAC system 2900 and/or may recycle return air from the return ducts 2924. The supply ducts 2920 may output the supply air at one or more of the rooms of the building 2990 via one or more supply vents 2922. The return ducts 2924 may receive return air from the building 2990 via the return ducts 2924 to balance air within the building 2990. The return air may be input into the return ducts 2924 via one or more return vents 2926.

The HVAC unit 2910 may include one or more of an A/C unit 2912, a furnace 2914, a blower 2916, a humidifier/dehumidifier 2918, or any other component (e.g., heat pump) for adjusting an ambient condition of a room of the building 2990. The A/C unit 2912 may be configured to cool the supply air by passing the supply air through or around one or more cooled pipes (e.g., chiller pipes) to lower a temperature of the supply air. The furnace 2914 may be configured to warm the supply air by passing the supply air through or around one or more warmed pipes (e.g., heating coils) to raise a temperature of the supply air. The blower 2916 may be configured to blow the supply air through the supply ducts 2920 to the building 2990 and pull the return air from the building 2990. The humidifier 2918 may be configured to add moisture to the supply air. A dehumidifier 2918 may be configured to reduce moisture in the supply air. While the humidifier/dehumidifier 2918 is shown as a single unit, these units may be separate units. Alternatively to a dehumidifier 2918, aspects of dehumidification may be performed through other methods including use of the A/C unit 2912 to dehumidify the supply air.

The HVAC unit 2910 may also include a communications component 2930 configured to communicate with the one or more sensors 2950 and/or the mobile device 2960. In an aspect, the communications component 2930 may communicate with the one or more sensors 2950 and/or the mobile device 2960 via one or more communications links 2932. In an example, the communications component 2930 may include one or more antennas, processors, modems, radio frequency components, and/or circuitry for communicating with the sensor 2950 and/or the mobile device 2960. The one or more communications links 2932 may be one or more of a wired communication link or a wireless communication link.

The HVAC system 2900 may also include the sensors 2950 located within one or more rooms of the building 2990 and/or within or near the supply vents 2922. One or more sensors 2950 may be configured to detect an ambient condition such as a temperature or a humidity level of the room where the sensor 2950 is located. Each of the sensors 2950 may provide sensor information 2980 to the HVAC unit 2910. Examples of a sensor 2950 may include a temperature sensor, a humidity sensor, or any sensor configured to detect an ambient condition of one or more rooms of the building 2990.

The HVAC system 2900 may also include the mobile device 2960 configured to communicate with the HVAC unit 2910. The mobile device may include an HVAC application 2962 configured to display, adjust, and store setpoint information ("info") 2964 indicating desired user settings for one or more rooms of the building 2990. In an example, the setpoint information 2964 may include heating/cooling settings 2966 indicating one or more desired temperatures (e.g., minimum and/or maximum room temperatures) for one or more rooms of the building and/or humidity settings 2968 indicating a desired humidity level for one or more rooms of the building 2990. The mobile device 2960 may provide the setpoint information 2964 to the HVAC unit 2910. Examples of a mobile device 2960 may include a cellular phone, a smart phone, a personal digital assistant (PDA), a smart speaker, a home assistant, a wireless modem, a wireless communication device, a handheld device, a tablet computer, a laptop computer, a cordless phone, a smart watch, an entertainment device, an Internet of Things (IoT) device, or any device capable of communicating with the HVAC unit 2910. A smart speaker may include, for example, an Echo® device available from Amazon, Inc. of Seattle, Wash., a Google Home® device available from Google, Inc. of Mountain View, Calif., or other similar voice-controlled devices. The HVAC application 162 may include a voice interface that responds to voice commands.

The HVAC unit 2910 may also include a controller 2940 configured to control the A/C unit 2912, the furnace 2914, the blower 2916, and the humidifier/dehumidifier 2918, based on the sensor information 2980 received from the sensor 2950 and the setpoint information 2964 received from the mobile device 2960. The controller 2940 may communicate with the communications component 2930, the A/C unit 2912, the furnace 2914, the blower 2916, and/or the humidifier/dehumidifier 2918 via a communications bus 2934. The controller 2940 may include logic to operate the A/C unit 2912, the furnace 2914, the blower 2916, and the humidifier/dehumidifier 2918, based on the sensor information 2980 and the setpoint information 2964. The operation of the components of the HVAC unit 2910 may include one or more of an initiation time, a stop time, a run time, a power state, speed level, a heating/cooling level, and/or any other operational state of one or more of these components of the HVAC unit 2910.

In an aspect, the controller 2940 may include an operation control component 2942 to perform the logic of the controller 2940. The operation control component 2942 may include a monitoring component 2970 configured to monitor for and compare the setpoint information 2964 and the sensor information 2980. In an example, the monitoring component 2970 may include an information receiver 2970 configured to receive one or more of the setpoint information 2964 or the sensor information 2980. The monitoring component 2970 may also include a comparer 2974 configured to receive one or more of the setpoint information 2964 or the sensor information 2980 from the information receiver 2972 and determine a difference between the setpoint information 2964 (or stored setpoint information) and the sensor information 2980.

In an aspect, the operation control component 2942 may also include a system operator 2976 configured to determine one or more operational states for controlling one or more functions of the components (e.g., A/C unit 2912, furnace 2914, blower 2916, humidifier/dehumidifier 2918) of the HVAC unit 2910 and control the components based on the determined operations. For example, the system operator 2976 may determine one or more of an initiation time, a stop time, a run time, a power state, speed level, or a heating/cooling level, of one or more of the components and control the components according to the operational state(s).

In an example, the system operator 2976 may receive information on the difference between the setpoint information 2964 (or stored setpoint information) and the sensor information 2980 from the comparer 2974 and determine an operational state of the components. The system operator 2976 may compare the difference between the setpoint information 2964 (or stored setpoint information) and the sensor information 2980 and determine whether the difference is within a threshold range. The system operator 2976 may determine operational states based on a result of the determination.

Figure 30:
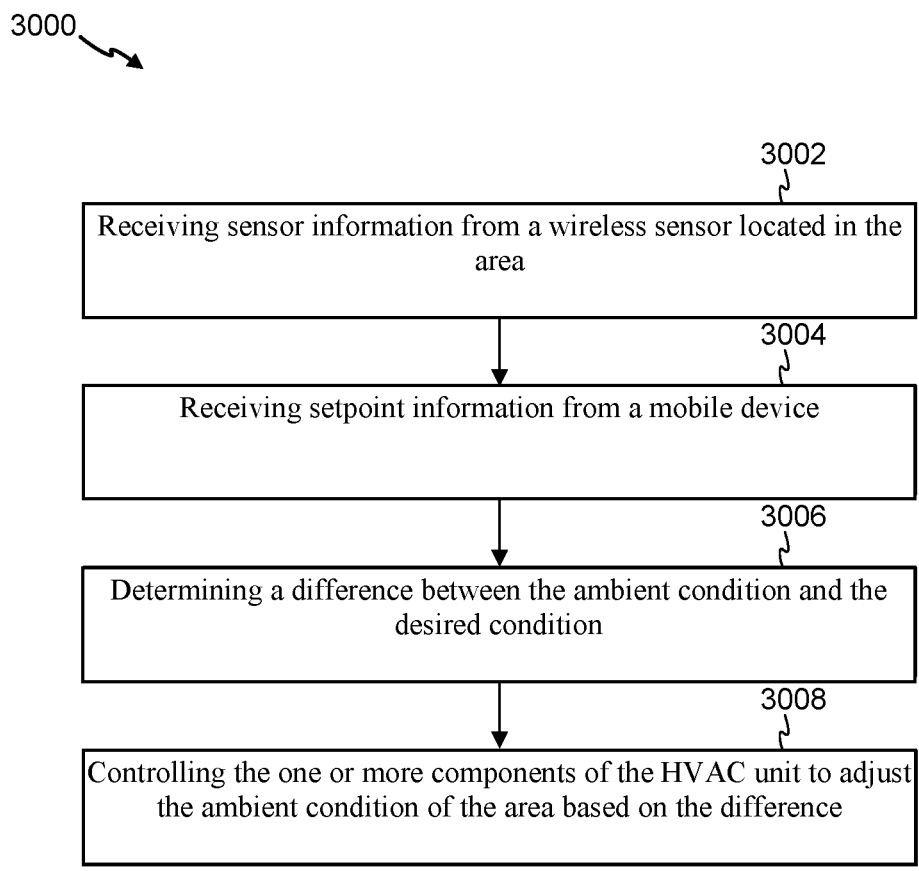
FIG. 30 is a flow diagram of an example method for faceless system control of the HVAC system of FIG. 29, according to an exemplary embodiment.

Referring to FIG. 30, an example of a method 3000 for controlling an ambient condition of an area (e.g., one or more rooms of building 2990) by one or more components of the HVAC unit 2910 is provided. The method 3000 may implement the functionality described herein with reference to FIG. 29 and may be performed by one or more components of the HVAC unit 2910 as described herein with reference to FIGS. 29 and 31. In an example, the one or more components may include the air conditioning unit 2912, the furnace 2914, the blower 2916, or the humidifier/dehumidifier 2918.

At 3002, the method 3000 may include receiving sensor information from a wireless sensor located in the area, the sensor information indicating the ambient condition of the area. For example, one or more components (e.g., processor 3110, memory 3120, operation control component 2942, monitoring component 2970, or information receiver 2972) of the HVAC unit 2910 may receive the sensor information 2980 from the one or more sensors 2950, the sensor information 2980 may indicate an ambient condition (e.g., current temperature or humidity level of one or more of building 2990) of an area (e.g., one or more rooms of building 2990) corresponding to a location of each sensor 2950. In an example, the HVAC unit 2910 may receive the sensor information 2980 from the one or more sensors 2950 wirelessly.

At 3004, the method 3000 may also include receiving setpoint information from a mobile device, the setpoint information indicating a desired condition of the area. For example, one or more components (e.g., processor 3110, memory 3120, operation control component 2942, monitoring component 2970, and/or information receiver 2972) of the HVAC unit 2910 may receive setpoint information 2964 from the mobile device 160, the setpoint information 2964 may indicate a desired condition of the area. In an example, the setpoint information 2964 may include heating/cooling settings 2966 and/or humidity settings 2968 indicating desired conditions of one or more rooms of the building 2990 as set by a user. In an example, the HVAC unit 2910 may receive the setpoint information 2964 from the mobile device 2960 wirelessly.

At 3006, the method 3000 may include determining a difference between the ambient condition and the desired condition. For example, one or more components (e.g., processor 3110, memory 3120, operation control component 2942, monitoring component 2970, and/or comparer 2974) of the HVAC unit 2910 may determine a difference between the ambient condition and the desired condition. As an example, the one or more components of the HVAC unit 2910 may determine a difference between a current temperature or humidity level of a room of the building 2990 where the sensor 2950 is located and a heating/cooling setting 2966 or humidity setting 2968 received from the mobile device 2960.

At 3008, the method 3000 may also include controlling the one or more components of the HVAC unit to adjust the ambient condition of the area based on the difference. For example, one or more components (e.g., processor 3110, memory 3120, operation control component 2942, monitoring component 2970, and/or system operator 2976) of the HVAC unit 2910 may control one or more components of the HVAC unit 2910 to adjust the ambient condition of one or more rooms of the building 2990 based on the difference.

In an aspect, the method 3000 may further include determining whether the difference is within a threshold range, and controlling the one or more components further based on whether the difference is within the threshold range. In an example, one or more components (e.g., processor 3110, memory 3120, operation control component 2942, monitoring component 2970, and/or system operator 2976) of the HVAC unit 2910 may determine whether the difference is within a threshold range, and control the one or more components (e.g., air conditioning unit 2912, the furnace 2914, the blower 2916, or the humidifier/dehumidifier 2918) further based on whether the difference is within the threshold range.

In some aspects, the method 3000 may also include determining an operational state, including one or more of an initiation time, a stop time, a run time, a power state, speed level, or a heating/cooling level, of the one or more components, and controlling the one or more components further based on the operational state. In an example, one or more components (e.g., processor 3110, memory 3120, operation control component 2942, monitoring component 2970, and/or system operator 2976) of the HVAC unit 2910 may determine an operational state, including one or more of an initiation time, a stop time, a run time, a power state, speed level, or a heating/cooling level, of the one or more components (e.g., air conditioning unit 2912, the furnace 2914, the blower 2916, or the humidifier/dehumidifier 2918), and control the one or more components further based on the operational state.

In another aspect, the method 3000 may include storing the setpoint information, in response to receiving of the setpoint information from the mobile device, determining second setpoint information, indicating a second desired condition of the area, was not received from the mobile device, and controlling the one or more components of the HVAC unit to adjust the ambient condition of the area in response to the second setpoint information not being received and based on the stored setpoint information. In an example, one or more components (e.g., processor 3110, memory 3120, operation control component 2942, monitoring component 2970, and/or system operator 2976) of the HVAC unit 2910 may store the setpoint information 2964, in response to receiving of the setpoint information 2964 from the mobile device 2960, determine second setpoint information 2964, indicating a second desired condition of the area, was not received from the mobile device 2960, and control the one or more components (e.g., air conditioning unit 2912, the furnace 2914, the blower 2916, or the humidifier/dehumidifier 2918) of the HVAC unit to adjust the ambient condition of the area in response to the second setpoint information 2964 not being received and based on the stored setpoint information 2964.

In another aspect, the method 3000 may include receiving second sensor information from the mobile device, the second sensor information indicating a second ambient condition of the area, determining a second difference between the second sensor information and the stored setpoint information, and controlling the one or more components of the HVAC unit to adjust the ambient condition of the area further based on the second difference. In an example, one or more components (e.g., processor 3110, memory 3120, operation control component 2942, monitoring component 2970, and/or system operator 2976) of the HVAC unit 2910 may receive second sensor information 2980 from the mobile device, the second sensor information 2980 indicating a second ambient condition of the area, determine a second difference between the second sensor information 2980 and the stored setpoint information 2964, and control the one or more components (e.g., air conditioning unit 2912, the furnace 2914, the blower 2916, or the humidifier/dehumidifier 2918) of the HVAC unit 2910 to adjust the ambient condition of the area further based on the second difference.

Figure 31:
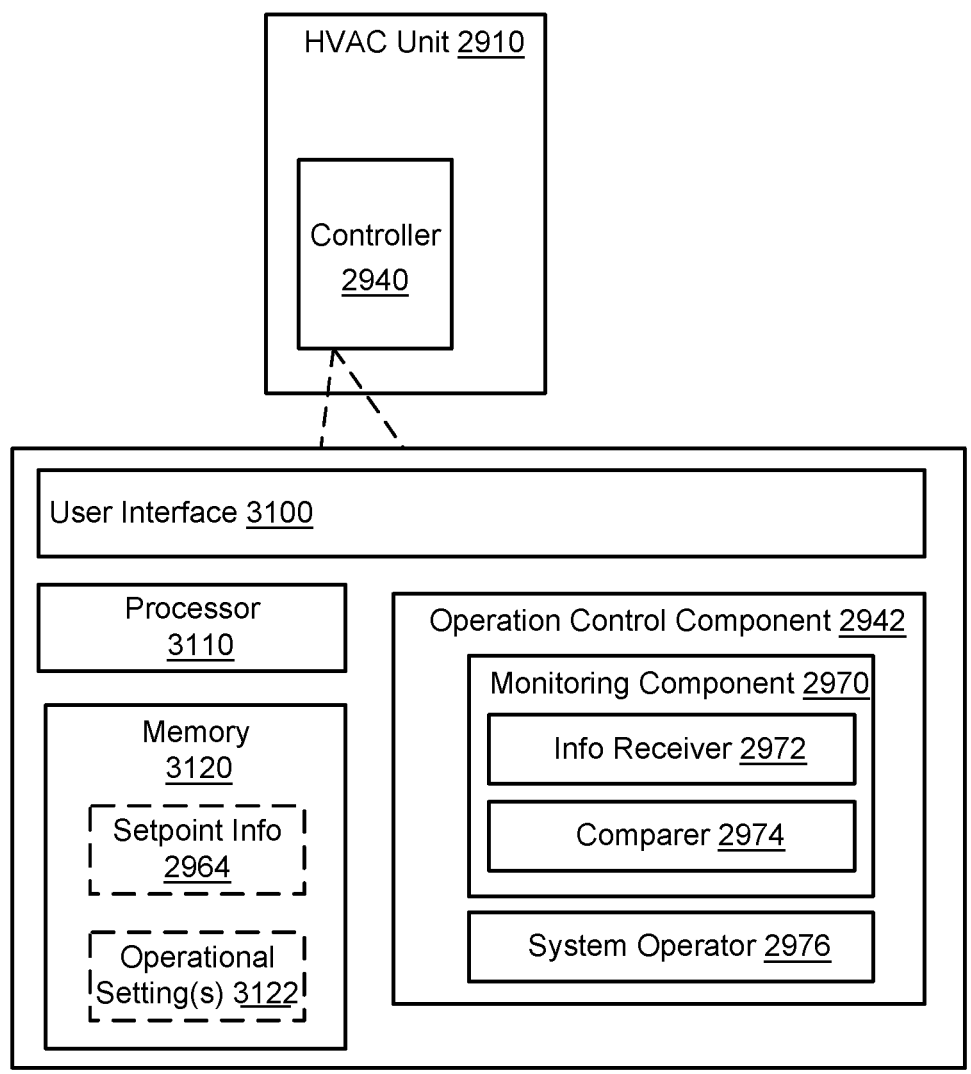
FIG. 31 is a block diagram showing example components of the HVAC system of FIG. 29, according to an exemplary embodiment.

Referring to FIG. 31, the HVAC unit 2910 and the controller 2940 may include a variety of components, some of which have already been described herein. As shown, the controller 2940 may also include a user interface 3100, a processor 3110, and a memory 3120 which operate in conjunction to perform one or more functions described herein related to the faceless system control. The user interface 3100 may operate to receive information from the processor 3110 and communicate the information to a user. In an example, the user interface 3100 may include one or more lights, speakers, or displays to communicate the information to the user. The processor 3110 may be one or more processors configured to control the HVAC unit 2910 and perform one or more functions described herein.

The memory 3120 may be configured to store data (e.g., setpoint information 2964, operational settings 3122) used herein and/or functions and operations performed by the processor 3110 and/or the operation control component 2942. The memory 3120 may include any type of computer-readable medium usable by a computer or at least one processor 3120, such as random access memory (RAM), read only memory (ROM), tapes, magnetic discs, optical discs, volatile memory, non-volatile memory, and any combination thereof. In an aspect, the memory 3120 may be a non-transitory computer-readable storage medium that stores one or more computer-executable codes defining the operation control component 2942 and/or one or more of subcomponents of the operation control component 2942, and/or data associated therewith, when HVAC unit 2910 is operating the processor 3110 to execute the operation control component 2942 and/or one or more of subcomponents.

Figure 32:
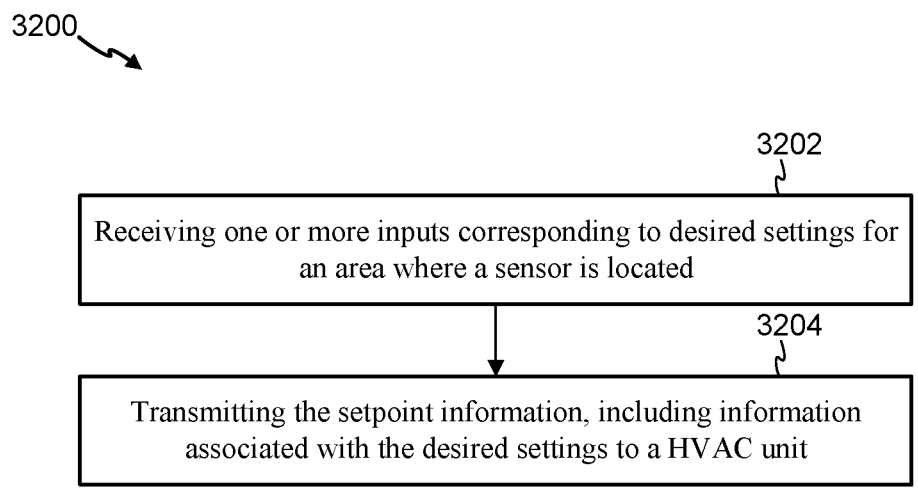
FIG. 32 is a flowchart of an example method for faceless system control of the HVAC system of FIG. 29 by the mobile device of FIG. 29, according to an exemplary embodiment.

Referring to FIG. 32, an example of a method 3200 for controlling an ambient condition of an area (e.g., one or more rooms of building 2990) by the mobile device 2960 is provided. The method 3200 may implement the functionality described herein with reference to FIG. 29 and may be performed by one or more components of the mobile device 2960 as described herein with reference to FIGS. 29 and 33.

At 3202, the method 3200 may include receiving one or more inputs corresponding to desired settings for an area where a sensor is located. For example, one or more components (e.g., processor 3310, memory 3320, and/or HVAC application 2962) of the mobile device 2960 may receive one or more inputs corresponding to desired settings (e.g., heating/cooling settings 2966, humidity settings 2968) for one or more rooms of the building 2990 where a sensor 2950 is located.

At 3204, the method 3200 may include transmitting the setpoint information, including information associated with the desired settings to a HVAC unit. For example, one or more components (e.g., processor 3310, memory 3320, HVAC application 2962, and/or communications component 3330) of the mobile device 2960 may transmit the setpoint information 2964, including the heating/cooling settings 2966 or the humidity settings 2968 to the HVAC unit 2910. In some examples, the setpoint information 2964 may also include scheduling information associated with the heating/cooling settings 2966 or the humidity settings 2968. For example, the setpoint information 2964 may include a time of day and/or day(s) of the week for adjusting an ambient condition of an area of the building 2990.

Figure 33:
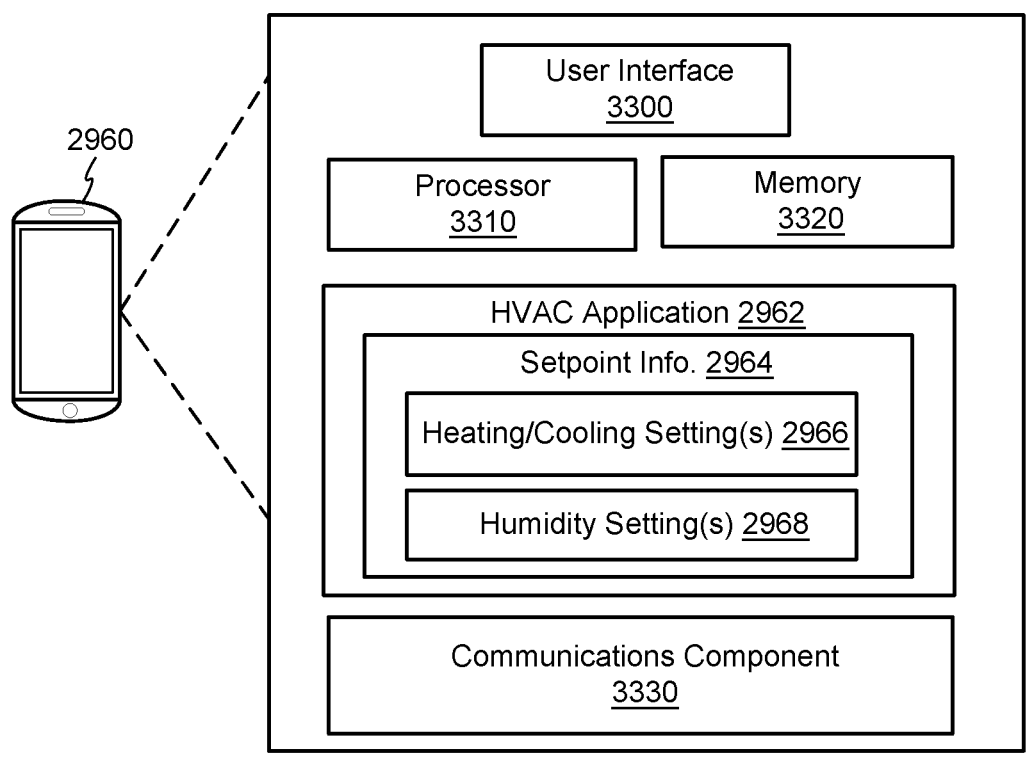
FIG. 33 is a block diagram showing example components of the mobile device of FIG. 29, according to an exemplary embodiment.

Referring to FIG. 33, the mobile device 2960 may include a variety of components, some of which have already been described herein. As shown, the mobile device 2960 may also include a user interface 3300, a processor 3310, a memory 3320, and a communications component 3330 which operate in conjunction to perform one or more functions described herein related to the faceless system control.

The user interface 3300, the processor 3310, the memory 3320, and the communications component 3330 may be the same or similar to the corresponding components of the controller 2940, as described herein, but may be configured or programmed to perform mobile device operations as opposed to HVAC unit operations.

Further Implementations

An example HVAC unit comprising: one or more components to control an ambient condition of an area of a building; a memory configured to store a set of instructions; a processor coupled with the memory and configured to execute the instructions to: receive sensor information from a wireless sensor located in the area, the sensor information indicating the ambient condition of the area; receive setpoint information from a mobile device, the setpoint information indicating a desired condition of the area; determine a difference between the ambient condition and the desired condition; and control the one or more components to adjust the ambient condition of the area based on the difference.

The above example HVAC unit, wherein the processor is further configured to execute the instructions to: determine whether the difference is within a threshold range; and control the one or more components further based on whether the difference is within the threshold range.

One or more of the above example HVAC units, wherein the one or more components comprises an air conditioning unit, a furnace, a blower, a humidifier, or a dehumidifier.

One or more of the above example HVAC units, wherein the processor is further configured to execute the instructions to: determine an operational state, including one or more of an initiation time, a stop time, a run time, a power state, speed level, or a heating/cooling level, of the one or more components; and control the one or more components further based on the operational state.

One or more of the above example HVAC units, wherein the HVAC unit is located external to the area.

One or more of the above example HVAC units, wherein the processor is further configured to execute the instructions to: store the setpoint information, in response to receiving of the setpoint information from the mobile device; determine second setpoint information, indicating a second desired condition of the area, was not received from the mobile device; and control the one or more components of the HVAC unit to adjust the ambient condition of the area in response to the second setpoint information not being received and based on the stored setpoint information.

One or more of the above example HVAC units, wherein the processor is further configured to execute the instructions to: receive second sensor information from the mobile device, the second sensor information indicating a second ambient condition of the area; determine a second difference between the second sensor information and the stored setpoint information; and control the one or more components of the HVAC unit to adjust the ambient condition of the area further based on the second difference.

One or more of the above example HVAC units, wherein the processor is further configured to execute the instructions to: receive one or more of the sensor information or the setpoint information wirelessly.

One or more of the above example HVAC units, wherein the mobile device is a voice-controlled device.

An example method for controlling an ambient condition of an area of a building by one or more components of an HVAC unit, the method comprising: receiving sensor information from a wireless sensor located in the area, the sensor information indicating the ambient condition of the area; receiving setpoint information from a mobile device, the setpoint information indicating a desired condition of the area; determining a difference between the ambient condition and the desired condition; and controlling the one or more components of the HVAC unit to adjust the ambient condition of the area based on the difference.

The above example method, further comprising: determining whether the difference is within a threshold range; and controlling the one or more components further based on whether the difference is within the threshold range.

One or more of the above example methods, wherein the one or more components comprises an air conditioning unit, a furnace, a blower, a humidifier, or a dehumidifier.

One or more of the above example methods, further comprising: determining an operational state, including one or more of an initiation time, a stop time, a run time, a power state, speed level, or a heating/cooling level, of the one or more components; and controlling the one or more components further based on the operational state.

One or more of the above example methods, wherein the HVAC unit is located external to the area.

One or more of the above example methods, further comprising: storing the setpoint information, in response to receiving of the setpoint information from the mobile device; determining second setpoint information, indicating a second desired condition of the area, was not received from the mobile device; and controlling the one or more components of the HVAC unit to adjust the ambient condition of the area in response to the second setpoint information not being received and based on the stored setpoint information.

One or more of the above example methods, further comprising: receiving second sensor information from the mobile device, the second sensor information indicating a second ambient condition of the area; determining a second difference between the second sensor information and the stored setpoint information; and controlling the one or more components of the HVAC unit to adjust the ambient condition of the area further based on the second difference.

One or more of the above example methods, wherein the receiving of the sensor information or the receiving of the setpoint information is wirelessly.

One or more of the above example methods, wherein the mobile device is a voice-controlled device.

An example computer-readable medium storing computer executable code for controlling an ambient condition of an area of a building by one or more components of a heating, ventilation, and air conditioning (HVAC) unit, comprising code to: receive sensor information from a wireless sensor located in the area, the sensor information indicating the ambient condition of the area; receive setpoint information from a mobile device, the setpoint information indicating a desired condition of the area; determine a difference between the ambient condition and the desired condition; and control the one or more components to adjust the ambient condition of the area based on the difference.

The above example computer-readable medium, further comprising code to: determine whether the difference is within a threshold range; and control the one or more components further based on whether the difference is within the threshold range.

One or more of the above example computer-readable mediums, further comprising code to: determine an operational state, including one or more of an initiation time, a stop time, a run time, a power state, speed level, or a heating/cooling level, of the one or more components; and control the one or more components further based on the operational state.

One or more of the above example computer-readable mediums, further comprising code to: store the setpoint information, in response to receiving of the setpoint information from the mobile device; determine second setpoint information, indicating a second desired condition of the area, was not received from the mobile device; and control the one or more components of the HVAC unit to adjust the ambient condition of the area in response to the second setpoint information not being received and based on the stored setpoint information.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system, the system comprising:
    a controller, the controller comprising one or more circuits configured to:
        measure one or more environmental conditions via a sensor of the controller; and
    an adapter unit comprising one or more circuits configured to:
        receive measurements of the one or more environmental conditions from the controller via a local wireless network; and
        generate a control signal based on the measurements of the one or more environmental conditions and a control input; and
        provide the control signal to HVAC equipment for operation of the HVAC equipment in accordance with the control input;
        wherein the one or more circuits of the adapter unit are configured to operate the HVAC equipment based on a backup control signal generated based on a backup control algorithm responsive to identifying a connection issue with the controller.

2. The system of claim 1, wherein the control input is a temperature setpoint or one or more time values.

3. The system of claim 1, wherein the adapter unit is separate from the HVAC equipment.

4. The system of claim 3, wherein the adapter unit comprises a plurality of terminals for forming wired connections to the HVAC equipment.

5. The system of claim 1, wherein the adapter unit is built into the HVAC equipment.

6. The system of claim 1, wherein the HVAC equipment comprises a furnace.

7. The system of claim 1, wherein the HVAC equipment comprises an air conditioner.

8. The system of claim 1,
    wherein the local wireless network is a radio frequently local wireless network;
    wherein the adapter unit includes one or more relay outputs for wired control of the HVAC equipment;
    wherein the one or more circuits of the adapter unit are configured to provide the control signal to the HVAC equipment via the one or more relay outputs.

9. The system of claim 1, wherein the one or more circuits of the adapter unit are configured to receive the control input from a user device.

10. A heating, ventilation, or air conditioning (HVAC) system, the system comprising:
    a headless thermostat device that is structured without a variable display and without any mechanism for manually or verbally receiving control inputs from a user, the headless thermostat device comprising one or more circuits configured to:
        receive a control input from a user device via a local wireless network; and
        generate a control signal for HVAC equipment based on the control input; and
    an adapter unit comprising one or more circuits configured to:
        receive the control signal from the headless thermostat device via the local wireless network; and
        provide the control signal to the HVAC equipment for operation of the HVAC equipment in accordance with the control input, wherein the one or more circuits of the adapter unit are further configured to:
            retrieve a backup control input from a remote computing system via a cellular network responsive to determining that a connection to the local wireless network cannot be established;
            generate a backup control signal for the HVAC equipment based on the backup control input; and
            provide the backup control signal to the HVAC equipment to affect the operation of the HVAC equipment.

11. The system of claim 10, wherein the remote computing system uses weather data specific to a location of the HVAC system to generate the backup control input.

12. The system of claim 10, wherein the remote computing system uses a backup schedule associated with the HVAC equipment to generate the backup control input.

13. The system of claim 10, wherein the remote computing system uses historical data associated with the HVAC equipment to generate the backup control input, the historical data comprising a historical trend associated with a temperature setpoint for the HVAC equipment.

14. A heating, ventilation, or air conditioning (HVAC) system, the system comprising:
a headless thermostat device that is structured without a variable display and without any mechanism for manually or verbally receiving control inputs from a user, the headless thermostat device comprising one or more circuits configured to:
receive a control input from a user device via a local wireless network; and
generate a control signal for HVAC equipment based on the control input; and
an adapter unit comprising one or more circuits configured to:
receive the control signal from the headless thermostat device via the local wireless network; and
provide the control signal to the HVAC equipment for operation of the HVAC equipment in accordance with the control input, wherein the one or more circuits of the adapter unit are further configured to:
generate a backup control signal for the HVAC equipment by executing a backup control algorithm responsive to determining that a connection to the local wireless network cannot be established; and
provide the backup control signal to the HVAC equipment to affect the operation of the HVAC equipment.

15. The system of claim 14, wherein the backup control algorithm uses historical data associated with the HVAC equipment as a backup control input.

16. The system of claim 15, wherein the historical data comprises runtime associated with the HVAC equipment and a historical trend associated with a temperature setpoint for the HVAC equipment.

17. The system of claim 15, wherein the backup control input comprises a first backup control input, and wherein the backup control algorithm uses a measured outdoor air temperature as a second backup control input.

18. An adapter unit for use in a heating, ventilation, or air conditioning (HVAC) system, the adapter unit comprising:
one or more circuits configured to:
connect to a local wireless network automatically upon power up using network configuration data stored in a memory of the adapter unit;
generate a control signal for HVAC equipment from a control input and one or more environmental conditions measured by a sensor of a controller; and
provide the control signal to the HVAC equipment to affect operation of the HVAC equipment;
wherein the one or more circuits of the adapter unit are configured to operate the HVAC equipment based on a backup control signal generated based on a backup control algorithm responsive to identifying a connection issue with the controller.

19. The adapter unit of claim 18, wherein the adapter unit is separate from the HVAC equipment.

20. The adapter unit of claim 18, wherein the adapter unit is built into the HVAC equipment.

21. The adapter unit of claim 19, further comprising a plurality of terminals for forming wired connections to the HVAC equipment.

22. The adapter unit of claim 18, wherein the one or more circuits are further configured to:
retrieve a backup control input from a remote computing system via a cellular network responsive to determining that a connection to the local wireless network cannot be established;
generate the backup control signal for the HVAC equipment based on the backup control input; and
provide the backup control signal to the HVAC equipment to affect the operation of the HVAC equipment.

23. The adapter unit of claim 22, wherein the remote computing system uses at least one of the following to generate the backup control input:
weather data specific to a location of the HVAC system;
a backup schedule associated with the HVAC equipment; or
historical data associated with the HVAC equipment, the historical data comprising a historical trend associated with a temperature setpoint for the HVAC equipment.

24. The adapter unit of claim 23, wherein the one or more circuits are further configured to:
store the historical data associated with the HVAC equipment in the memory of the adapter unit; and
transmit the historical data associated with the HVAC equipment to the remote computing system at periodic intervals.

25. The adapter unit of claim 18, wherein the one or more circuits are further configured to:
provide the backup control signal to the HVAC equipment to affect the operation of the HVAC equipment.

26. The adapter unit of claim 25, wherein the backup control algorithm uses historical data associated with the HVAC equipment as a backup control input, the historical data comprising runtime associated with the HVAC equipment and a historical trend associated with a temperature setpoint for the HVAC equipment.

27. The adapter unit of claim 26, wherein the backup control input comprises a first backup control input, and wherein the backup control algorithm uses a measured outdoor air temperature as a second backup control input.

28. The adapter unit of claim 18, wherein the HVAC equipment comprises an indoor unit located inside of a building or an outdoor unit located outside of the building.

29. A heating, ventilation, or air conditioning (HVAC) system, the system comprising:
a controller, the controller comprising one or more circuits configured to:
measure one or more environmental conditions via a sensor of the controller; and
an adapter unit comprising one or more circuits configured to:
receive measurements of the one or more environmental conditions from the controller via a local wireless network;
generate a control signal based on the measurements of the one or more environmental conditions and a setpoint received from a user device; and
provide the control signal to HVAC equipment for operation of the HVAC equipment in accordance with a control input, wherein the HVAC equipment comprises a furnace or an air conditioner;

wherein the one or more circuits of the adapter unit are configured to operate the HVAC equipment based on a backup control signal generated based on a backup control algorithm responsive to identifying a connection issue with the controller.

30. A heating, ventilation, or air conditioning (HVAC) system, the system comprising:

a headless thermostat device that is structured without a visual output, the headless thermostat device comprising one or more circuits configured to:

receive a control input from a smartphone device via a radio frequency local wireless network; and generate a control signal for HVAC equipment based on the control input; and an adapter unit comprising one or more relay outputs for wired control of the HVAC equipment, the adapter unit and one or more circuits configured to:

receive the control signal from the headless thermostat device via the radio frequency local wireless network; and provide the control signal to the HVAC equipment via the one or more relay outputs for operation of the HVAC equipment in accordance with the control input;

wherein the one or more circuits of the adapter unit are configured to operate the HVAC equipment based on a backup control signal generated based on a backup control algorithm responsive to identifying a connection issue with the headless thermostat device.

* * * * *